United States Patent
Lewis et al.

(10) Patent No.: US 12,116,076 B1
(45) Date of Patent: Oct. 15, 2024

(54) STANDING BOARD FOR ATTACHMENT TO A STROLLER

(71) Applicant: Delta Enterprise Corp., New York, NY (US)

(72) Inventors: Scott A. Lewis, Hoboken, NJ (US); Francisco J. Reyes, Richmond Hill, NY (US)

(73) Assignee: Delta Enterprise Corp., New York, NY (US)

( * ) Notice: Subject to any disclaimer, the term of this patent is extended or adjusted under 35 U.S.C. 154(b) by 505 days.

(21) Appl. No.: 17/472,052

(22) Filed: Sep. 10, 2021

(51) Int. Cl.
| | |
|---|---|
| *B62K 3/00* | (2006.01) |
| *B62J 1/08* | (2006.01) |
| *B62K 15/00* | (2006.01) |
| *B62K 27/12* | (2006.01) |

(52) U.S. Cl.
CPC ............... *B62K 3/002* (2013.01); *B62J 1/08* (2013.01); *B62K 15/00* (2013.01); *B62K 27/12* (2013.01); *B62K 2015/001* (2013.01)

(58) Field of Classification Search
CPC ........ B62K 3/002; B62K 15/00; B62K 27/12; B62K 2015/001; B62J 1/08
See application file for complete search history.

(56) References Cited

U.S. PATENT DOCUMENTS

| | | | |
|---|---|---|---|
| 5,503,415 A | 4/1996 | Powell | |
| 6,540,238 B2 | 4/2003 | Yang | |
| 6,827,356 B2 | 12/2004 | Zhuang | |
| 8,029,007 B2 | 10/2011 | Jones et al. | |
| 8,500,139 B1 * | 8/2013 | Andrews | B62K 3/002 |
| | | | 280/87.051 |
| 8,657,303 B2 | 2/2014 | Andrews et al. | |
| 9,302,558 B2 | 4/2016 | Lee et al. | |
| 10,683,026 B2 * | 6/2020 | Baron | B62B 9/28 |
| 11,820,419 B2 * | 11/2023 | Grodkiewicz | B62B 7/008 |
| 2001/0033069 A1 * | 10/2001 | Ivers | B62B 9/28 |
| | | | 280/87.041 |

(Continued)

FOREIGN PATENT DOCUMENTS

| | | | |
|---|---|---|---|
| CN | 205365929 U | * | 7/2016 |
| CN | 206826730 U | * | 1/2018 |
| CN | 217347930 U | * | 9/2022 |

(Continued)

*Primary Examiner* — James A Shriver, II
*Assistant Examiner* — Michael T. Walsh
(74) *Attorney, Agent, or Firm* — Richard M. Goldberg

(57) ABSTRACT

An arrangement for supporting a child behind a stroller, includes an axle attachment member adapted to be secured to an axle of the stroller; and a standing board adapted to be secured to the axle attachment member or the axle of the stroller, and including an elongated planar board, at least one wheel secured to a rear section of the planar board, first and second spaced apart attachment openings in an upper surface of the planar board, a seat assembly, handle or plug releasably securable in either attachment opening, transversely aligned wing openings in opposite side surfaces of the planar board, and wings selectively and releasably securable in the wing openings so as to extend transversely out from the planar board, and a stroller attachment member at a front end of the planar board for removable securement to either the stroller or axle attachment member.

5 Claims, 59 Drawing Sheets

(56) References Cited

U.S. PATENT DOCUMENTS

2015/0102600 A1\* 4/2015 Schooley ................ F16L 23/06
                                                                                       285/409

FOREIGN PATENT DOCUMENTS

| | | | | |
|---|---|---|---|---|
| DE | 202011051444 U1 | * | 8/2012 | ............. B62B 1/002 |
| FR | 3055877 A1 | * | 3/2018 | ............... B62B 5/08 |
| TW | M251585 U | * | 12/2004 | |
| TW | M311628 U | * | 5/2007 | |
| WO | WO-2012151638 A1 | * | 11/2012 | ........... A63C 17/015 |

\* cited by examiner

STANDING BOARD FOR ATTACHMENT TO A STROLLER

BACKGROUND OF THE INVENTION

The present invention relates generally to infant strollers, and more particularly, is directed to an infant stroller with a rear standing board on which an older child can stand.

Parents often travel with young children of differing ages. During this travel, one child may be in a stroller while another child walks alongside the stroller. However, over time, the child that is walking may become tired, wishing to be carried by a parent or placed in the stroller.

For this reason, standing boards and scooters have been developed that releasably attach to the rear of the stroller, and upon which the child may stand or sit. However, these standing boards and scooters have certain deficiencies as to adjustability and as to quick and secure attachment to the stroller.

SUMMARY OF THE INVENTION

Accordingly, it is an object of the present invention to provide a standing board for attachment to a stroller, that overcomes the aforementioned problems.

It is another object of the present invention to provide a standing board for attachment to a stroller which provides a simple and easy attachment to a stroller.

It is still another object of the present invention to provide a standing board for attachment to a stroller which provides a secure and stable attachment to the stroller.

It is yet another object of the present invention to provide a standing board for attachment to a stroller which provides adjustment of the position of the handle and seat assembly on the standing board.

It is a further object of the present invention to provide a standing board for attachment to a stroller that provides transverse extending wings that extend outwardly from the sides of the standing board to increase the widthwise surface on which the child can stand.

It is a still further object of the present invention to provide a standing board for attachment to a stroller in which the position of the wings can be changed on the standing board.

It is a yet further object of the present invention to provide a standing board for attachment to a stroller in which the attachment to the stroller can be extended rearwardly of the rear axle of the stroller.

In accordance with an aspect of the present invention, a standing board adapted to be secured to a stroller, includes an elongated planar board; at least one wheel secured to a rear section of the planar board; a releasable stroller attachment at a front end of the planar board for releasable securement to a stroller; first and second spaced apart attachment openings in an upper surface of the planar board; and at least one of the following attachments selectively and releasably secured in each of the first and second attachment openings: a seat assembly, a handle or a plug.

At least one of the seat assembly and handle includes a stem having a lower end adapted to fit in either the first or second attachment opening, in the case of the seat assembly, a seat secured to an upper end of the stem of the seat assembly, in the case of the handle, a handle bar secured to an upper end of the stem, and a releasable locking mechanism at a lower end of the stem for releasably locking the stem in a respective one of the first and second attachment openings.

The planar board includes at least one vertical recess in open communication with each of the first and second attachment openings and a restraining lip at an upper end of each vertical recess. The stem includes a first locking opening at a lower end thereof and a second locking opening at the lower end at a position above the first locking opening. The first locking opening is positioned below the upper surface of the planar board when the lower end of the stem is inserted within one of the first and second attachment openings and the second locking opening is positioned above the upper surface of the planar board when the lower end of the stem is inserted within one of the first and second attachment openings. A button release is positioned in the stem, the button release including a locking tab adapted to extend through the first locking opening into the at least one vertical recess when the lower end of the stem is inserted within one of the first and second attachment openings to lock the stem the planar board, and a button connected with the locking tab and adapted to extend through the second locking opening; and a spring mounted in the stem for normally biasing the button out through the second locking opening. In this regard, pushing in the button against the force of the spring results in the locking tab being removed from the at least one vertical recess to enable removal of the respective attachment.

Preferably, the planar board includes two vertical recesses in diametrically opposite relation to each other for each of the first and second attachment openings in order to limit orientation of the respective attachment therein to only a forward and reverse direction.

Each stem includes a flared out member spaced slightly from a lower edge of the stem to limit the insertion depth of the lower end of the stem in the respective first and second attachment opening.

In accordance with another aspect of the present invention, a standing board adapted to be secured to a stroller, includes an elongated planar board; at least one wheel secured to a rear section of the planar board; a releasable stroller attachment at a front end of the planar board for releasable securement to a stroller; a first set of first and second transversely aligned wing openings in opposite side surfaces of the planar board; and first and second wings selectively and releasably securable in the first and second wing openings so as to extend transversely out from the planar board.

The standing board further includes a second set of third and fourth spaced apart and transversely aligned wing openings in the side surfaces of the planar board in spaced relation to the first and second wing openings; and the first and second wings are selectively and releasably securable in either the first set of wing openings or the second set of wing openings.

Each wing has an upper surface which is substantially coplanar with the upper surface of the planar board when the wing is secured in a respective wing opening. Each wing includes a main body having a supporting surface on which a person is adapted to stand, and a securing stem connected with the main body for releasable securement within a respective wing opening. There is also a releasable locking arrangement for releasably securing each wing in a respective wing opening.

The standing board includes a recess in open communication with each wing opening. The releasable locking arrangement includes a vertical opening in an end portion of the securing stem, a catch slidably arranged in a vertical direction in the vertical opening, the catch including a transverse through opening, a spring for biasing the catch into the recess of the respective wing opening to lock the securing stem and prevent removal thereof from the wing opening.

Each wing includes a bore extending through the main body and the securing stem and opening at an outer surface of the main body. The releasable locking arrangement further includes a release rod slidably mounted in the bore and extending partially through the transverse through opening of the catch, the release rod including a wedging surface for engaging the catch at the through opening in order to move the catch in a direction against the force of the spring and out of the recess, a button slidably mounted in the bore and engageable at the outer surface of the main body, and a spring mounted between the release rod and the button, whereby depression of the button into the wing forces the release rod in a direction further into the bore such that the wedging surface moves the catch in a direction against the force of the spring and out of the recess, which enables removal of the wing from the respective wing opening.

In accordance with still another aspect of the present invention, a standing board adapted to be secured to a stroller, includes an elongated planar board; at least one wheel secured to a rear section of the planar board; a stroller attachment member at a front end of the planar board and adapted to be removably secured to a stroller. The stroller attachment member includes a main body connected at a front end of the planar board, a hook member extending forwardly from the main body for engaging over a rear axle of the stroller, a first slide member slidably mounted in the main body for movement toward and away from the hook member, the slide member including at least one finger movable with the slide member into and out of the hook member, a spring for normally biasing the at least one finger into the hook member, and at least one first angled engagement wall, whereby engagement of the hook member over the axle of the stroller results in the at least one finger being forced out of the hook member and upon movement of the axle past the at least one finger, the spring biases the at least one finger back into the hook member to lock the stroller attachment member to the axle; and a stroller release mechanism at the front end of the planar board for permitting release of the axle from the hook member, the stroller release mechanism including a second slide member slidably mounted in the main body for movement in a transverse direction, the second slide member including at least one second angled engagement wall for engagement with the first angled engagement wall when the second slide member is transversely moved by an external force in the main body, to cause the first slide member to move in a direction away from the hook member so as to move the at least one finger out of the hook member.

The at least one first angled engagement wall includes a first angled engagement wall section oriented in a first angled direction and a second angled engagement wall section oriented in a second opposite angled direction; and the at least one second angled engagement wall includes a third angled engagement wall section oriented in the first angled direction for engagement with the first angled engagement wall section when the second slide member is moved in a first transverse direction and a fourth angled engagement wall section oriented in the second angled direction for engagement with the second angled engagement wall section when the second slide member is moved in a second opposite transverse direction.

Specifically, the at least one first angled engagement wall includes two spaced apart first angled engagement wall sections oriented in a first angled direction and two second angled engagement wall sections oriented in a second opposite angled direction; and the at least one second angled engagement wall includes two third angled engagement wall sections oriented in the first angled direction for engagement with the first angled engagement wall sections when the second slide member is moved in a first transverse direction and two fourth angled engagement wall sections oriented in the second angled direction for engagement with the second angled engagement wall sections when the second slide member is moved in a second opposite transverse direction.

Upon release of the external force, the spring forces the first slide member back toward the hook member.

In accordance with yet another aspect of the present invention, an arrangement for supporting a child behind a stroller, includes an axle attachment device adapted to be secured to an axle of the stroller. The axle attachment device includes a first axle housing member having a first semi-cylindrical surface, a second axle housing member pivotally mounted to the first axle housing member and having a second semi-cylindrical surface, the second axle housing member pivotally movable relative to the first axle housing member between an open position in which the first and second semi-cylindrical surfaces are positioned away from each other and a closed position in which the first and second semi-cylindrical surfaces form a cylindrical opening, a releasable securement assembly for releasably locking the first and second axle housing members in the closed position for engagement about an axle of the stroller, a release mechanism for releasably unlocking the first and second axle housing members to the open position for release of the axle of the stroller therefrom, and a main body connected to one of the first and second axle housing members. A standing board is adapted to be secured to the axle attachment device, the standing board including an elongated planar board, at least one wheel secured to a rear section of the planar board, a stroller attachment member at a front end of the planar board and adapted to be removably secured to the axle attachment device. The stroller attachment member includes a main body connected at a front end of the planar board, a hook member extending forwardly from the main body for engaging the main body of the axle attachment device, and a securement arrangement for releasably holding the main body of the axle attachment device within the hook member.

One end of the first axle housing member is fixed to the main body, and an opposite end of the first axle housing member is pivotally connected to the second axle housing member.

The releasable securement assembly includes at least one recess in one of the main body and the first axle housing member, a slide member slidably mounted in the second axle housing member, the slide member having at least one locking finger at a distal end thereof, and a spring for biasing the slide member in a direction out of the second axle housing member such that the at least one locking finger engages within the at least one recess to secure the axle attachment device to the axle of the stroller in the closed position.

The release mechanism includes an actuating member slidably mounted to the second axle housing member, an elongated slot in the second axle housing member, a connecting wall connecting the actuating member to the slide member and extending through the elongated slot, whereby an external force on the actuating member causes the slide member to move into the second axle housing member against the force of the spring to release the second axle housing member in the closed position and thereby permit removal of the axle of the stroller therefrom.

The main body includes an opening for receiving the hook member.

In accordance with a further aspect of the present invention, and arrangement for supporting a child behind a stroller, includes a stroller mounting member adapted to be secured to the rear legs of the stroller, the stroller mounting member including: a first rear leg attachment member adapted to be releasably secured to a first rear leg of the stroller, a second rear leg attachment member adapted to be releasably secured to a second rear leg of the stroller, a yoke having a stroller securement member, a first arm having one end pivotally mounted to the first rear leg attachment member and a second end pivotally mounted to the yoke, a second arm having one end pivotally mounted to the second rear leg attachment member and a second end pivotally mounted to the yoke. A standing board is adapted to be secured to the stroller attachment member, the standing board including an elongated planar board, at least one wheel secured to a rear section of the planar board, a stroller attachment member at a front end of the planar board and adapted to be removably secured to the stroller mounting member. The stroller attachment member includes a main body connected at a front end of the planar board, a hook member extending forwardly from the main body for engaging the stroller securement member of the yoke, and a securement arrangement for releasably holding the stroller securement member of the yoke within the hook member.

A first pivot securement body is provided for pivotally connecting the first arm to the first rear leg attachment member along two different pivot axes, and a second pivot securement body is provided for pivotally connecting the second arm to the second rear leg attachment member along two different pivot axes.

Preferably, the two different pivot axes are generally orthogonal to each other.

Further, each of the first and second arms are telescoping arms comprising an outer telescoping arm and an inner telescoping arm telescopically received within the outer telescoping arm.

A releasable securement arrangement is provided for releasably securing the inner telescoping arm relative to the outer telescoping arm in any of a plurality of different extended positions.

In accordance with a still further aspect of the present invention, an arrangement for supporting a child behind a stroller, includes an axle attachment device adapted to be secured to an axle of the stroller. The axle attachment device includes a first axle housing member having a first semi-cylindrical surface, a second axle housing member pivotally mounted to the first axle housing member and having a second semi-cylindrical surface, the second axle housing member pivotally movable relative to the first axle housing member between an open position in which the first and second semi-cylindrical surfaces are positioned away from each other and a closed position in which the first and second semi-cylindrical surfaces form a cylindrical opening, a releasable securement assembly for releasably locking the first and second axle housing members in the closed position for engagement about an axle of the stroller, a release mechanism for releasably unlocking the first and second axle housing members to the open position for release of the axle of the stroller therefrom, and a main body connected to one of the first and second axle housing members.

A standing board adapted to be secured to the axle attachment device or the axle of the stroller, includes an elongated planar board, at least one wheel secured to a rear section of the planar board, first and second spaced apart attachment openings in an upper surface of the planar board, at least one of the following attachments selectively and releasably secured in each of the first and second attachment openings: a seat assembly, a handle or a plug. A first set of first and second transversely aligned wing openings are provided in opposite side surfaces of the planar board, and first and second wings are selectively and releasably securable in the first and second wing openings so as to extend transversely out from the planar board.

A stroller attachment member is provided at a front end of the planar board and adapted to be removably secured to either a stroller or the axle attachment device. The stroller attachment member includes a main body connected at a front end of the planar board, a hook member extending forwardly from the main body for engaging over a rear axle of the stroller or the main body of the axle attachment device, a first slide member slidably mounted in the main body for movement toward and away from the hook member, the slide member including at least one finger movable with the slide member into and out of the hook member, a spring for normally biasing the at least one finger into the hook member, and at least one first angled engagement wall, whereby engagement of the hook member over the axle of the stroller or the main body of the axle attachment device results in the at least one finger being forced out of the hook member and upon movement of the axle or main body of the axle attachment device past the at least one finger, the spring biases the at least one finger back into the hook member to lock the stroller attachment member to the axle or main body of the axle attachment device.

A stroller release mechanism is provided at the front end of the planar board for permitting release of the axle or main body of the axle attachment device from the hook member. The stroller release mechanism includes a second slide member slidably mounted in the main body for movement in a transverse direction, the second slide member including at least one second angled engagement wall for engagement with the first angled engagement wall when the second slide member is transversely moved by an external force in the main body, to cause the first slide member to move in a direction away from the hook member so as to move the at least one finger out of the hook member.

The above and other objects, features and advantages of the invention will become readily apparent from the following detailed description thereof which is to be read in connection with the accompanying drawings.

DETAILED DESCRIPTION

Figure 1:
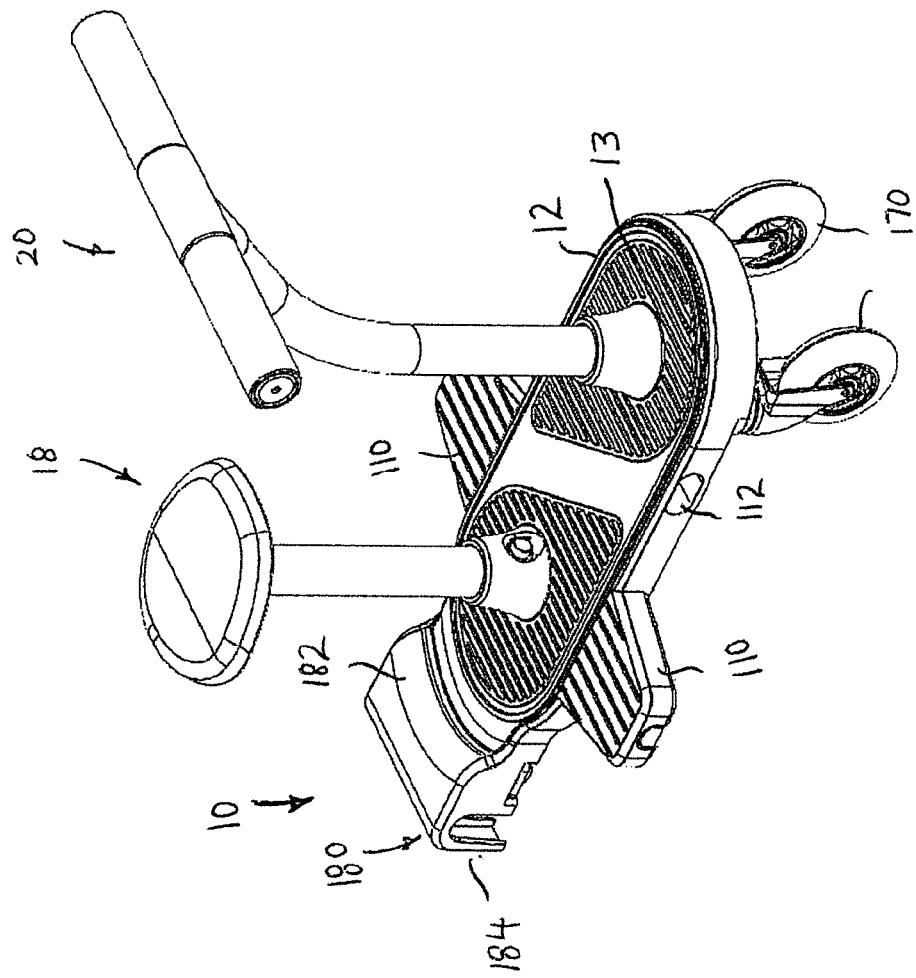
FIG. 1 is a perspective view of a standing board for attachment to a stroller according to a first embodiment of the present invention, in a first assembled configuration, with a seat assembly and a handle, and with the wings in the front openings thereof.

Referring to the drawings in detail, and initially to FIGS. 1-14 thereof, a standing board 10 for attachment to a stroller according to a first embodiment of the present invention is provided. Standing board 10 is similar to a child's scooter, except that it does not have any front wheels, so that it cannot function as a scooter when detached from the stroller. However, it will be appreciated that standing board 10 can also include front wheels, if desired.

Standing board 10 includes an elongated planar board 12 having rounded ends, on which a child can sit or stand. To this end, the upper surface of planar board 12 has a plurality of transversely extending ribs 13 extending upwardly therefrom to provide an anti-slip surface.

There are two spaced apart attachment openings 14 and 16 at the front and rear of the upper surface of the planar board 12. As shown in FIGS. 1-14, a seat assembly 18 can be fixed in either opening 14 or 16, and a handle 20 can be fixed in either opening 14 or 16. It is not necessary that both seat assembly 18 and handle 20 be positioned in openings 14 and 16. For example, seat assembly 18 can be positioned in one opening and a plug 22 (FIGS. 5, 8 and 10-14) in the other opening; handle 20 can be positioned in one opening and plug 22 in the other opening; two plugs 22 can be positioned in both openings, or any other combination.

As shown best in FIGS. 15-19, seat assembly 18 includes an elongated stem assembly 24 and a seat 26 secured to an upper end of the stem assembly 24. Stem assembly 24 includes a base 28, an elongated cylindrical support tube 30 and a releasable locking mechanism 32.

Base 28 includes a short hollow, cylindrical tube 34 that fits within either opening 14 or 16, and which is closed at its lower end by a bottom wall 35. A frustoconical member 36 is secured to the upper end of tube 34 and flares out toward the bottom thereof, with the bottom thereof being approximately halfway of the length of cylindrical tube 34. When cylindrical tube 34 is positioned within an opening 14 or 16, the lower edge of frustoconical member 36 seats on the upper surface of planar board 12 to limit the downward extent of cylindrical tube 34 within the respective opening 14 or 16.

Base 28 further includes a first lower circular locking opening 38 extending transversely through cylindrical tube 34 at a position below the lower edge of frustoconical member 36, a second lower circular opening 39 extending transversely through cylindrical tube 34 at a position below first lower opening 38, and an upper circular locking opening 40 extending transversely through frustoconical member 36.

The lower end of support tube 30 fits within base 28, through the upper open end thereof, with the lower end of support tube 30 seating on bottom wall 35. Support tube 30 includes a lower circular opening 42 which aligns with second lower opening 39 of base 28 and an elongated opening 44 above lower circular opening 42 and which aligns with both first lower circular opening 38 and upper circular opening 40 of base 28.

Release locking mechanism 32 includes a housing insert 46 that fits within support tube 30. As shown, housing insert 46 includes an elongated member 48 having a rear wall 50 with a lower boss 52 extending from the rear wall 50 and having a threaded opening 54 centrally thereof which aligns with second lower circular opening 39. A screw 56 extends through second lower circular opening 39 and lower circular opening 42, and is threadedly received within threaded opening 54 to secure housing insert 46 in a set position within support tube 30.

Housing insert 46 further includes a continuous side wall 58 extending from rear wall 50 and defining an elongated opening 60 which is open at the front end thereof. In the position set by screw 56, elongated openings 60 is in open communication with upper elongated opening 44 of support tube 30 and first lower circular opening 38 and upper circular opening 40 of base 28.

Release locking mechanism 32 further includes a button release 62 inserted within elongated opening 60 which includes an upper release button 64, a lower locking tab 66 and a connecting wall 68 which connects together upper release button 64 and lower locking tab 66. A coil spring 70 is positioned between the rear surface of upper release button 64 and rear wall 50 where it is positioned over a locating pin 72 extending from rear wall 50.

Seat 26 includes a seat surface 74 and a short, hollow, cylindrical tube 76 that extends downwardly from the underside of seat surface 74. The upper end of elongated cylindrical support tube 30 fits within cylindrical tube 76 and is secured thereto by any suitable means. For example, diametrically opposite circular openings 78 can be provided in the upper end of elongated cylindrical support tube 30 and corresponding diametrically opposite circular openings 80 can be provided in cylindrical tube 76 in alignment with circular openings 78, whereby screws 82 can be threadably inserted through the openings to secure seat 26 to the upper end of support tube 30.

Figure 19:
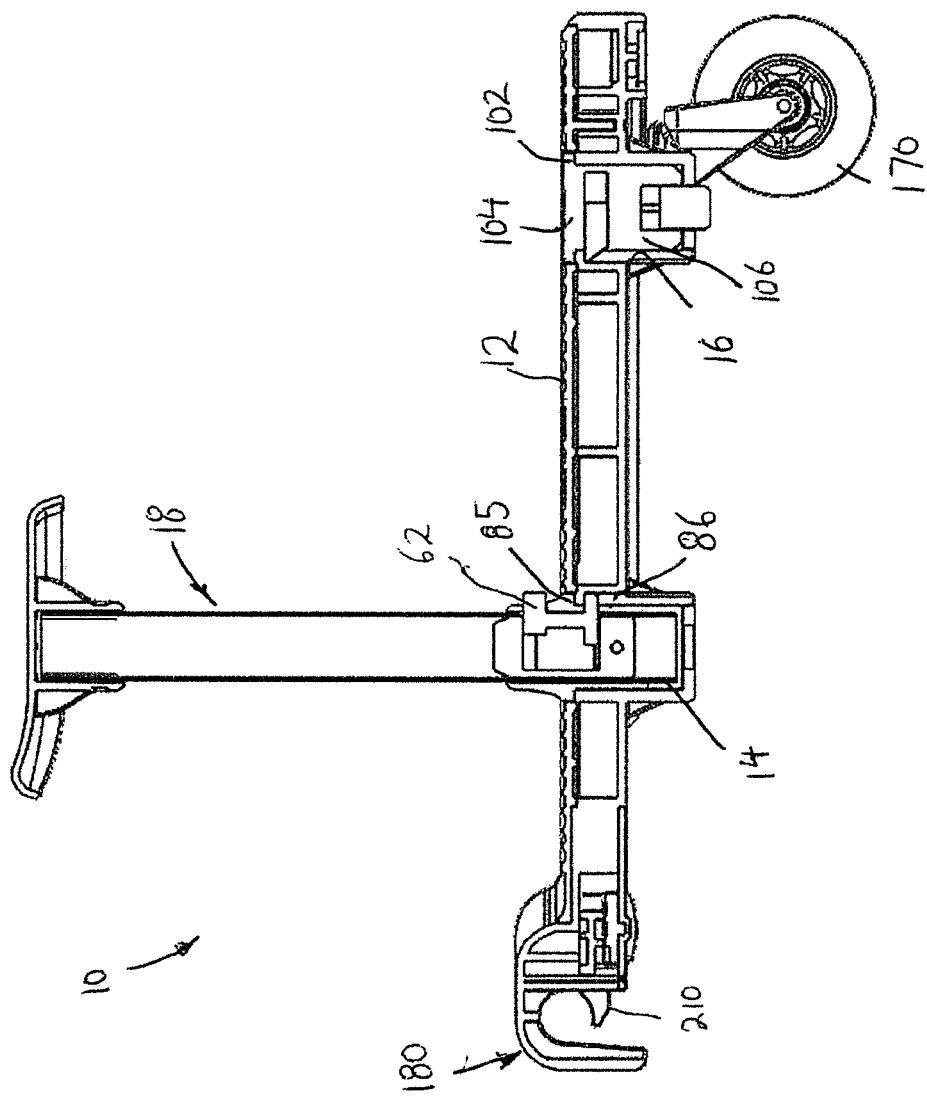
FIG. 19 is a longitudinal cross-sectional view of FIG. 14, taken along line 19-19 thereof, showing engagement of the seat assembly therein.

Each opening 14 and 16 of standing board 12 includes a front vertical slot 84 and a diametrically opposite rear vertical slot 86, with an inwardly extending restraining lip 85 above the each respective slot 84 and 86 (FIG. 19).

In order to assemble seat assembly 18 with planar board 12, upper release button 64 is pushed in against the force of coil spring 70, which also pushes in lower locking tab 66. Cylindrical tube 34 of releasable locking mechanism 32 is then positioned within a respective opening 14 or 16, such that lower locking tab 66 is aligned with either vertical slot 84 or 86. Button 64 is then released, whereby coil spring 70 biases upper release button 64 and lower locking tab 66 outwardly, such that lower locking tab 66 engages in the respective vertical slot 84 or 86 to releasably lock seat assembly 18 with planar board 12. Because of the inwardly extending lip 85, lower locking tab 66 is prevented from escaping from the respective slot 84 or 86, whereby seat assembly 18 is held in a fixed position. Depending upon which slot 84 or 86 is used will determine the facing direction of seat assembly 18. The structure is dimensioned such that, when the lower edge of frustoconical member 36 seats on the upper surface of planar board 12, lower locking tab 66 is positioned immediately below inwardly extending lip 65 to prevent any free play.

To release and remove seat assembly 18, it is only necessary to again push in upper release button 64 against the force of coil spring 70, and pull seat assembly 18 upwardly out of the respective opening 14 or 16.

It will be appreciated that the reason that slots 84 and 86 are diametrically opposite to each other is to provide that the seat assembly 18 can only be oriented in a forwardly facing direction or a rearwardly facing direction.

In addition, as discussed above, a handle 20 can be releasably secured in either opening 14 or 16 of planar board 12.

Figure 2:
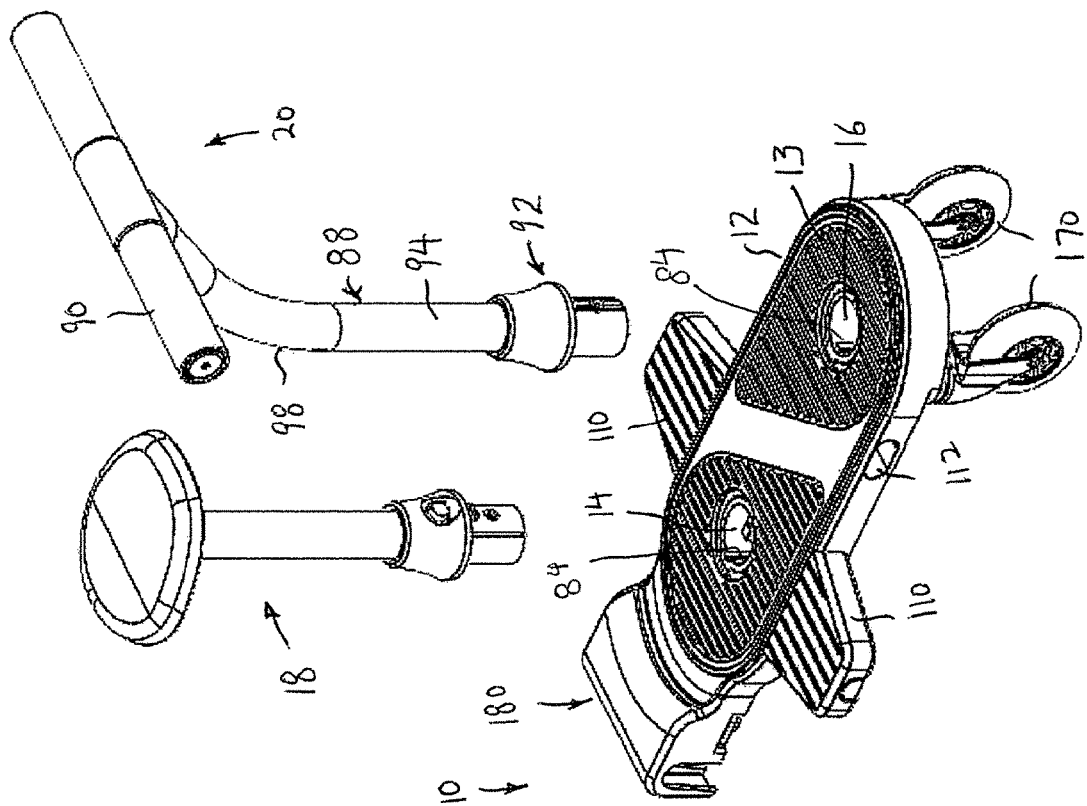
FIG. 2 is a partially exploded, perspective view of the standing board of FIG. 1, with the seat assembly and handle removed from the openings.
Figure 3:
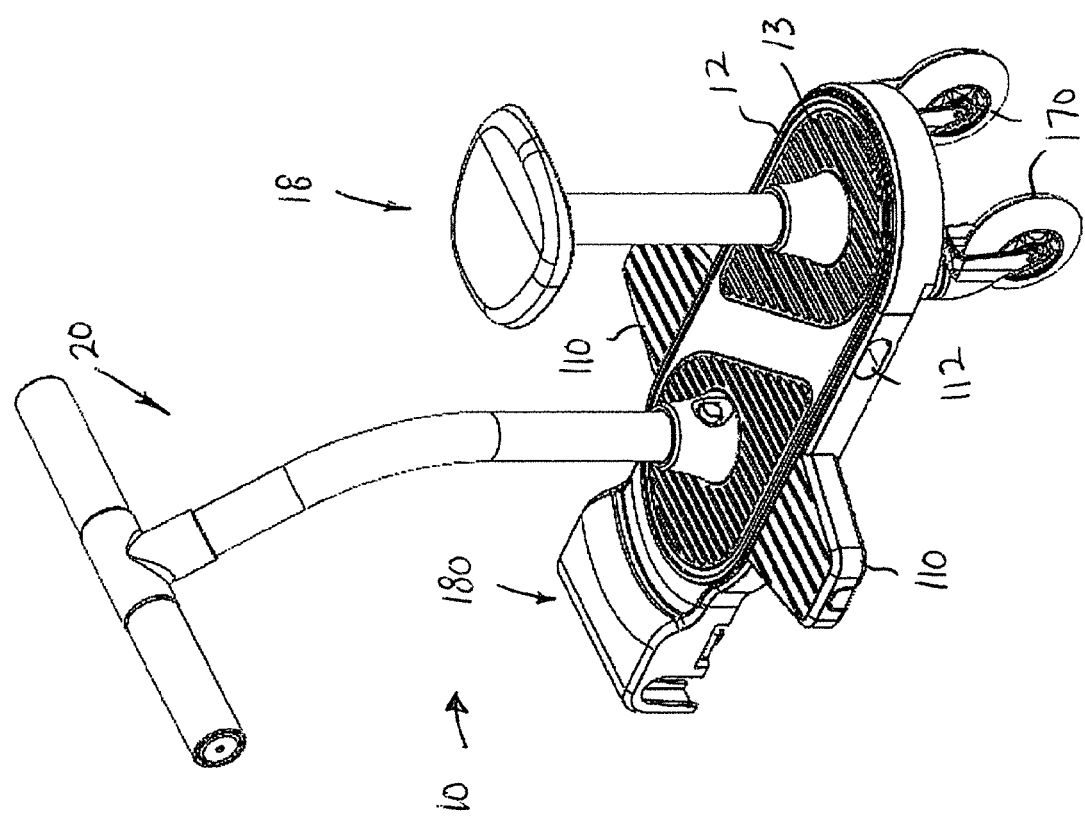
FIG. 3 is a perspective view of the standing board of FIG. 1, with the seat assembly and handle in reversed positions, and with the wings in the front openings thereof.
Figure 4:
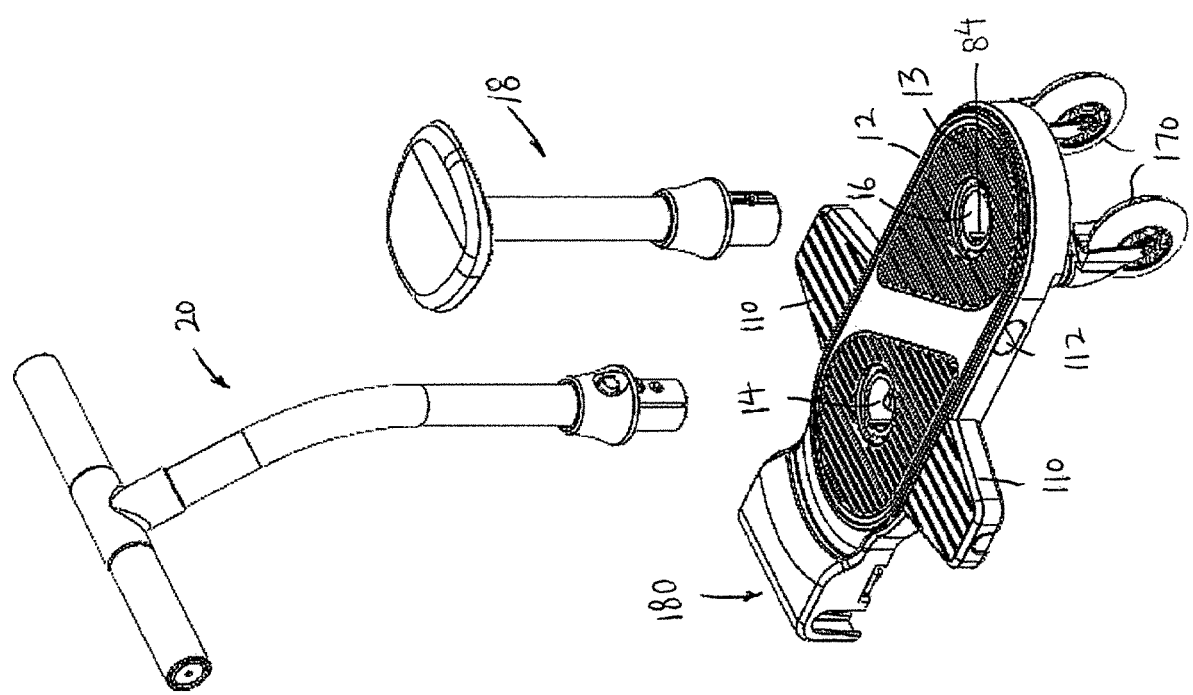
FIG. 4 is a partially exploded, perspective view of the standing board of FIG. 3, with the seat assembly and handle removed from the openings.
Figure 5:
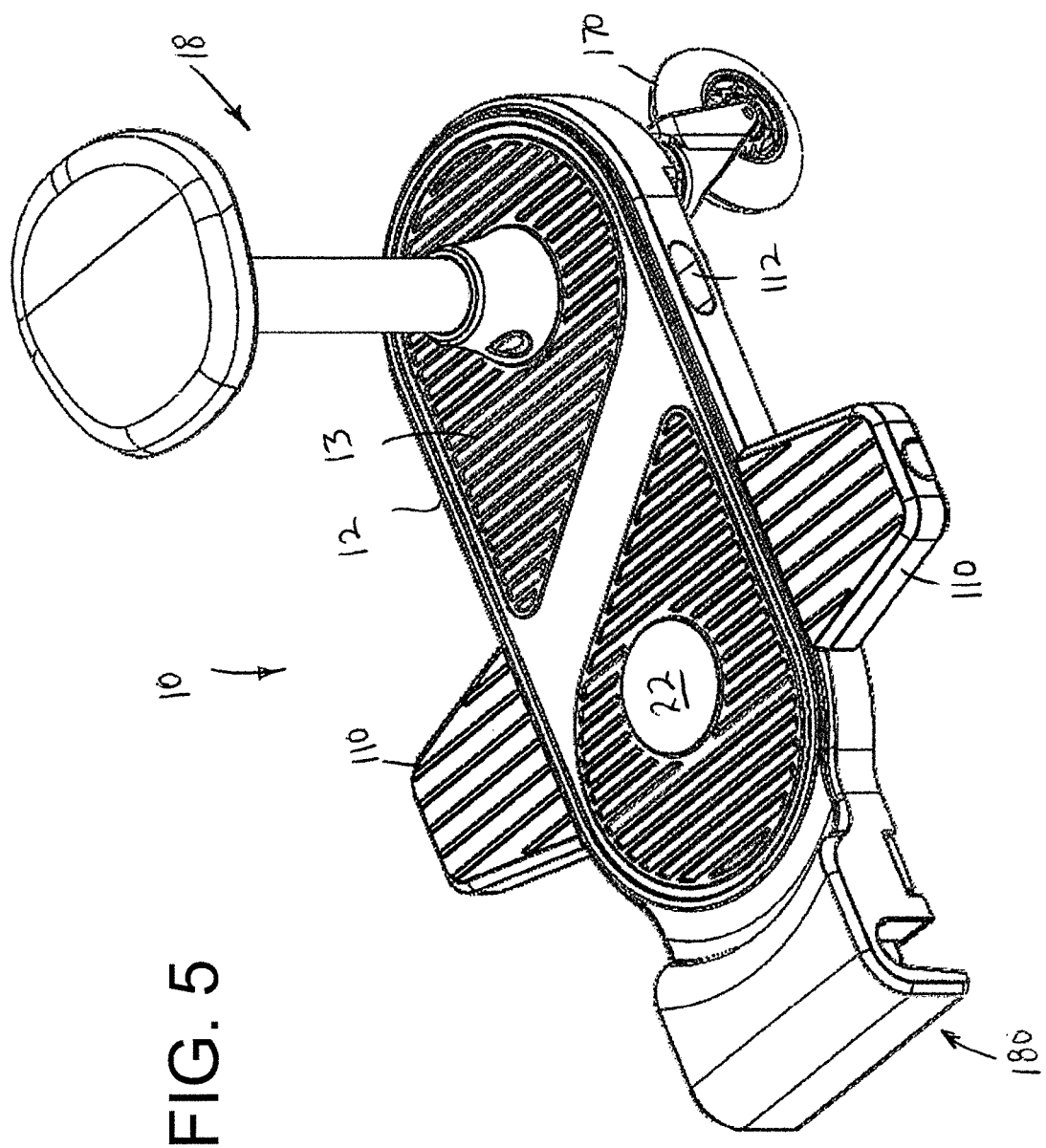
FIG. 5 is a perspective view of the standing board of FIG. 1, with the seat assembly and a plug, and with the wings in the front openings thereof.
Figure 6:
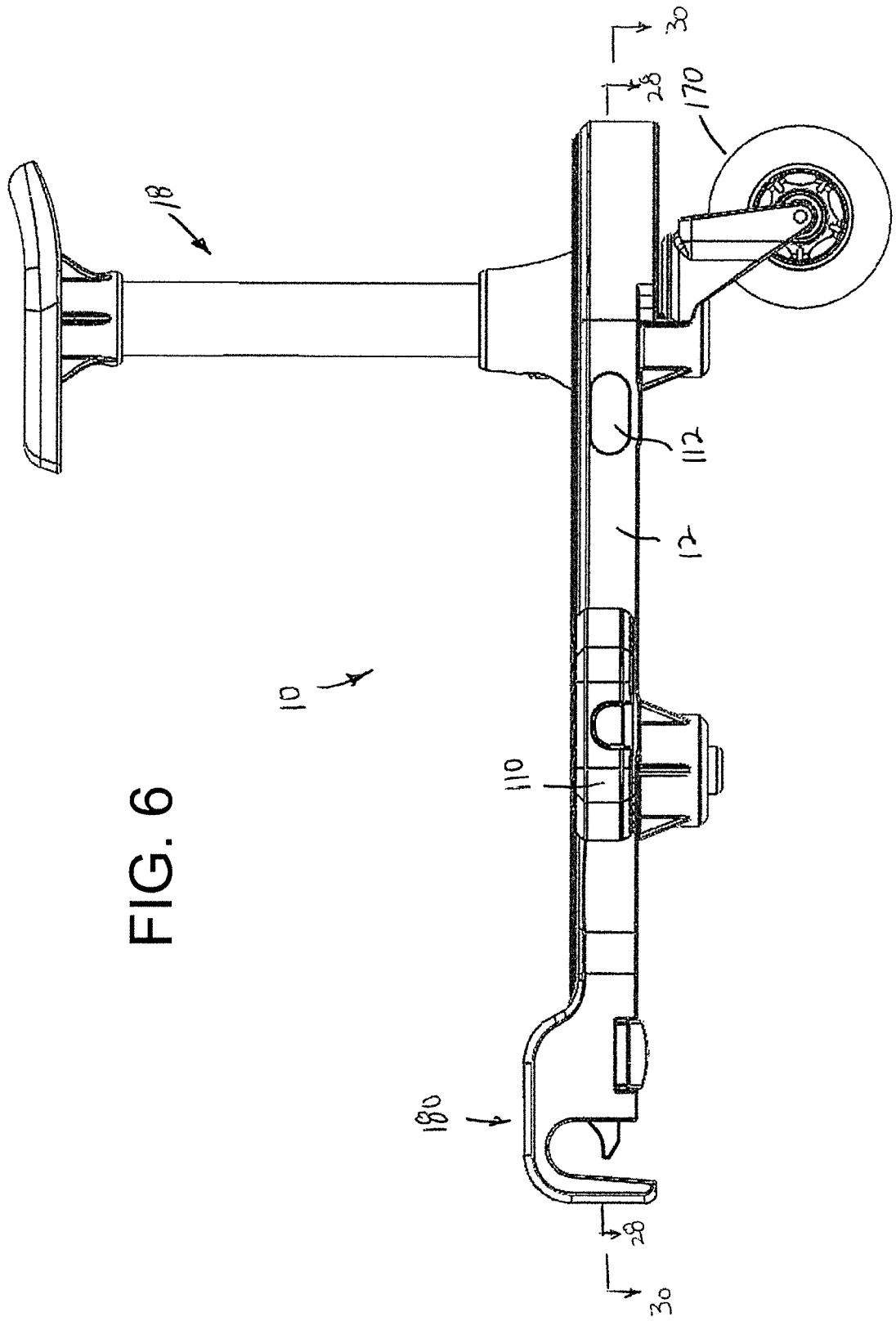
FIG. 6 is a side elevational view of the standing board of FIG. 5.
Figure 7:
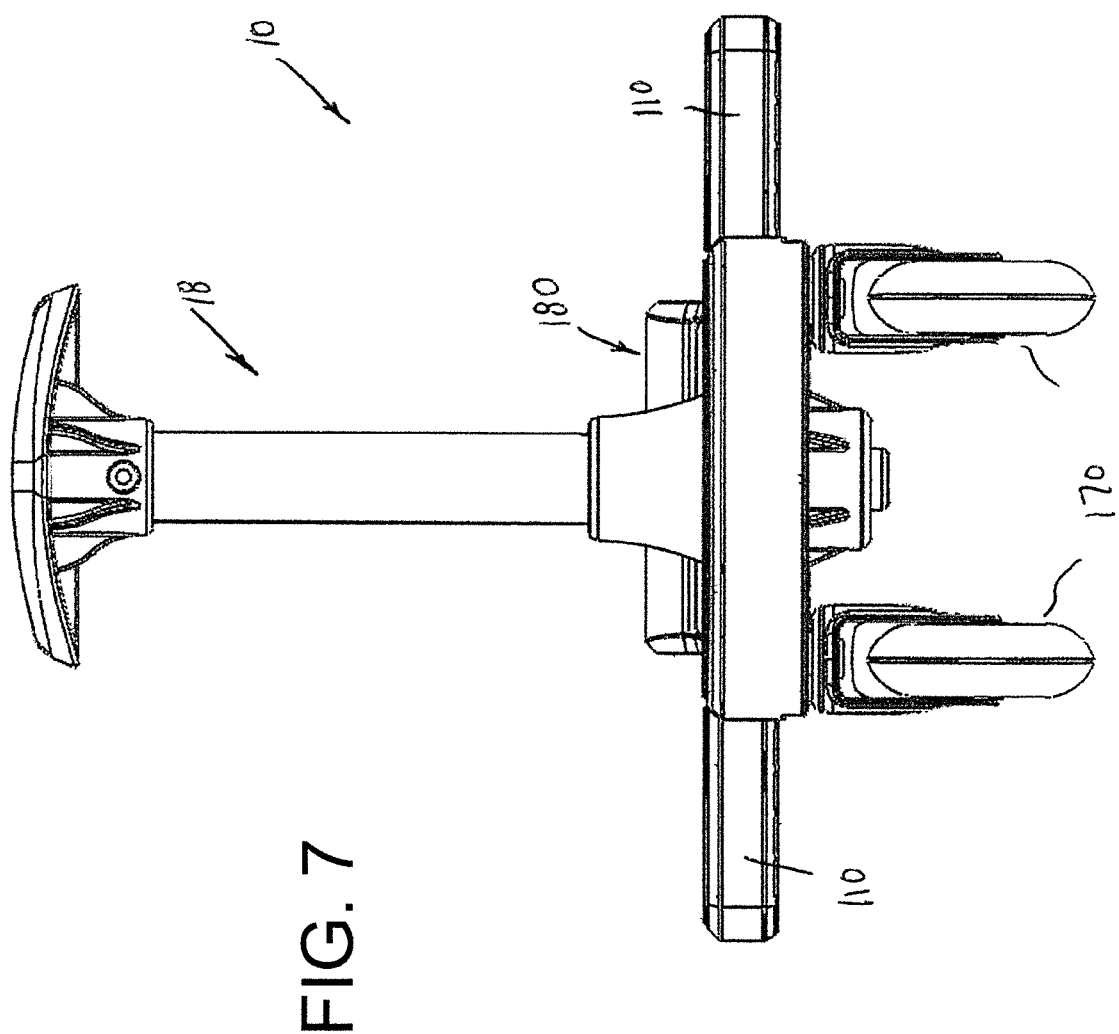
FIG. 7 is a rear elevational view of the standing board of FIG. 5.
Figure 8:
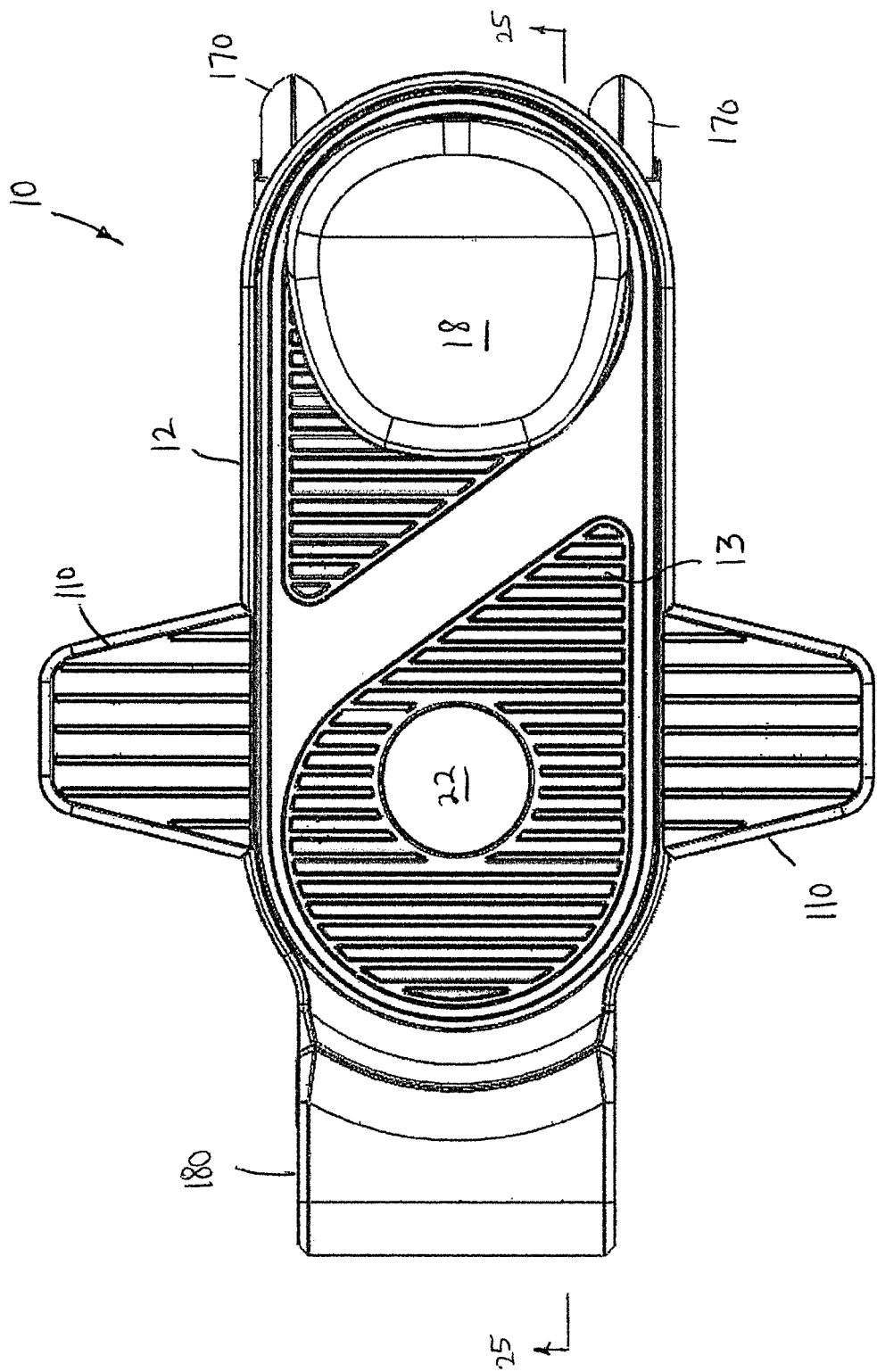
FIG. 8 is a top plan view of the standing board of FIG. 5.
Figure 9:
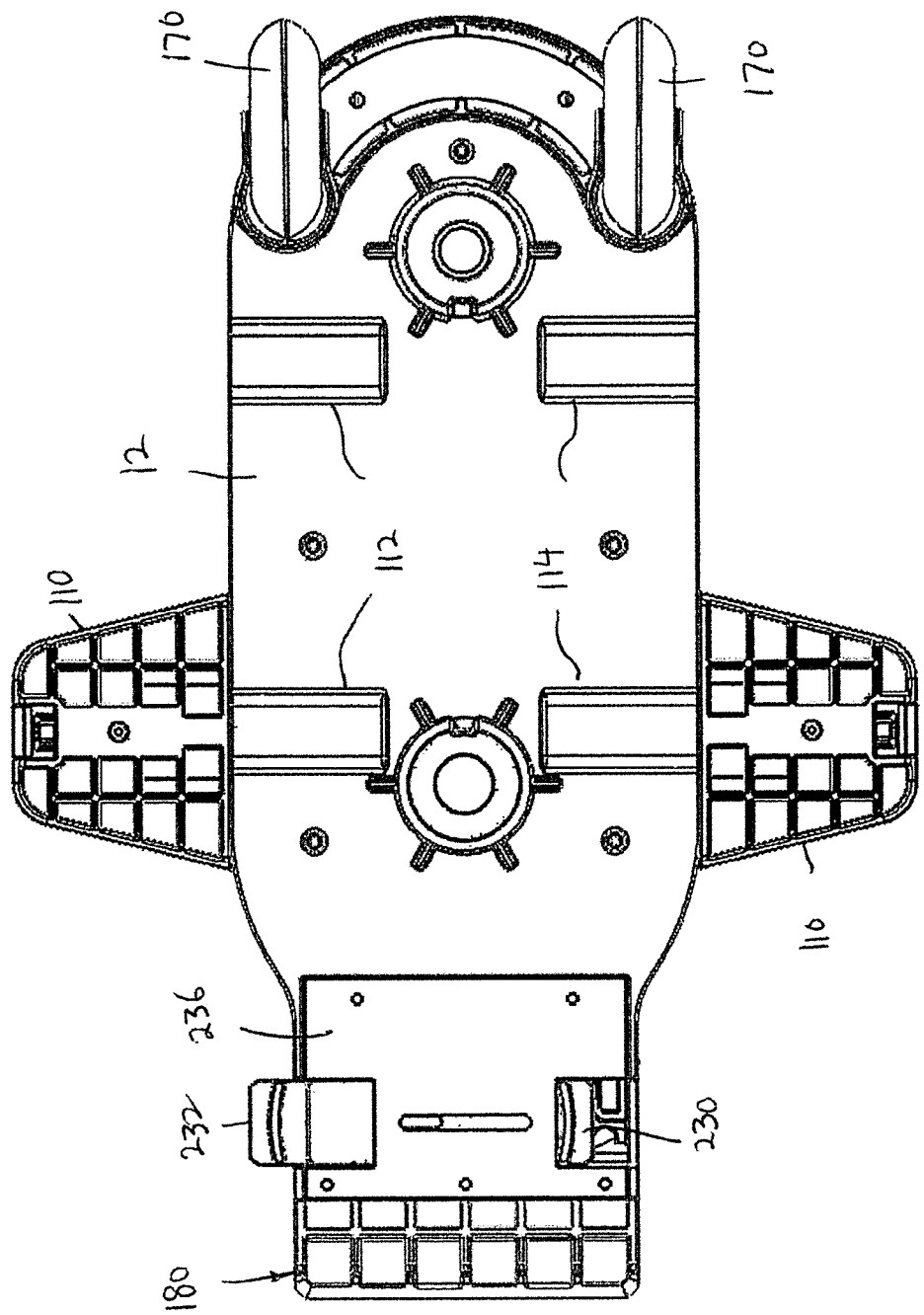
FIG. 9 is a bottom plan view of the standing board of FIG. 5.
Figure 10:
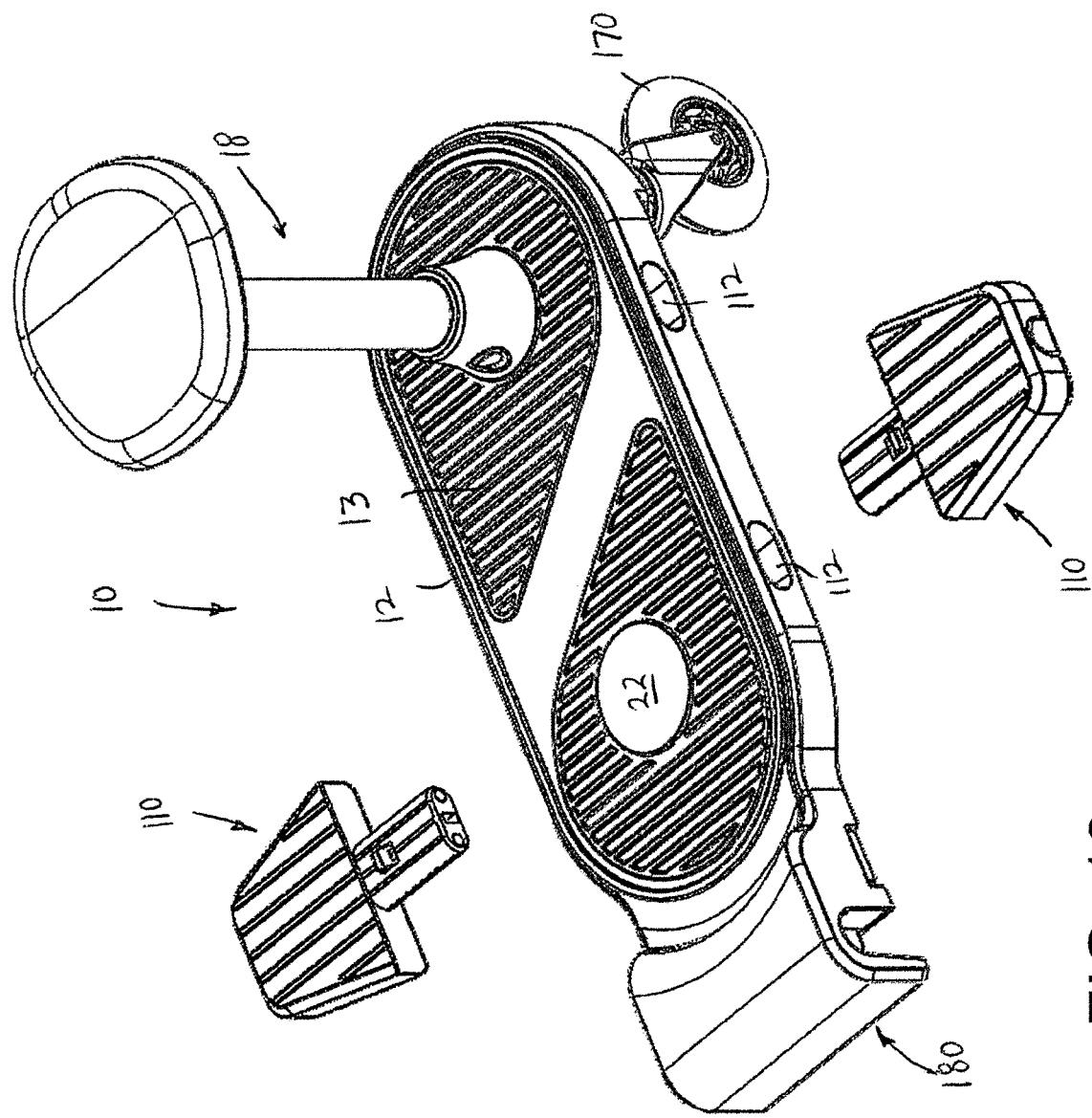
FIG. 10 is a partially exploded, perspective view of the standing board of FIG. 5, with the transverse wings removed from the front openings.
Figure 11:
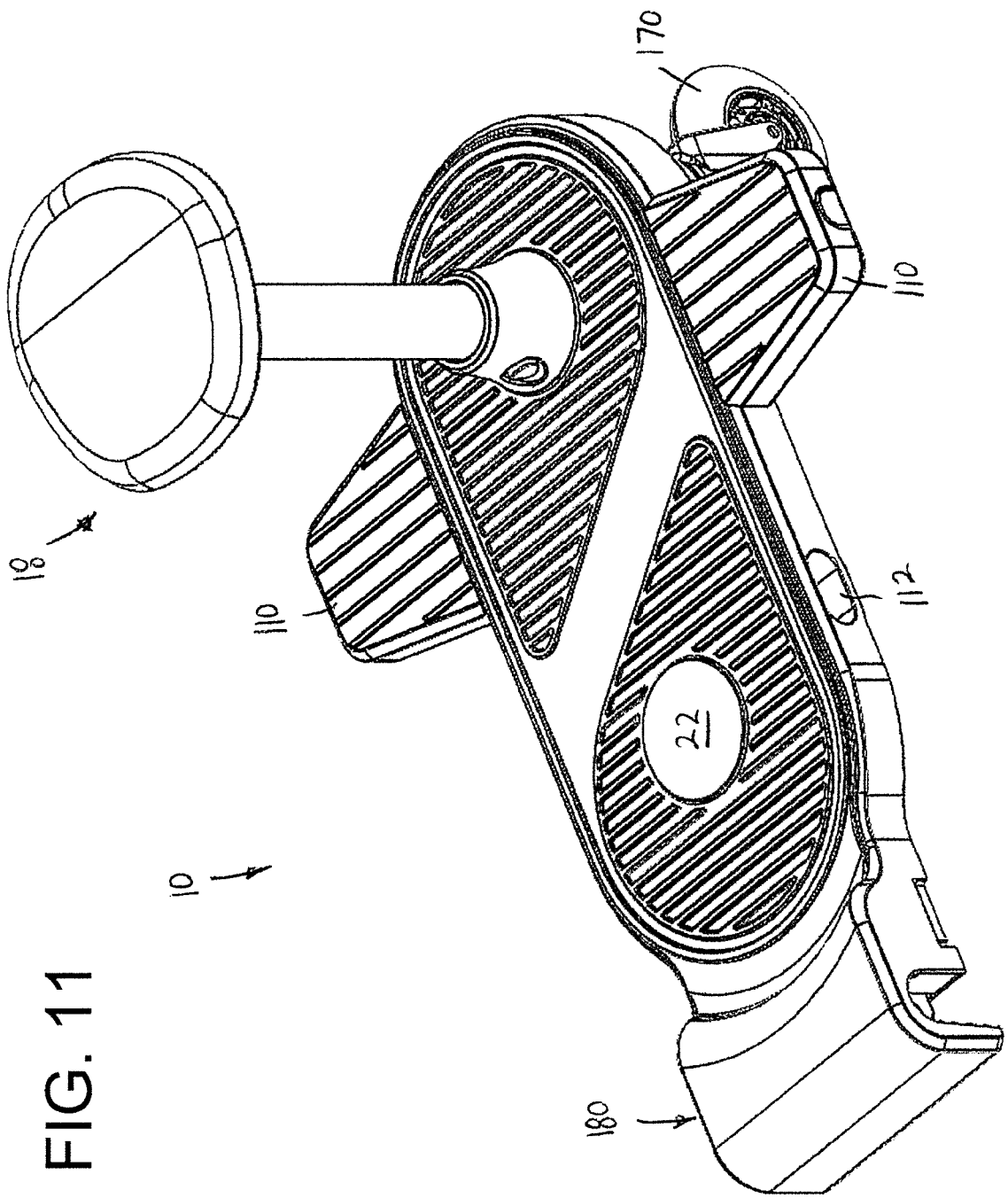
FIG. 11 is a perspective view of the standing board similar to FIG. 5, but with the wings in the rear openings thereof.
Figure 12:
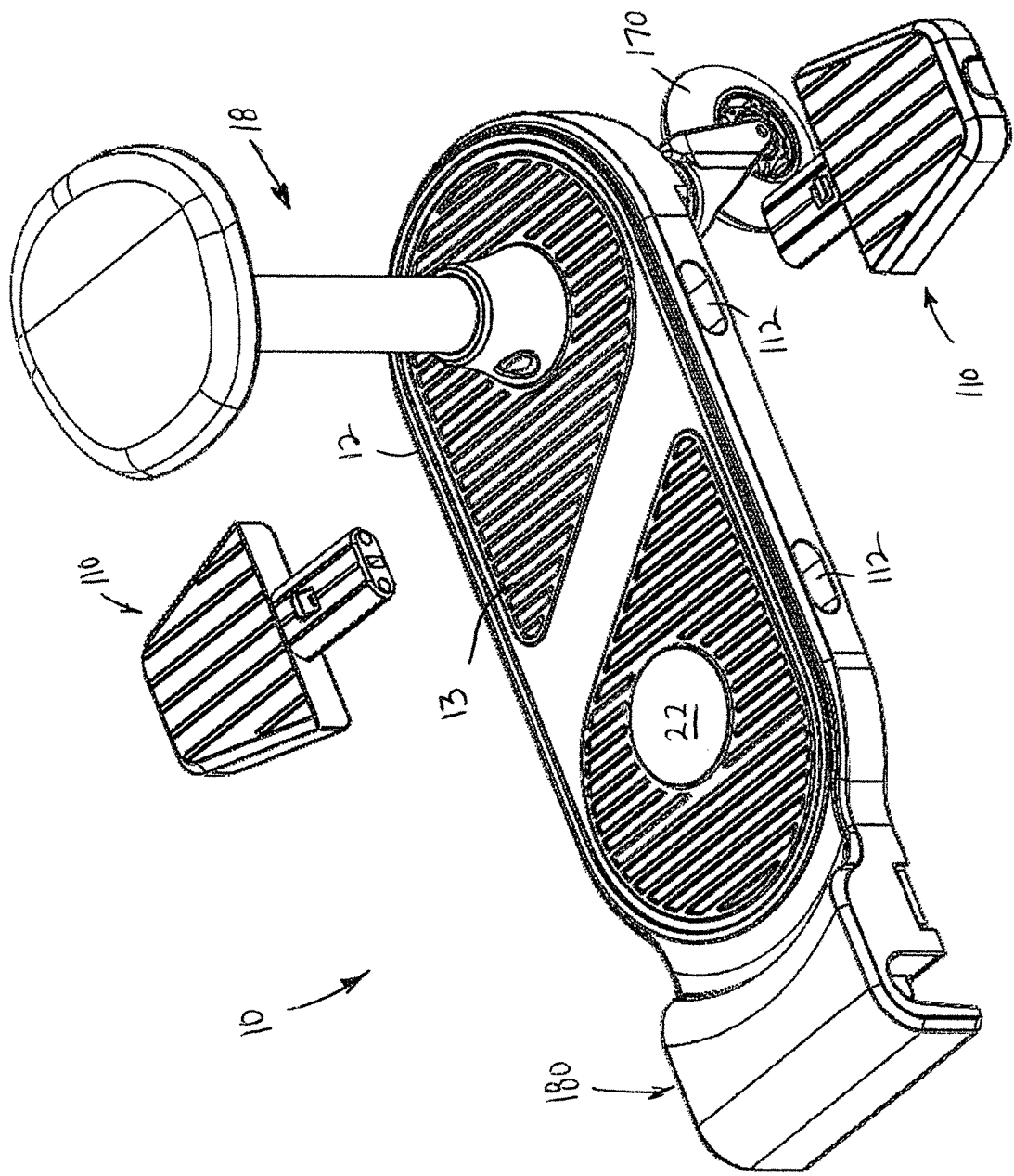
FIG. 12 is a partially exploded, perspective view of the standing board of FIG. 11, with the transverse wings removed from the rear openings.
Figure 13:
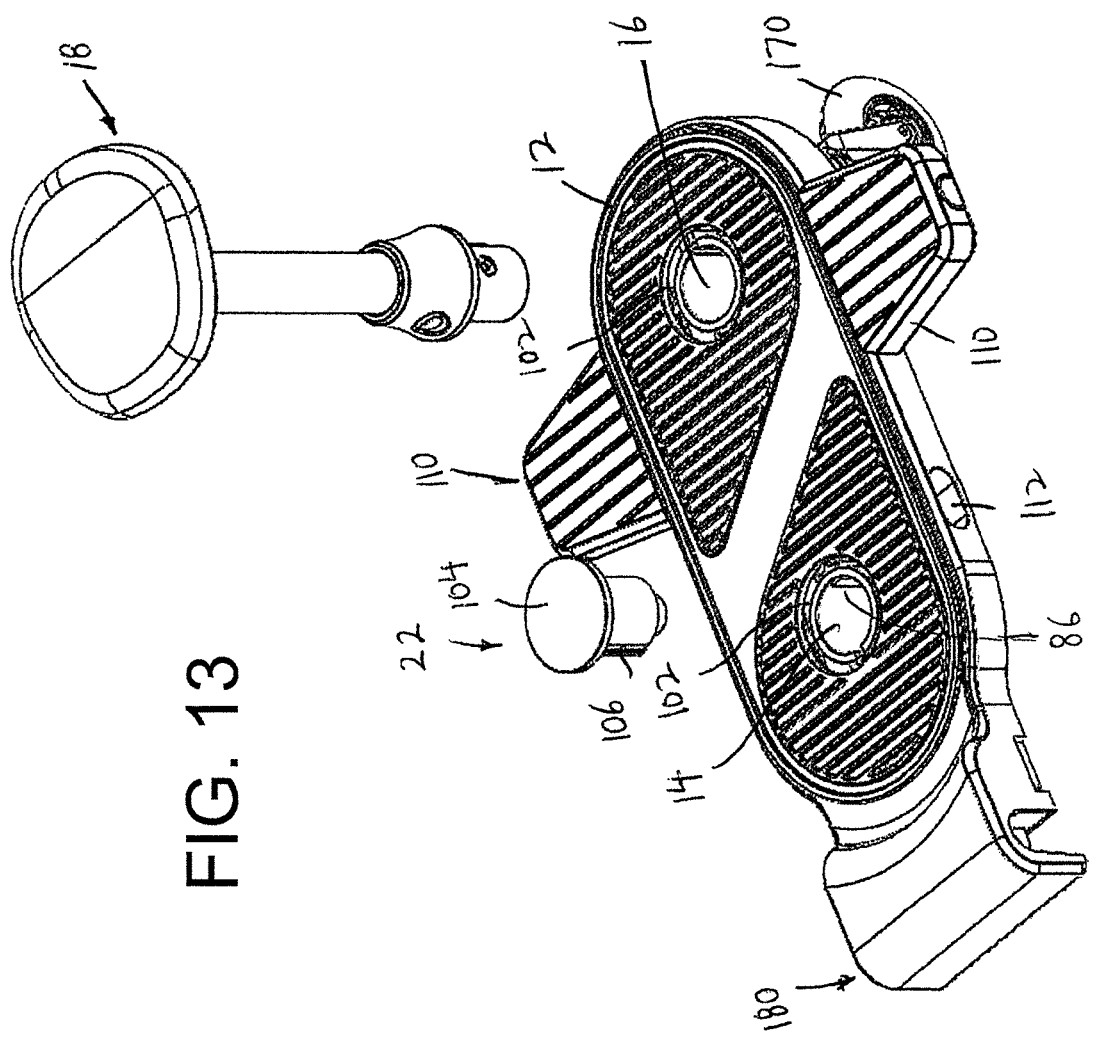
FIG. 13 is a partially exploded, perspective view of the standing board if FIG. 11, with the seat assembly and plug removed.
Figure 14:
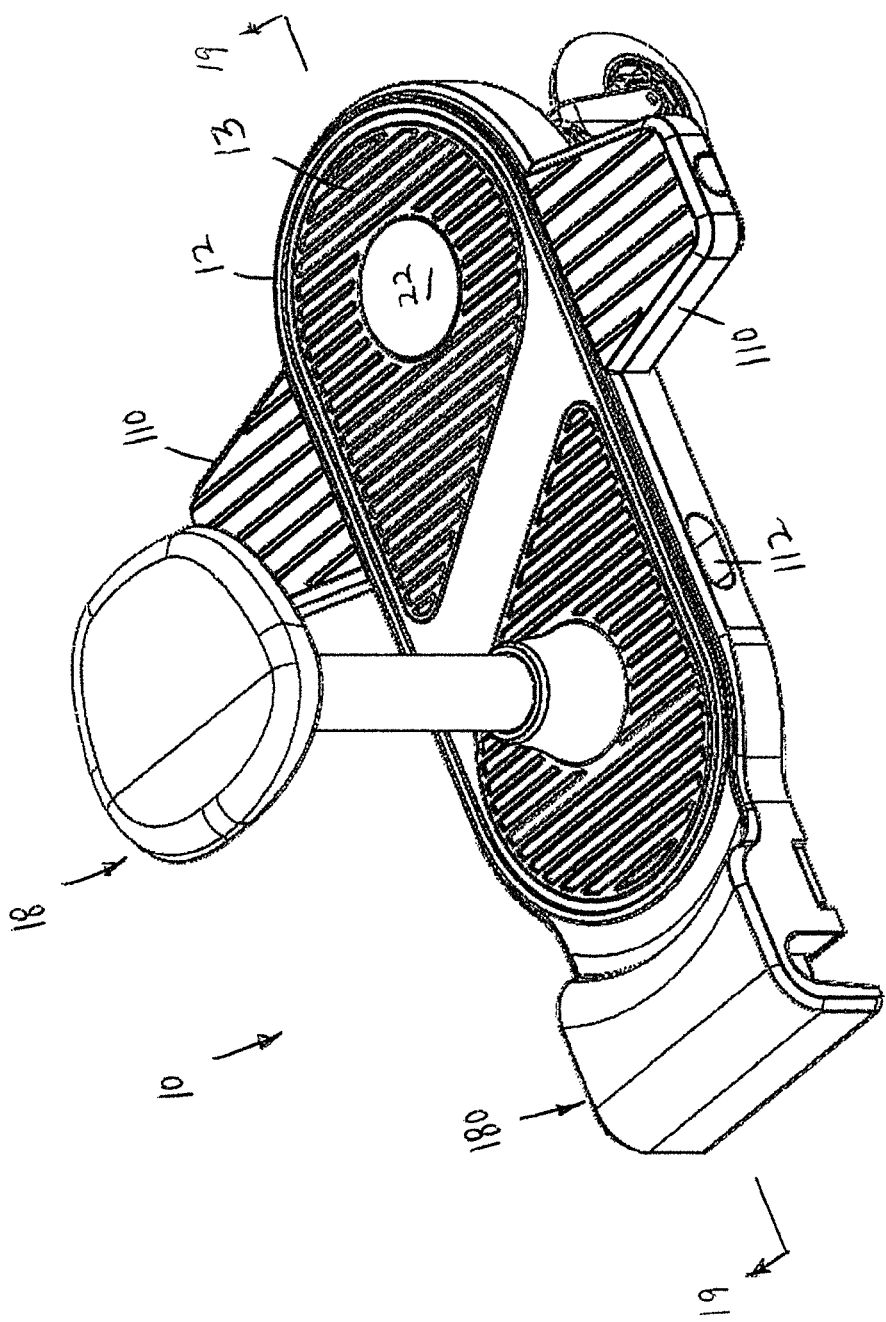
FIG. 14 is a perspective view of the standing board of FIG. 5, with the seat assembly and plug in reversed positions.
Figure 15:
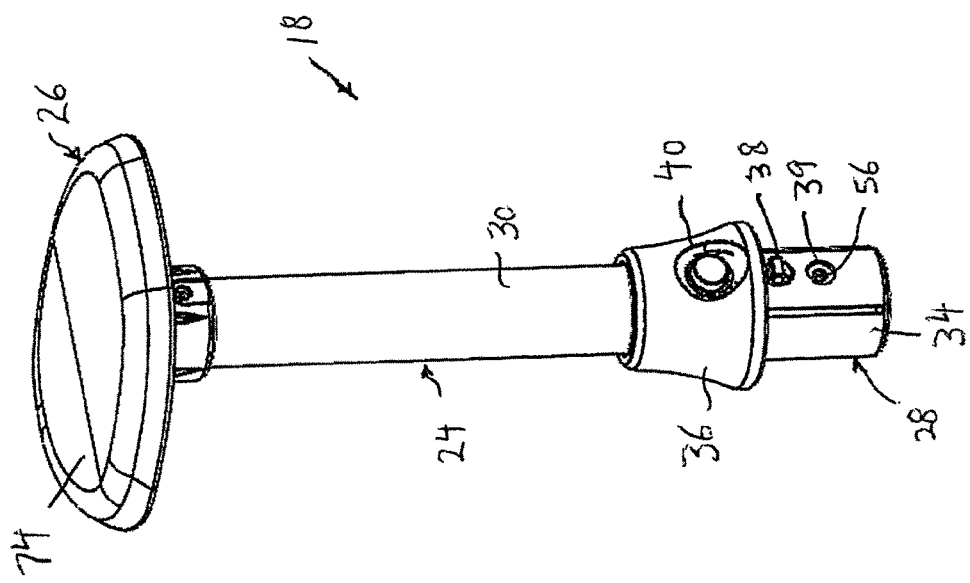
FIG. 15 is a perspective view of the seat assembly.
Figure 16:
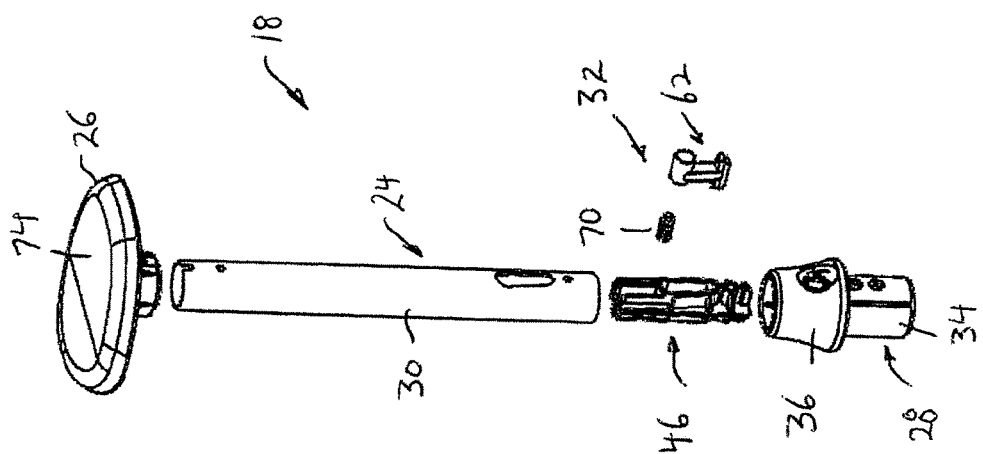
FIG. 16 is an exploded perspective view of the seat assembly.
Figure 17:
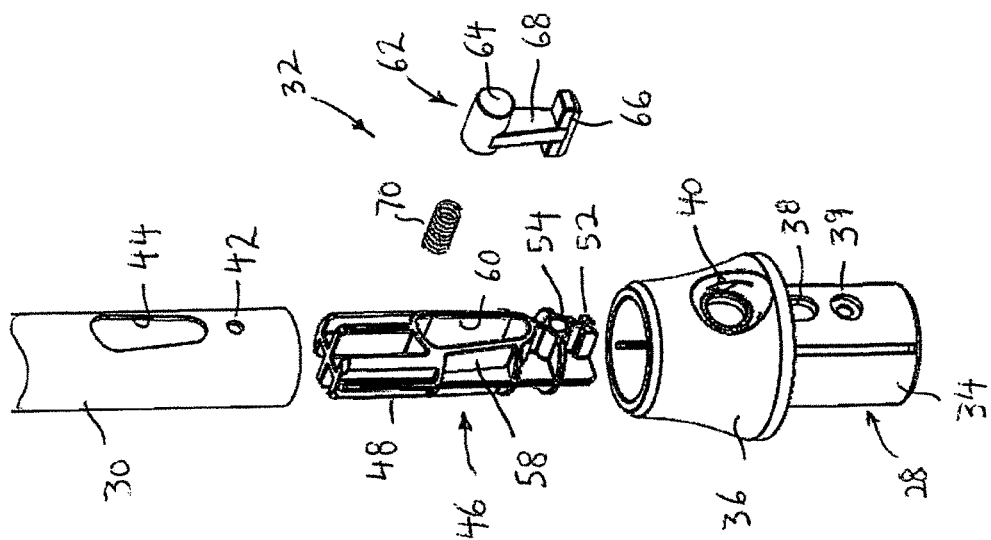
FIG. 17 is an enlarged exploded perspective of the bottom of the stem assembly of the seat assembly.
Figure 18:
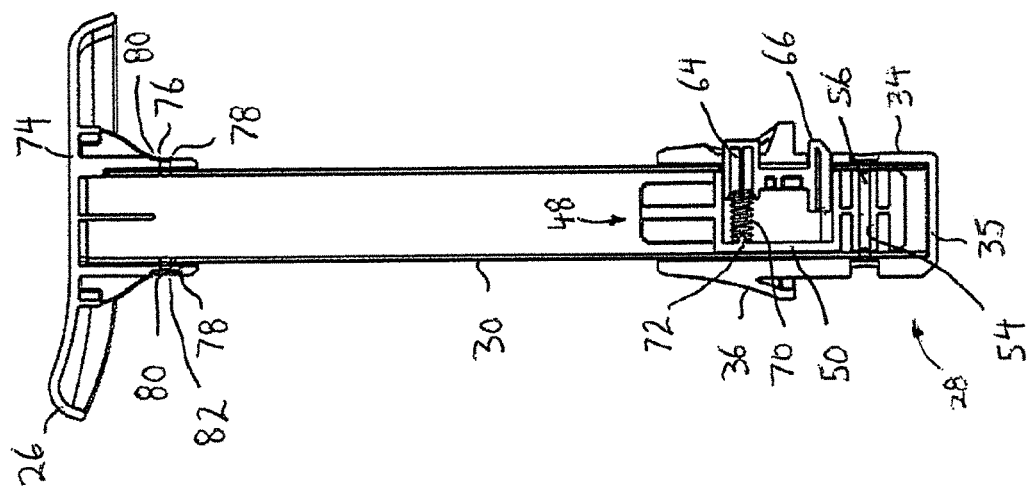
FIG. 18 is a longitudinal cross-sectional view of the seat assembly.

As shown in FIG. 2, and similar to seat assembly 18, handle 20 includes an elongated stem assembly 88 and a transverse handle bar 90 secured to an upper end of the stem assembly 88. Stem assembly 88 includes a base 92, an elongated cylindrical support tube 94 and a releasable locking mechanism which is not shown, but which is identical to releasable locking mechanism 32. Stem assembly 88 is identical to stem assembly 24, with the exception that elongated cylindrical support tube 30 is replaced by a longer elongated cylindrical support tube 94 which has an arcuate bend 98 at an approximate mid-point thereof, and seat surface 74 is replaced by transverse handle bar 90. In all other respects, elongated stem assembly 88 is identical to elongated stem assembly 24, and accordingly, a detailed description thereof is not necessary.

Thus, handle 20 is releasably positioned within either opening 14 or 16 of planar board 12 in either a forward facing direction or a rearward facing direction in the same manner as previously discussed in regard to seat assembly 18.

Alternatively, if only the assembly 18 or handle 20 are secured within one opening 14 or 16 of planar board 12, a plug 22 can be removably positioned in the other opening 14 or 16 of planar board 12. In this regard, each opening 14 or 16 has an upper annular recess 102 at the upper end thereof, as shown best in FIGS. 13 and 19. As shown best in FIG. 13, plug 22 includes a circular upper plate 104 and a short cylindrical stem 106 extending downwardly from the lower surface of upper plate 104.

In this manner, short cylindrical stem 106 is fit within the respective opening 14 or 16 with a slight friction fit, and with circular upper plate 104 seating within annular recess 102, so that the upper surface of circular upper plate 104 is substantially flush with the upper surface of planar board 12. Plug 100 can be removed by merely pushing plug 100 up from the open lower end of the respective opening 14 or 16.

Figure 20:
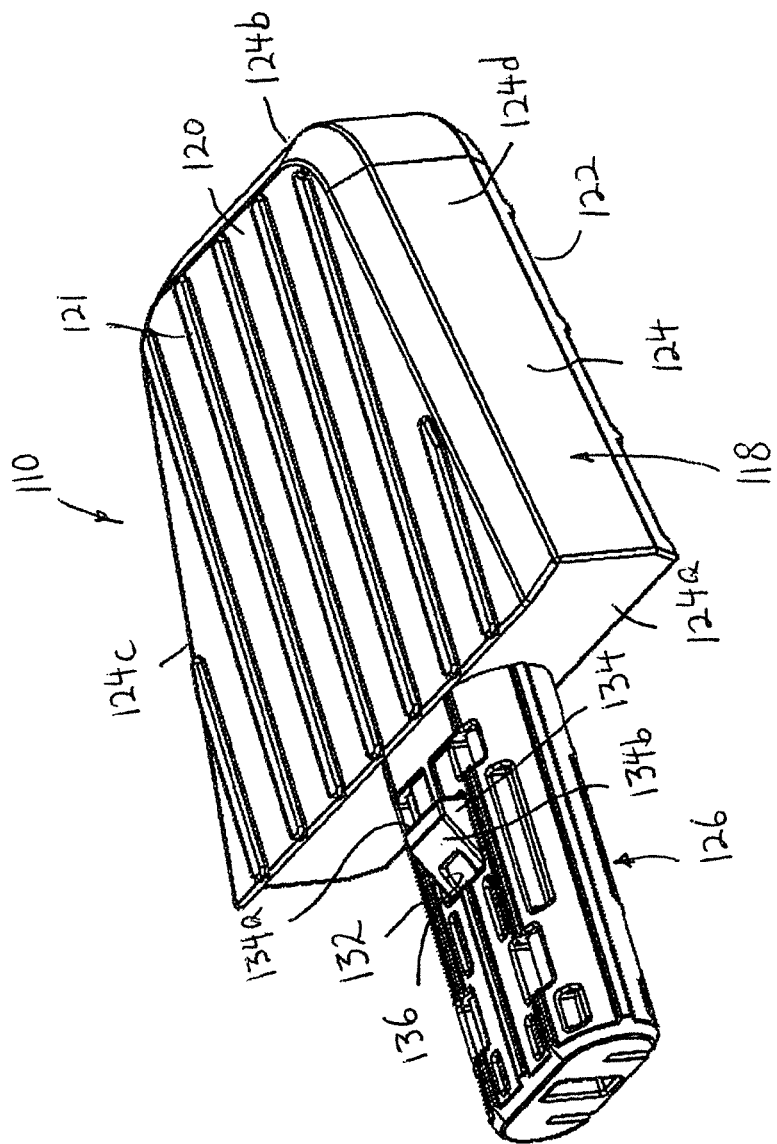
FIG. 20 is a perspective view of a trapezoidal wing.
Figure 21:
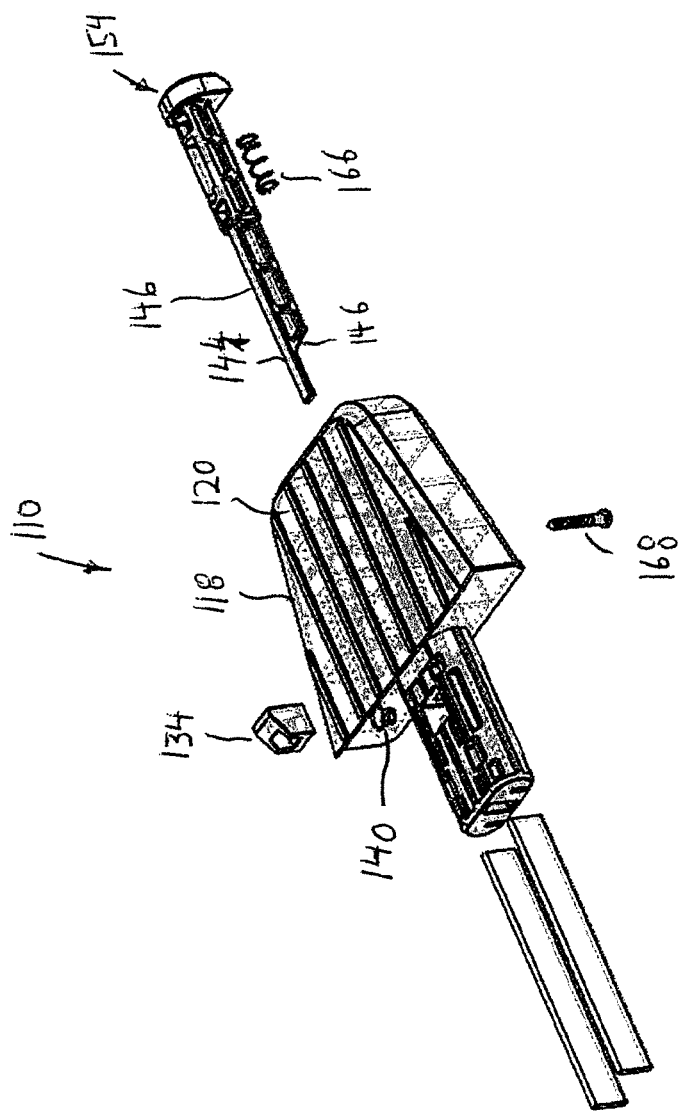
FIG. 21 is a blown apart, perspective view of the trapezoidal wing.

As shown best in FIGS. 20-22, a trapezoidal shaped wing 110 is adapted to snap fit within transverse openings 112 and 114 on opposite sides of planar board 12 to provide a wider standing area for the child, as will now be discussed. Each opening 112 and 114 is in open communication with a recess 116 (FIG. 22) at an upper end of each opening 112 and 114 in planar board 12.

Wing 110 has a solid main body 118 of a generally trapezoidal shape with a trapezoidal shaped upper standing surface 120 with ribs 121 for a non-slip surface, a trapezoidal shaped lower surface 122 and a sidewall 124 connected between upper surface 120 and lower surface 122. Sidewall 124 includes an inner surface 124a, an outer surface 124b and two side surfaces 124c and 124d which connect together inner surface 124a and outer surface 124b.

A securing stem 126 is formed as a unitary body with main body 118 and extends rearwardly from the inner surface 124a. Securing stem 126 is centrally positioned on inner surface 124a and has a widthwise dimension much less than that of inner surface 124a.

An elongated bore 128 extends through main body 118 and stem 126, and is open at an opening 130 in outer surface 124b. Elongated bore 128 includes a first bore portion 128a which extends rearwardly from opening 130 to a position about two-thirds of the way toward inner surface 124a, and a second bore portion 128b in communication with first bore portion 128a and continuing rearwardly through a portion of securing stem 126. As a result, an annular shoulder 128c is defined between first bore portion 128a and second bore portion 128b. The upper surface of securing stem 126 further includes a catch opening 132 which extends down into communication with second bore portion 128b. Catch opening 132 is in alignment with recess 116 when stem 126 is fully positioned within a respective opening 112 or 114.

A catch 134 extends through catch opening 132 and is vertically slidable therein. Catch 134 includes a forward catch surface 134a and an upper ramp surface 134b which extends downwardly and rearwardly from the upper end of forward catch surface 134a. A transverse through bore 136 extends through the center of catch 134, thereby defining a lower biasing surface 138 of through bore 136, the purpose for which will be apparent from the discussion hereafter. A coil spring 140 normally biases catch 134 upwardly in a direction out of catch opening 132. As such, catch surface 134a is normally biased out of catch opening 132, as shown best in FIGS. 20 and 22.

Thus, when securing stem 126 is inserted in a side opening 112 or 114 of standing board 10, upper ramp surface 134b abuts against the upper wall defining the respective opening 112 or 114, and rides therealong, whereby catch 134 is biased downwardly into securing stem 126 against the force of coil spring 140. Once securing stem 126 is fully inserted into the respective side opening 112 or 114, whereby catch 134 is in alignment with upper recess 116, coil spring 140 biases catch 134 upwardly into upper recess 116, whereby forward catch surface 134a engages with a side surface of upper recess 116, thereby preventing escape of securing stem 126 from the respective side opening 112 or 114. In this position, the trapezoidal shaped upper standing surface 120 is coplanar with the upper surface of planar board 12.

In order to remove trapezoidal shaped wing 110 from the respective side opening 112 or 114, a release rod 142 is slidably positioned within second bore portion 128b. Release rod 142 has dimensions similar to that of second bore portion 128b, so as to be slidable within second bore portion 128b without any wobble or play. Release rod 142 tapers down to a reduced dimension end 144 via a tapered wedging surface 146. Reduced dimension end 144 extends through transverse through bore 136 of catch 134 along with a portion of wedging surface 146. Wedging surface 146 is in contact with lower biasing surface 138 defining transverse through bore 136.

Figure 22:
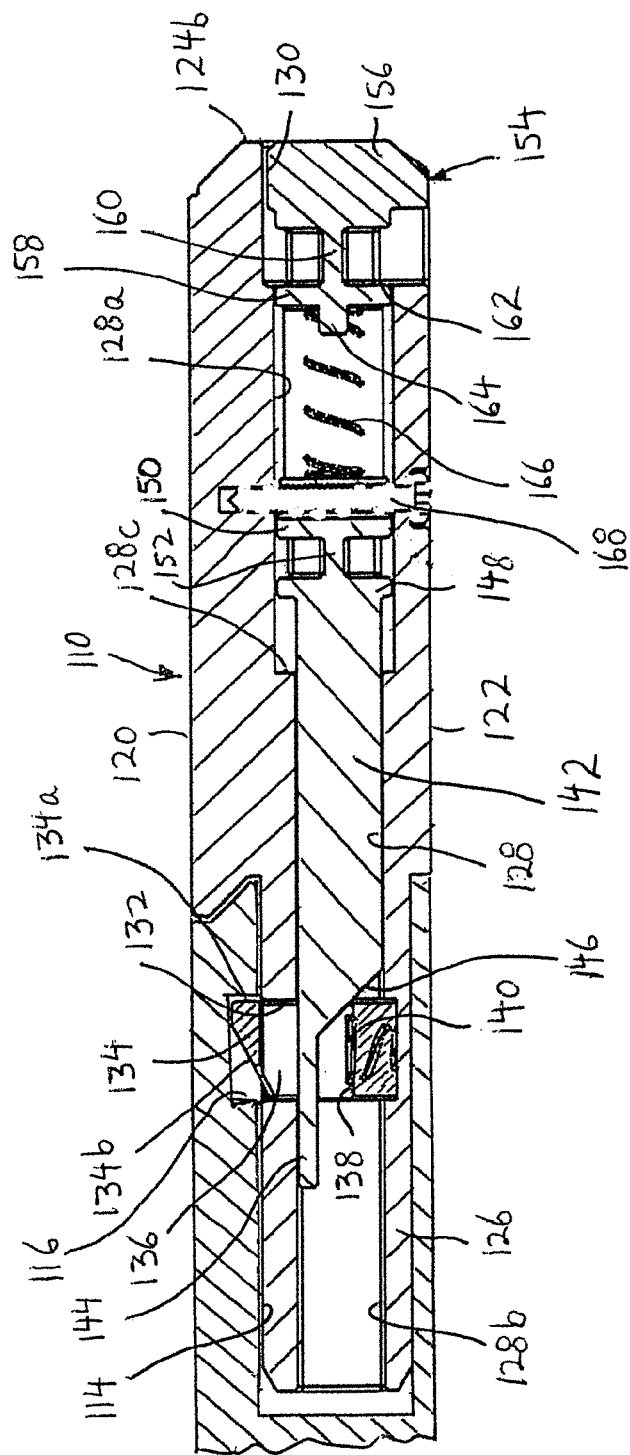
FIG. 22 is cross-sectional view of the trapezoidal wing secured in the planar board of the standing board.
Figure 23:
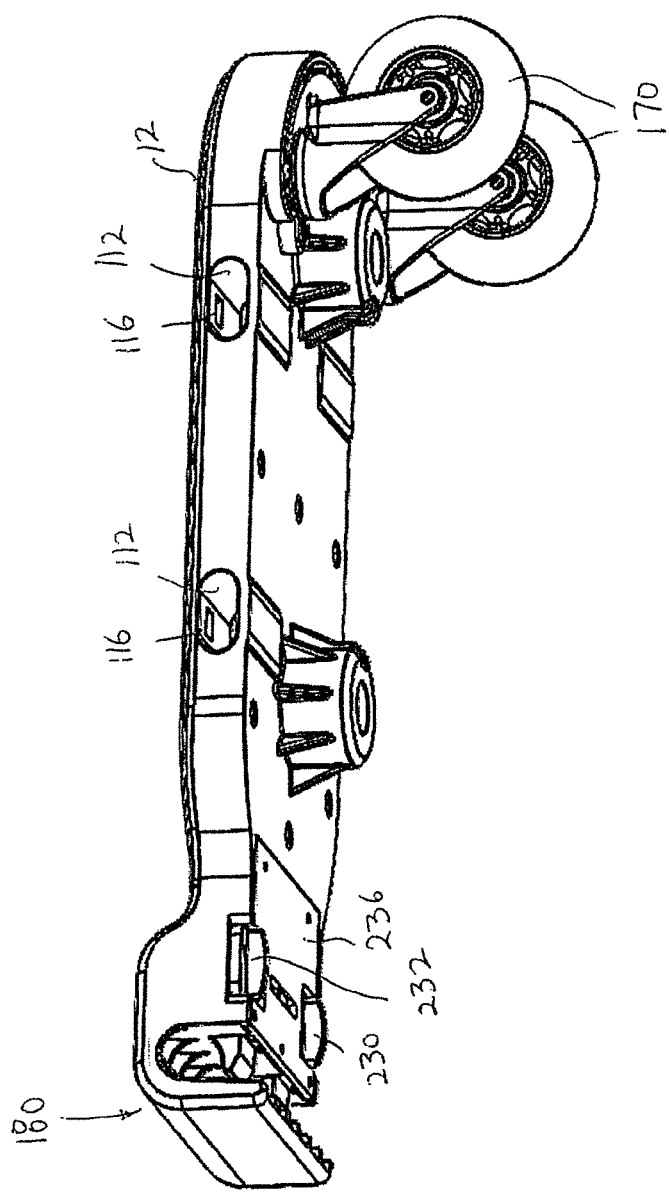
FIG. 23 is a bottom perspective view of the standing board.
Figure 24:
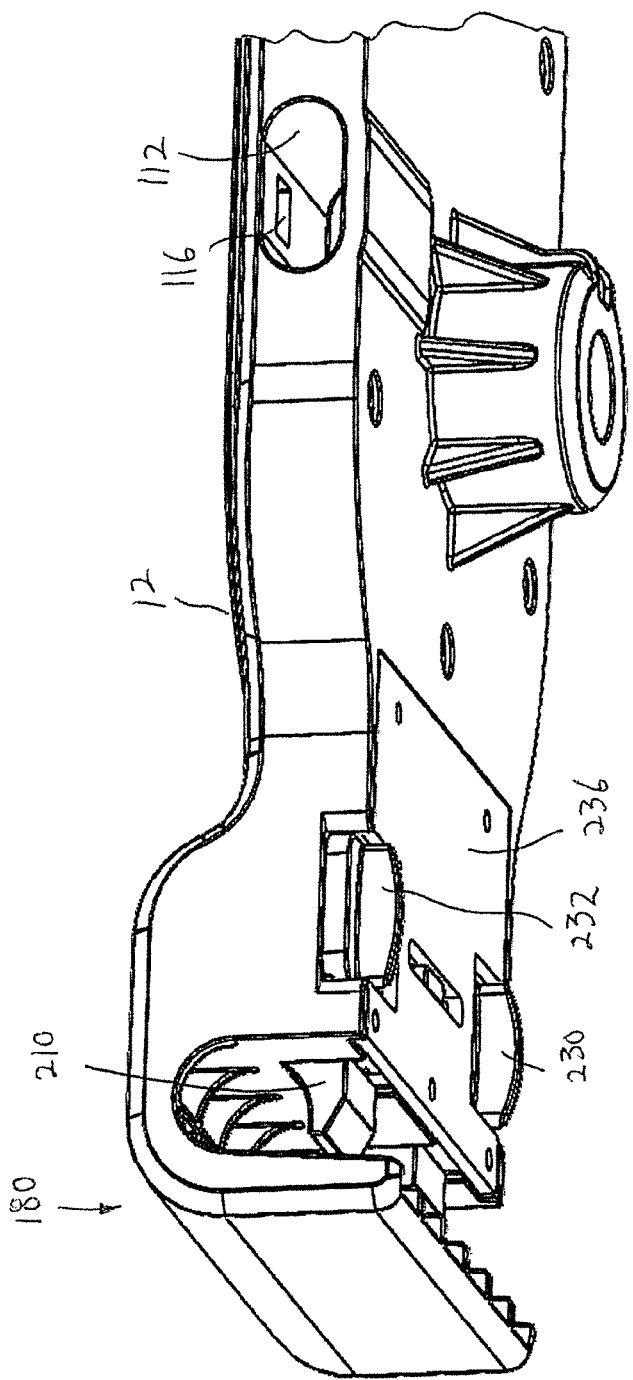
FIG. 24 is an enlarged bottom perspective view of the front end of the standing board.
Figure 25:
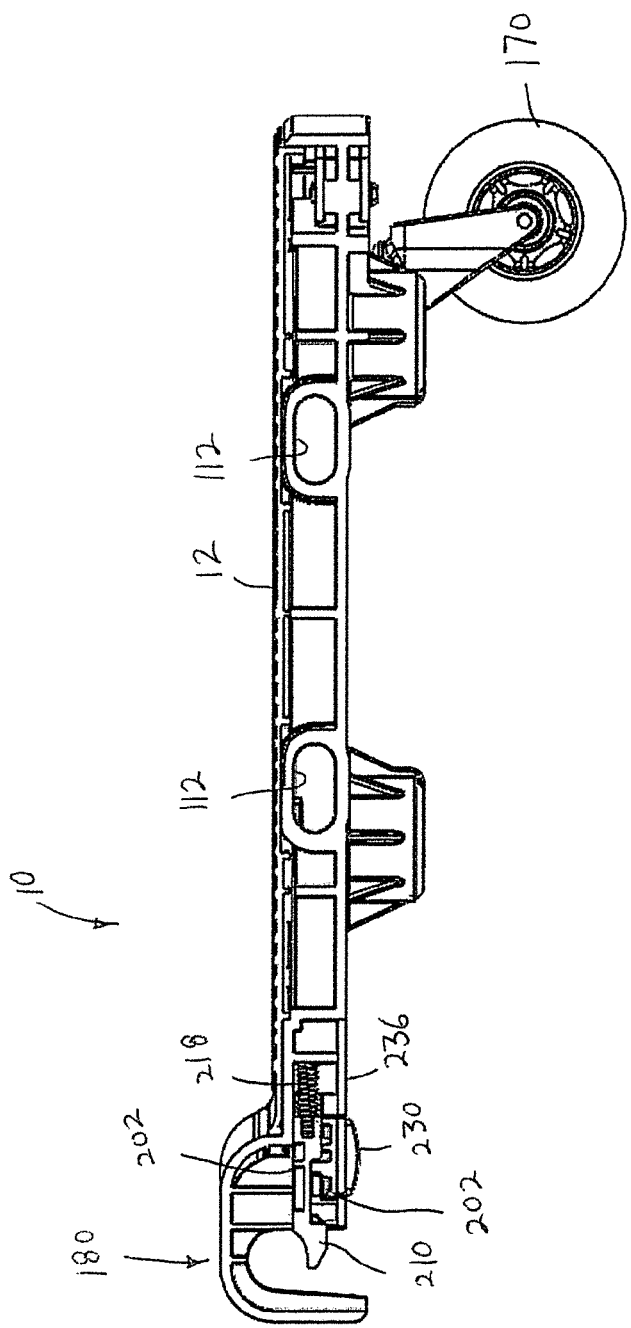
FIG. 25 is a cross-sectional view of the standing board of FIG. 8, with the seat and plug removed, taken along line 25-25 of FIG. 8.
Figure 26:
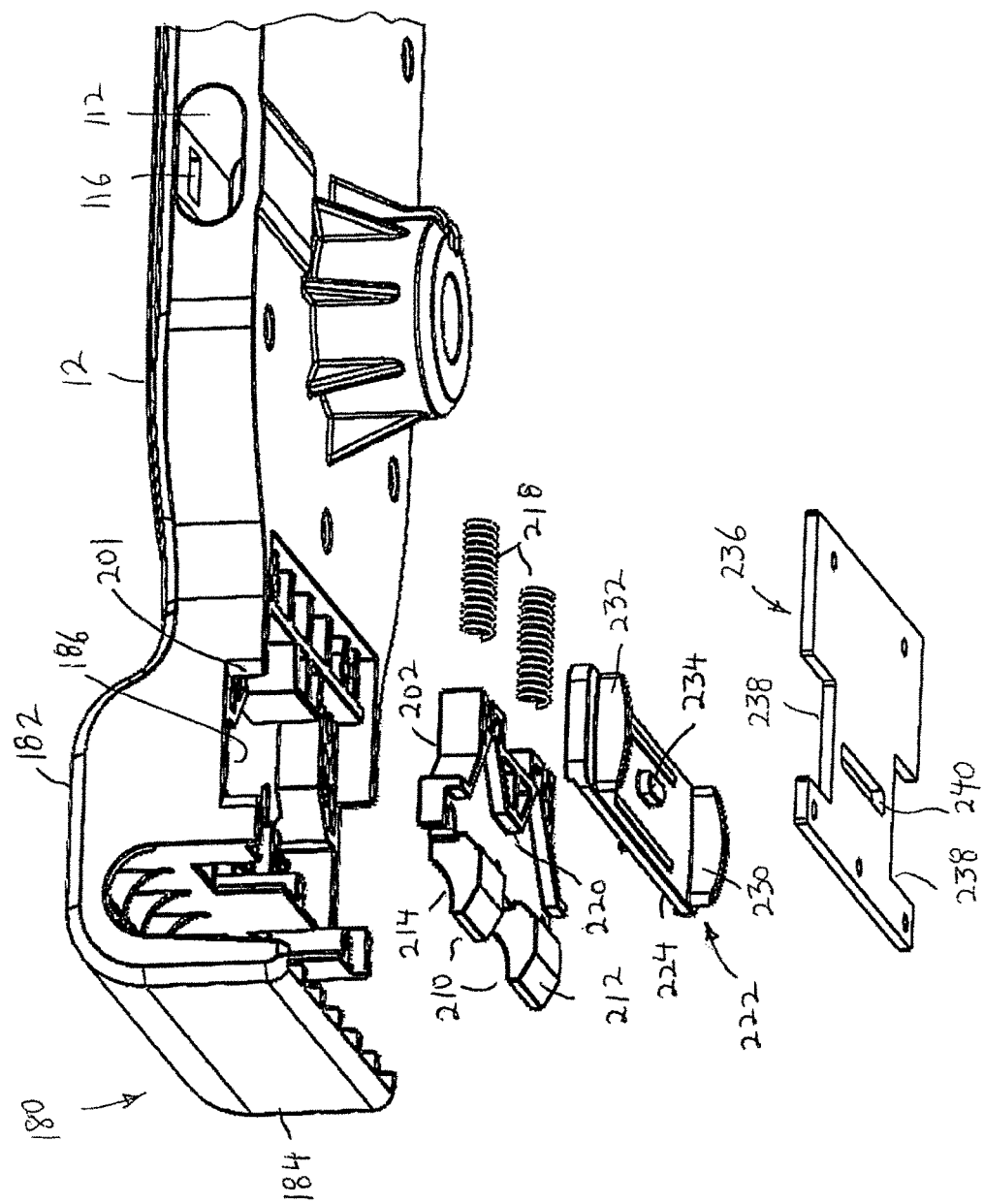
FIG. 26 is an exploded bottom perspective view of the front end of the standing board.
Figure 27:
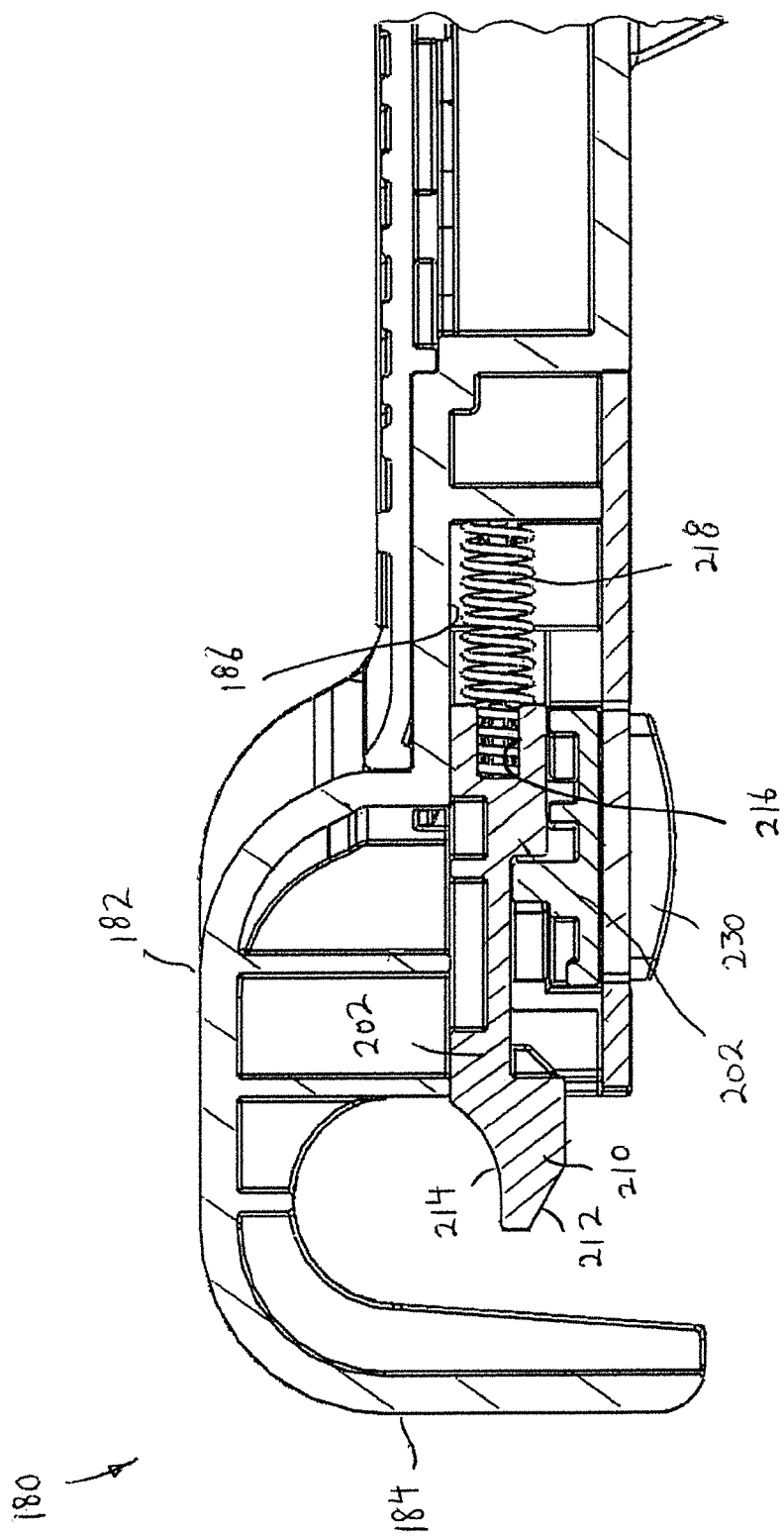
FIG. 27 is a cross-sectional view of the front end of the standing board, taken along line 25-25 of FIG. 8.
Figure 28:
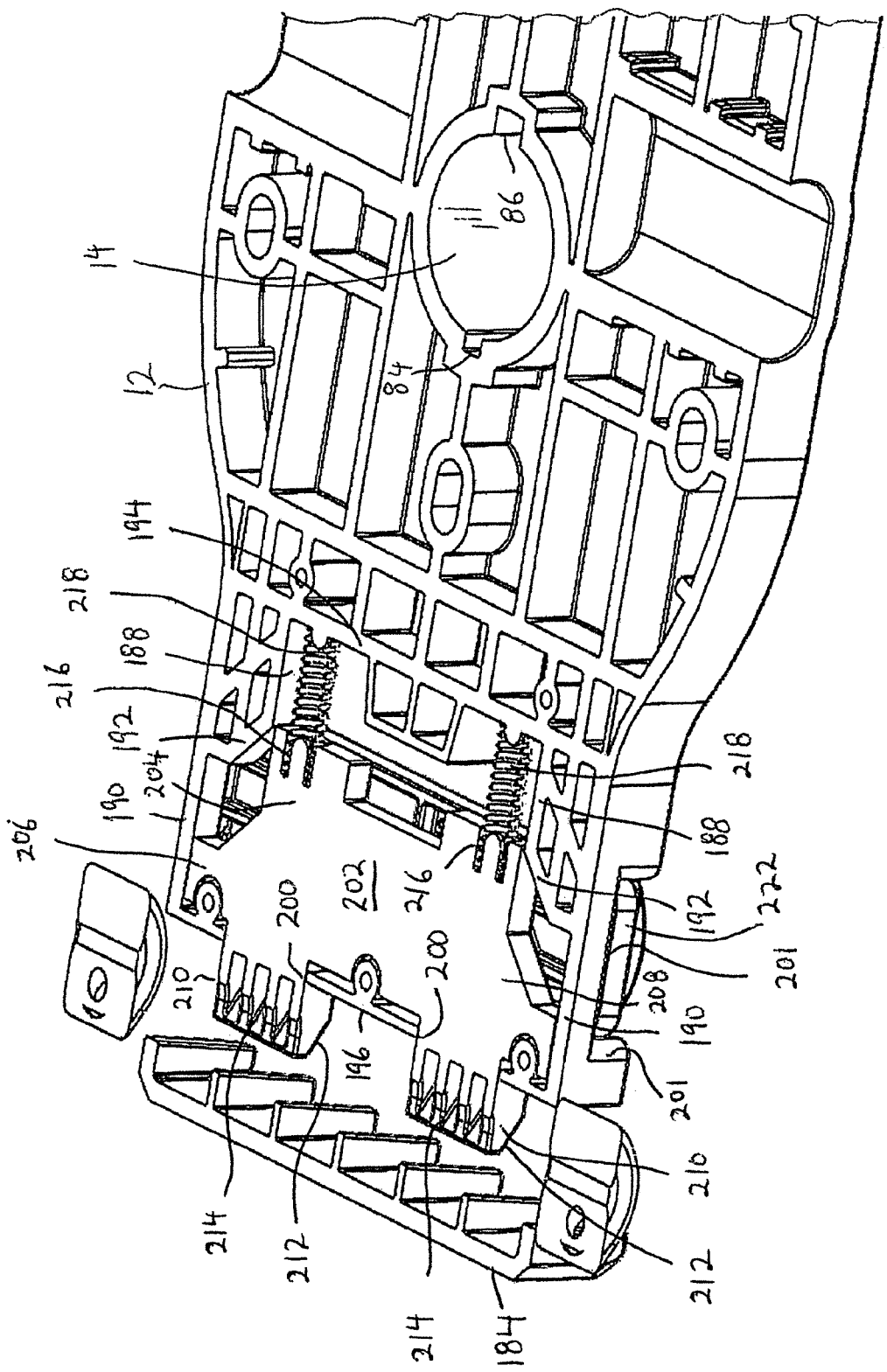
FIG. 28 is a transverse cross-sectional view of the front end of the standing board, taken along line 28-28 of FIG. 6, with the fingers extended into the hook member.
Figure 29:
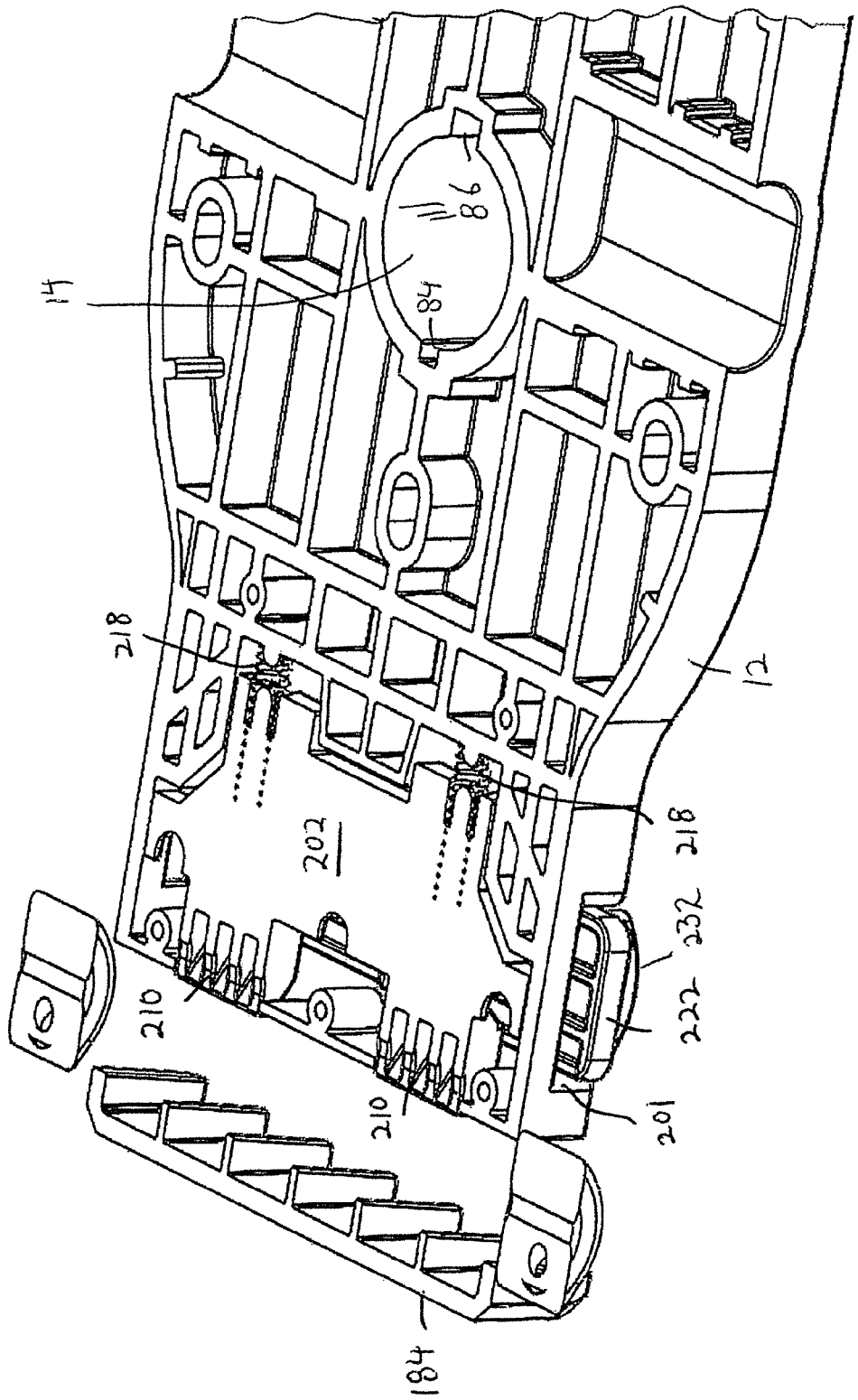
FIG. 29 is a cross-sectional view of the front end of the standing board, taken along line 28-28 of FIG. 6, with the fingers retracted from the hook member.

The opposite end of release rod 142 is provided with a larger diameter flange 148 that abuts against annular shoulder 128c when release rod 142 is moved to the left in FIG. 22, to limit the movement of release rod 142.

In this regard, when release rod 142 is moved to the left in FIG. 22, wedging surface 146 hits against lower biasing surface 138 in order to move catch 134 downwardly against the force of coil spring 140 such that the upper end of catch 134 is positioned at or below the upper surface of securing stem 126, whereby trapezoidal shaped wing 110 can be removed from the respective opening 112 or 114.

In order to move release rod 142 to the left in FIG. 22, a biasing disk 150 is connected with larger diameter flange 148, in parallel, spaced relation therefrom, by a connecting wall 152.

An actuator 154 is slidably provided within first bore portion 128a at opening 130, and includes a pushbutton 156. A retaining disk 158 having outer dimensions similar to that of first bore portion 128a is connected with the rear surface of pushbutton 156 by a connecting wall 160. First bore portion 128a is provided with an annular retaining wall 162 spaced slightly in from opening 130, behind which retaining disk 158 is positioned to prevent the escape of actuator 154, while still allowing actuator 154 to be pushed inwardly of first bore portion 128a. The opposite surface of retaining disk 158 is provided with a positioning projection 164 centrally and axially thereof.

A coil spring 166 has one end abutting against the opposite surface of retaining disk 158 in surrounding relation to a positioning projection 164 thereof, and the opposite end in contact with biasing disk 150. It will be appreciated that the spring force of coil spring 140 is greater than that of coil spring 166, such that, in the absence of a biasing force, catch 134 is biased upwardly out of opening 130. Release rod 142 is thereby biased to the right, as shown in the position in FIG. 22, against the force of coil spring 166, which thereby also biases actuator 154 to the right in FIG. 22. In this position, retaining disk 158 abuts against annular retaining wall 162.

To release the respective trapezoidal shaped wing 110, a person pushes in pushbutton 156, whereby coil spring 166 is compressed, resulting in a biasing movement of release rod 142 to the left in FIG. 22. As a result, wedging surface 146 biases catch 134 downwardly against the force of coil spring 140, whereby trapezoidal shaped wing 110 can be removed.

As an alternative, rather than manufacturing trapezoidal shaped wing 110 as a unitary, one-piece body, it can be formed with trapezoidal shaped upper standing surface 120 and trapezoidal shaped lower surface 122 as separate pieces, connected together by respective screws 168, as shown in dashed lines in FIG. 22.

Standing board 10 includes two spaced apart caster wheels 170 secured in spaced transverse relation to the underside of elongated planar board 12 at the rear end thereof.

Referring now to FIGS. 23-31, standing board 10 further includes a releasable stroller attachment 180 extending from the front end of elongated planar board 12. Releasable stroller attachment 180 includes a main body 182 having a generally rectangular cuboid shape with a downwardly opening hook member 184 extending forwardly therefrom.

Main body 182 includes a cavity 186 that is open at the underside of main body 182, and which is in open communication with hook member 184. As shown best in FIG. 28, cavity 186 is defined by parallel, spaced apart rear walls 188 extending in the lengthwise direction of planar board 12, parallel, spaced apart front walls 190 extending in the lengthwise direction of planar board 12 and spaced apart tapered walls 192 that interconnect the front end of rear walls 188 and the rear end of front walls 190. The spacing between rear walls 188 is less than the spacing between front walls 190 so that tapered walls 190 taper outwardly from rear walls 188 to front walls 190. Cavity 186 is further defined by a rear transverse wall 194 that interconnects the rear ends of rear walls 188 and a front transverse wall 196 that interconnects the front ends of front walls 190. Front wall 196 further includes two spaced apart openings 200 that provide communication between cavity 186 and hook member 184.

In addition, main body 182 includes recessed side openings 201 that extend through front walls 190 and tapered walls 192.

A catch slide member 202 is slidably received in cavity 186 for sliding movement in directions rearwardly and forwardly of planar board 12. Catch slide member 202 includes a rear section 204 of a first width, a front section 206 of a second greater width and a tapered intermediate section 208 which interconnects rear section 204 with front section 206. In this regard, rear section 204 is slidably guided between parallel, spaced apart rear walls 188, while front section 206 is slidably guided between parallel, spaced apart front walls 190, for movement in directions rearwardly and forwardly of planar board 12.

Catch slide member 202 further includes two spaced apart fingers or catches 210 extending forwardly from the front edge of front section 206, in alignment with spaced apart openings 200. Each finger 210 includes a lower beveled or inclined surface 212 at the lower distal end, with the corresponding upper distal surface 214 being concave in order to receive the axle thereon.

In addition, the rear edge of rear section 204 includes two spaced apart recesses 216. Two coil springs 218 are provided, each having one end extending within a respective recess 216 and the other end in engagement with rear transverse wall 194 in order to normally bias catch slide member 202 forwardly such that fingers 210 extend through openings 200 into hook member 184.

Figure 32:
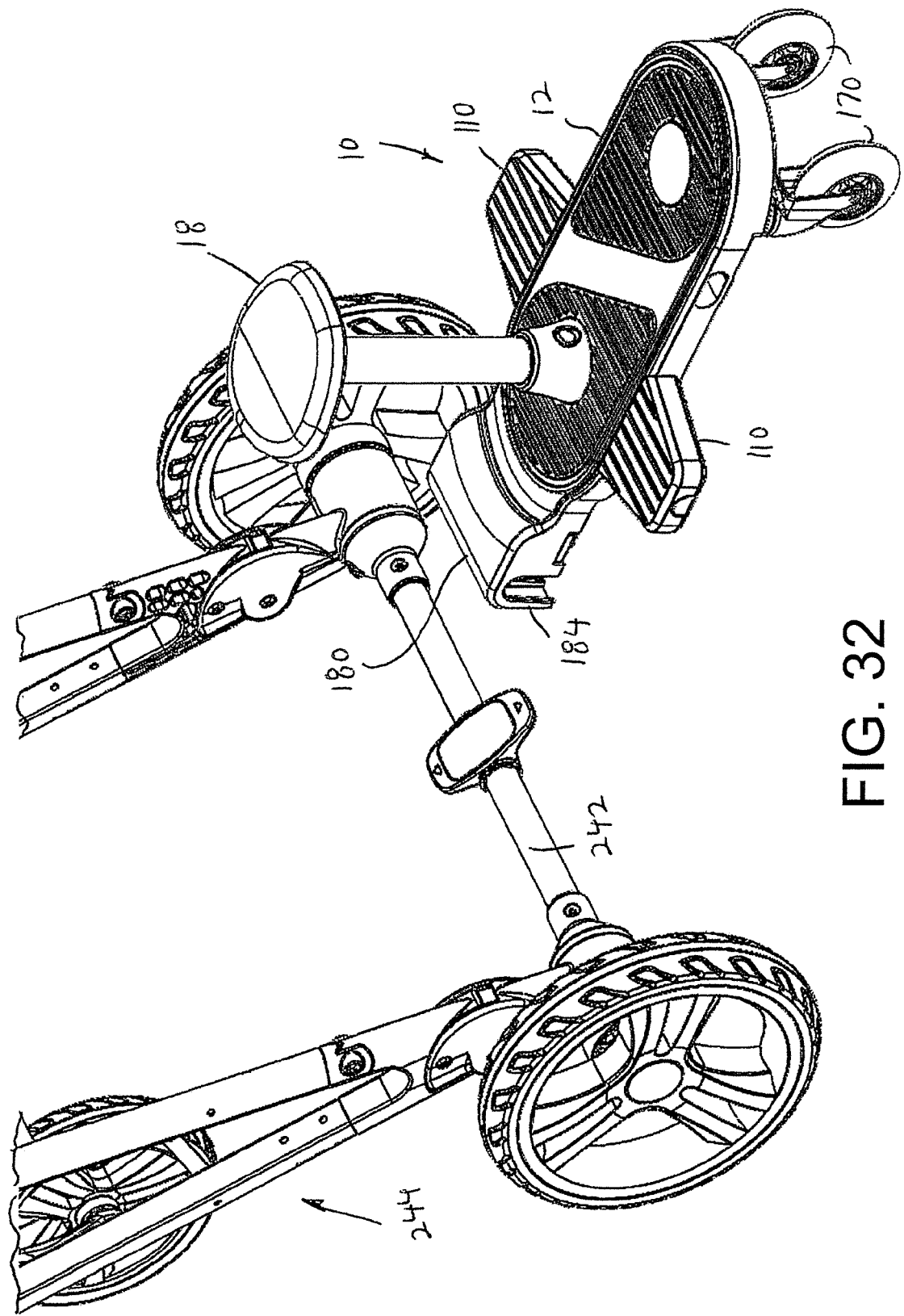
FIG. 32 is a perspective view of the standing board approaching the rear axle of a stroller.
Figure 33:
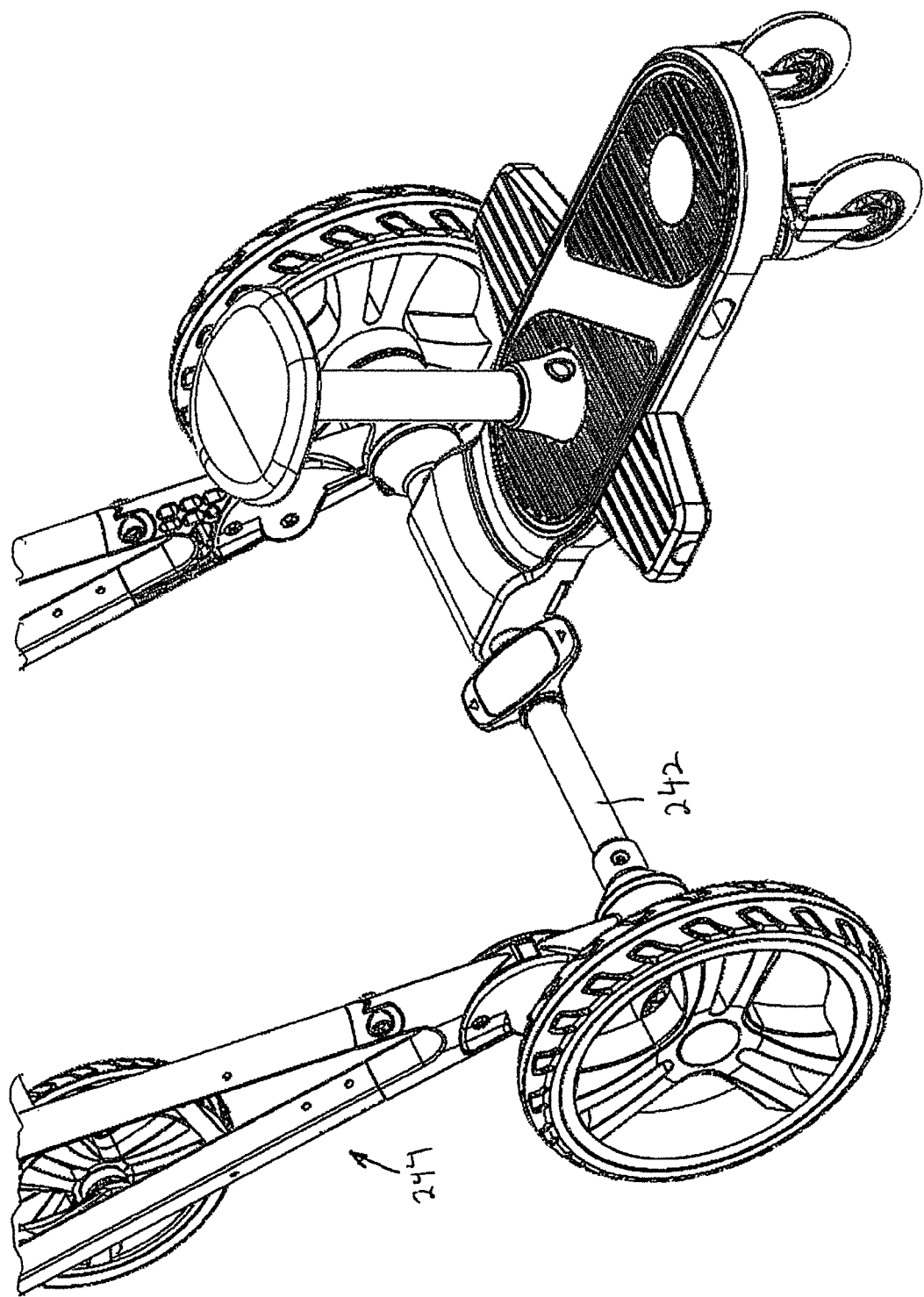
FIG. 33 is a perspective view of the releasable stroller attachment of the standing board attached to the rear axle of a stroller.
Figure 34:
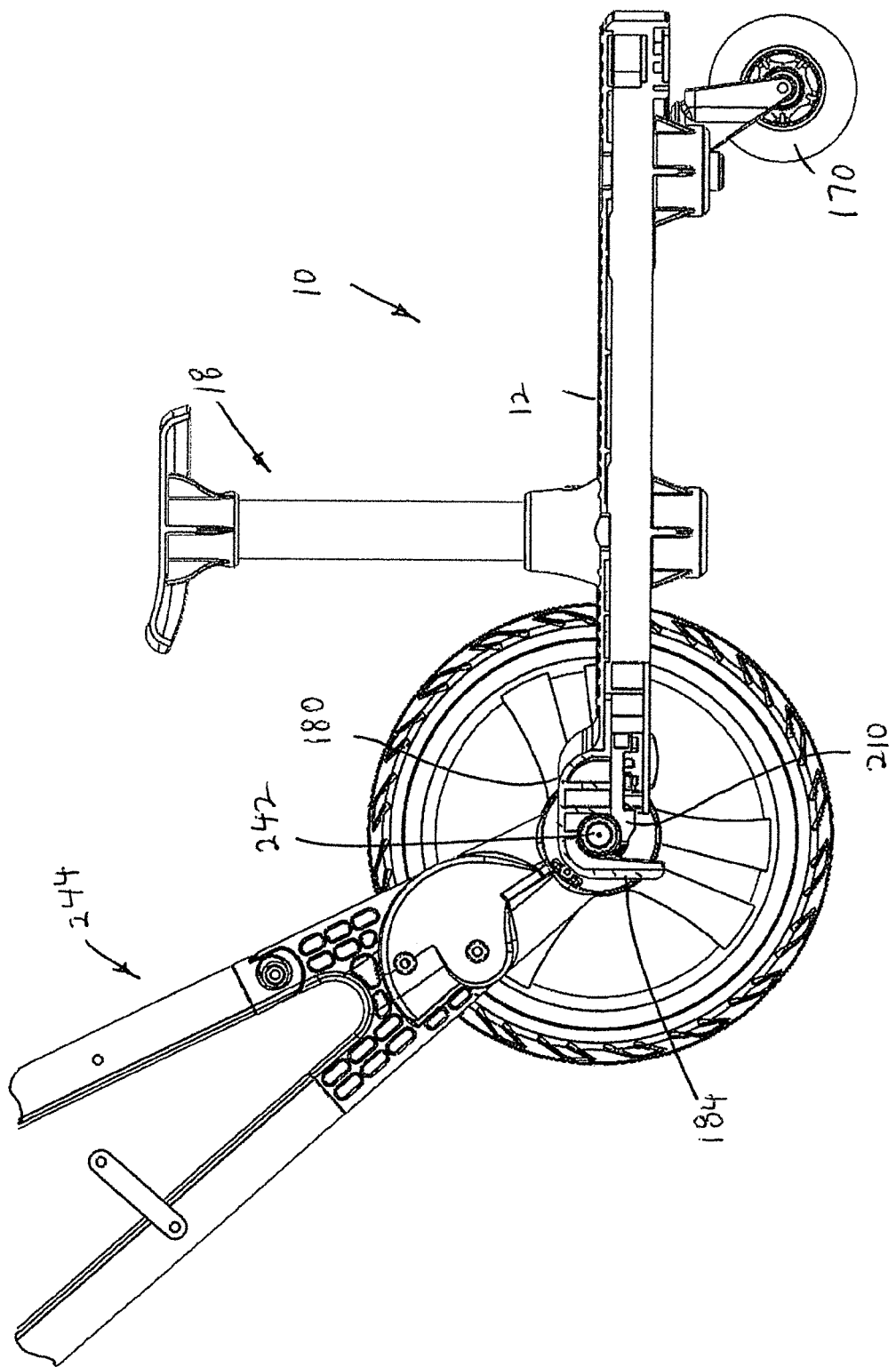
FIG. 34 is a cross-sectional view of FIG. 33.
Figure 35:
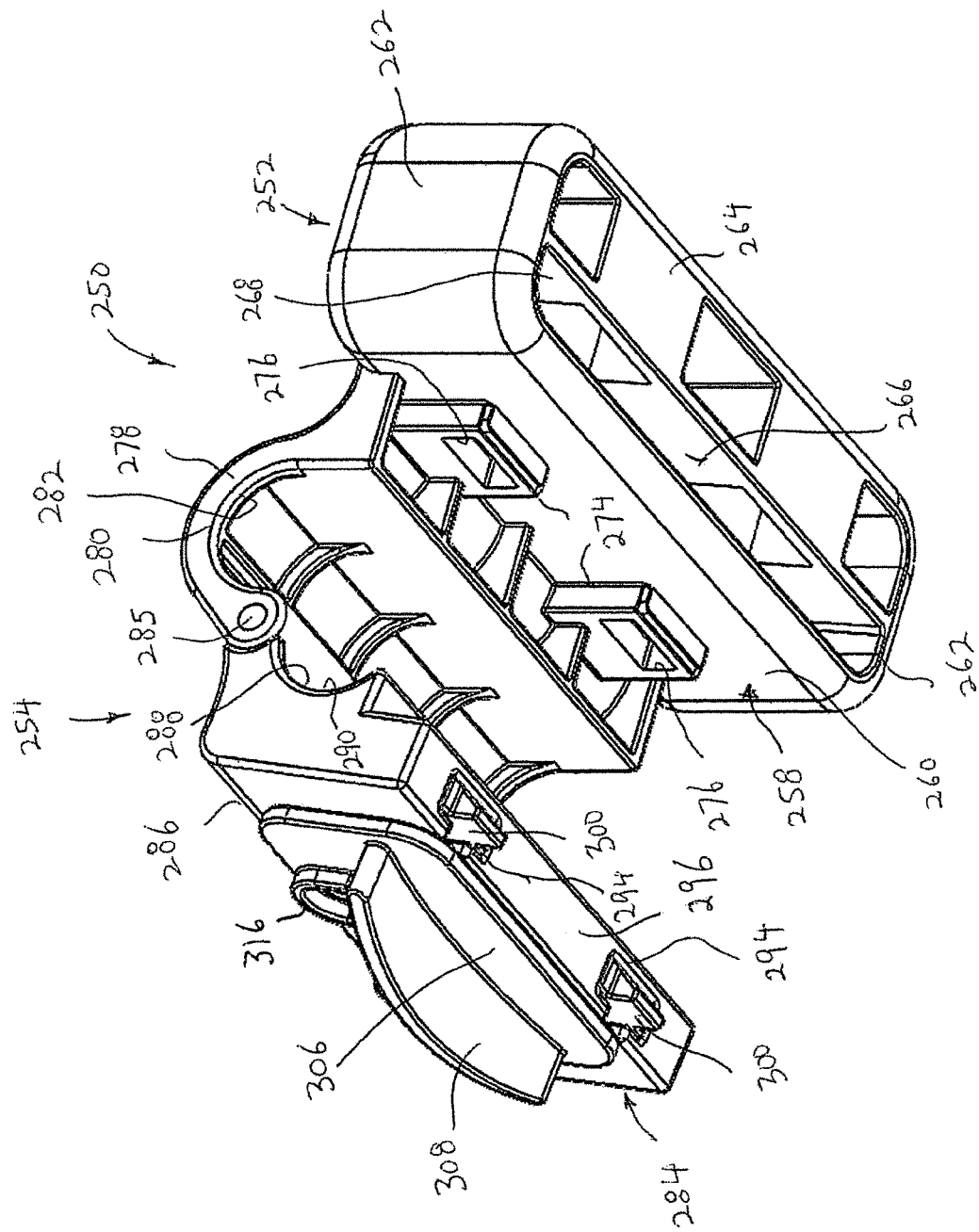
FIG. 35 is a bottom perspective view of the axle attachment device in an open position.
Figure 36:
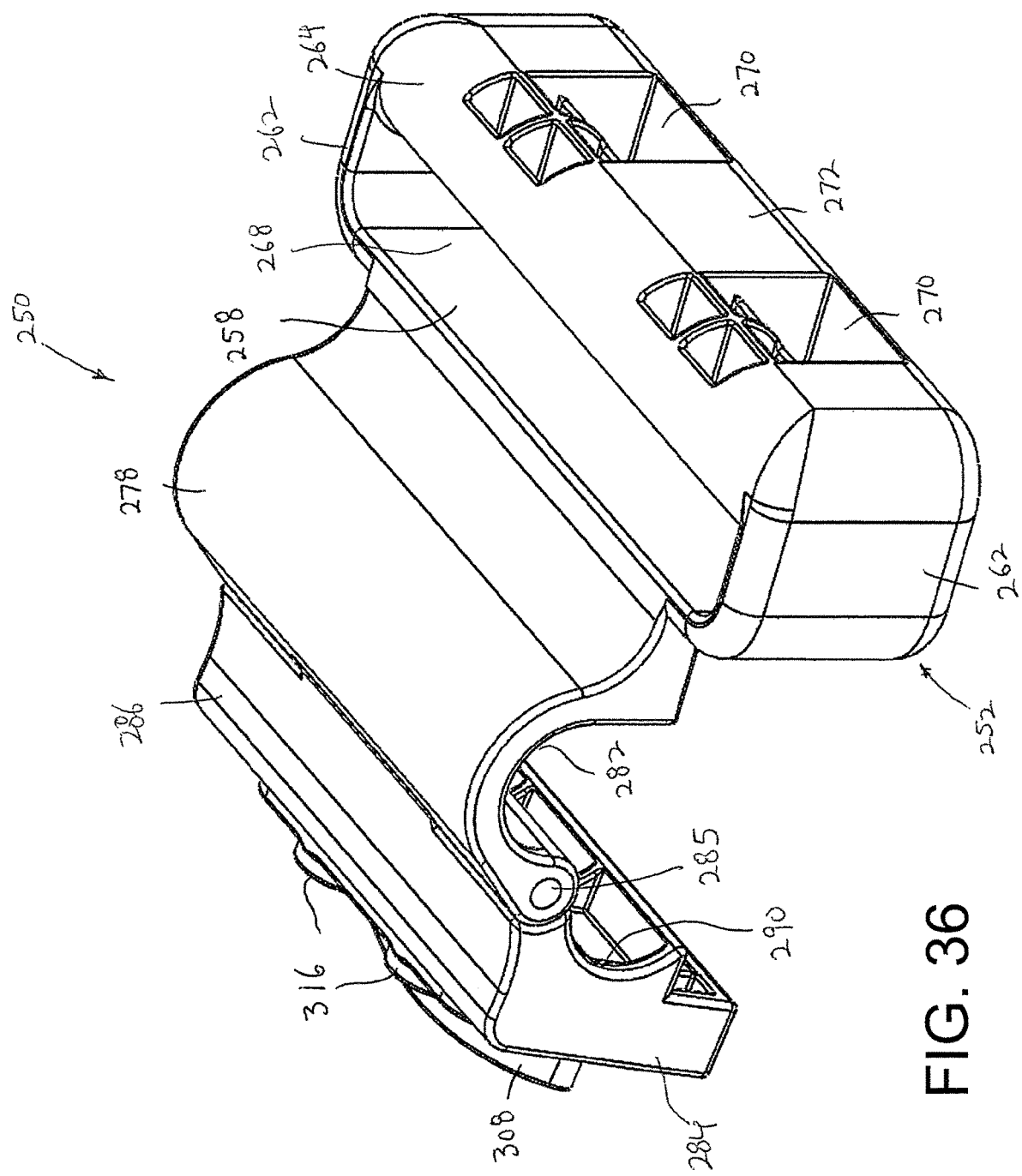
FIG. 36 is a top perspective view of the axle attachment device of FIG. 35.

Therefore, when standing board 10 approaches the rear axle or cross rod 242 of a stroller 244 from the position shown in FIG. 32 to the position shown in FIGS. 33 and 34, hook member 184 is positioned over axle or cross rod 242 of stroller 244, and during such positioning, the lower beveled surfaces 212 of fingers 210 engage the axle 242, which forces fingers 210 to be moved rearwardly back through openings 200 against the force of coil springs 218 to allow the axle to enter hook member 184. Once the axle 242 passes upwardly above the position of fingers 210, coil springs 218 again bias fingers 210 forwardly to a position beneath the axle, in order to lock the axle 242 within hook member 184, and prevent disengagement therefrom. In this position, the axle 242 rests on the concave upper distal surfaces 214, as shown in FIG. 34. In this manner, releasable stroller attachment 180 cannot accidentally disengage from the stroller.

Figure 30:
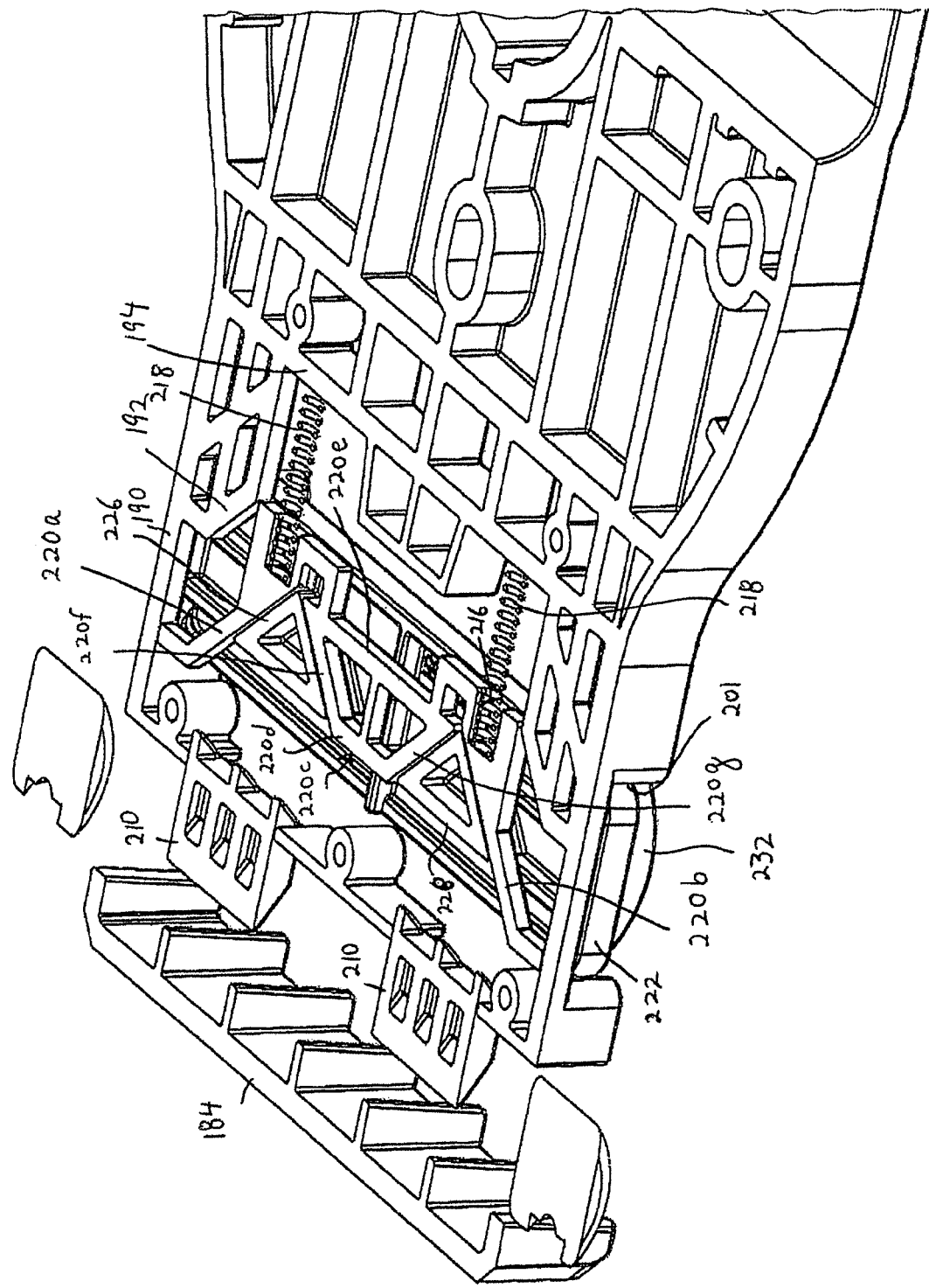
FIG. 30 is a cross-sectional view of the front end of the standing board, taken along line 30-30 of FIG. 6, with the fingers extended into the hook member.

In order to release releasable stroller attachment 180 from the axle, the lower surface of catch slide member 202 includes an engagement wall 220 in the general shape of the letter "W", extending downwardly therefrom. Specifically, as best shown in FIG. 30, engagement wall 220 includes a left side inclined wall 220a extending inwardly and rearwardly from a left side of main body 182, a right side inclined wall 220b extending inwardly and rearwardly from a right side of main body 182 and a trapezoidal shaped wall 220c interconnecting inclined walls 220a and 220b. Trapezoidal shaped wall 220c includes a short front transverse wall 220d, a long rear transverse wall 220e in parallel, spaced apart relation from short front transverse wall 220d, and two side inclined walls 220f and 220g connecting together opposite ends of transverse walls 220d and 220e. The free inward ends of inclined walls 220a and 220b are connected to the ends of long rear transverse wall 220e. As will be understood from the description hereafter, inclined walls 220a, 220b, 220f and 220g are biased walls that result in catch slide member 202 being moved in a rearward direction against the force of coil springs 218.

In order to move catch slide member 202 rearwardly against the force of coil springs 218 so as to retract fingers 210, a transverse biasing member 222 is positioned beneath catch slide member 202.

Figure 31:
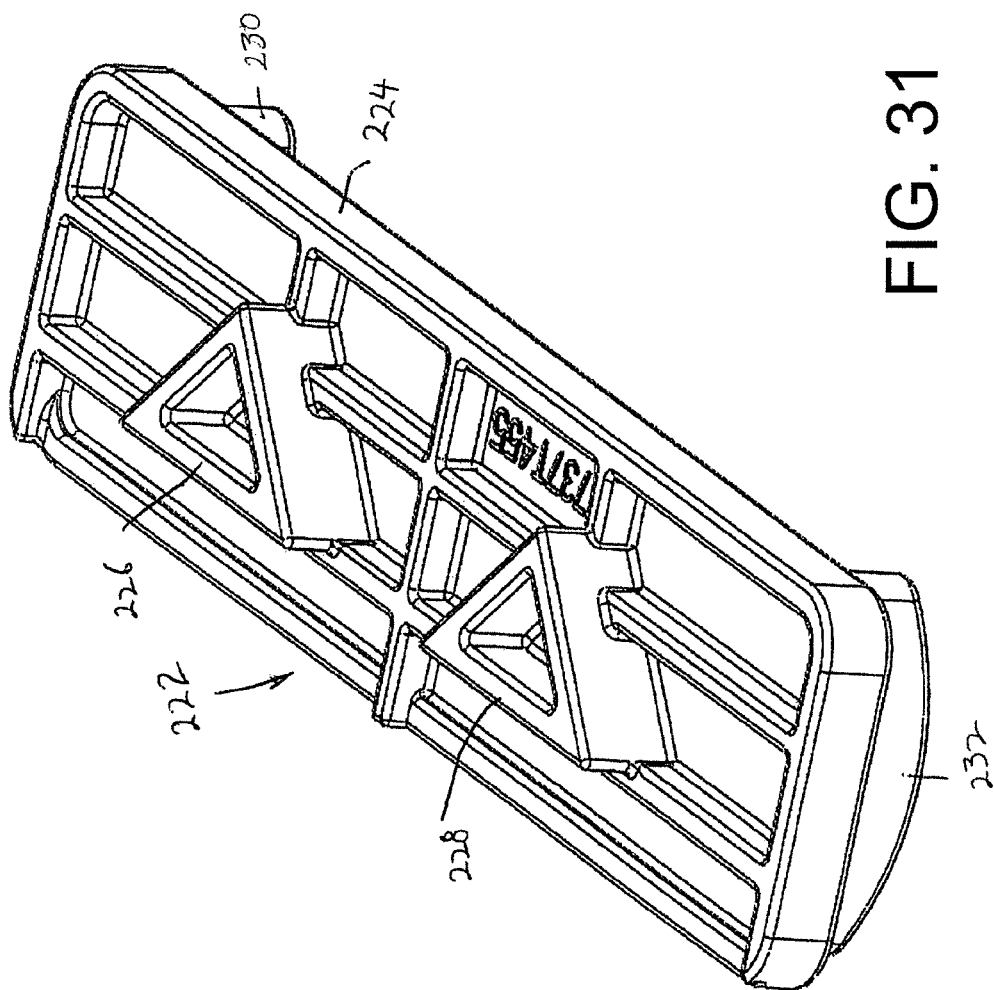
FIG. 31 is a perspective view of the transverse biasing plate.

As shown best in FIGS. 30 and 31, transverse biasing member 222 includes a generally rectangular plate 224 with its lengthwise direction extending in the transverse direction of releasable stroller attachment 180, that is, perpendicular to catch slide member 202. Two raised triangular walls 226 and 228 extend upwardly from the upper surface of rectangular plate 224 in spaced relation, such that raised triangular wall 226 extends between left side inclined wall 220a and side inclined wall 220f and raised triangular wall 228 extends between right side inclined wall 220b and side inclined wall 220g. The angle of inclination of the sides of raised triangular walls 226 and 228 are the same as those of inclined walls 220a, 220b, 220f and 220g so as to be in sliding contact with these walls.

Push walls 230 and 232 extend downwardly from opposite ends of rectangular plate 224. A rectangular guide member 234 (FIG. 26) extends downwardly from rectangular plate 224, centrally thereof between push walls 230 and 232.

With this arrangement, transverse biasing member 222 is adapted for transverse movement in the left and right directions with opposite ends thereof extending through recessed side openings 201.

Lastly, a bottom closure plate 236 (FIG. 26) is provided in covering relation to the lower surface of transverse biasing member 222 so as to retain catch slide member 202, coil springs 218 and transverse biasing member 222 within cavity 186. Bottom closure plate 236 is secured to main body 182 by screws or the like (not shown).

Bottom closure plate 236 includes two side cut out sections 238 in alignment with recessed side openings 201 so as to permit side to side movement of push walls 230 and 232 therethrough. Bottom closure plate 236 further includes an elongated transverse slot 240 extending between cut out sections 238 in order to receive rectangular guide member 234 so as to guide transverse biasing member 222 for side to side transverse movement.

With this arrangement, when a user applies pressure on either push wall 230 or 232, this results in transverse movement of transverse biasing member 222. During this movement, if pressure is applied to push wall 230, triangular walls 226 and 228 apply pressure against inclined walls 220f and 220b, respectively. This results in a sliding of inclined walls 220f and 220b on triangular walls 226 and 228, causing catch slide member 202 to move rearwardly against the force of coil springs 218, thereby retracting fingers 210 from openings 200, in order to remove releasable stroller attachment 180 from the respective axle or cross rod of the stroller. On the other hand, if pressure is applied to push wall 232, triangular walls 226 and 228 apply pressure against inclined walls 220a and 220g, respectively. This results in a sliding of inclined walls 220a and 220g on triangular walls 226 and 228, causing catch slide member 202 to move rearwardly against the force of coil springs 218, thereby retracting fingers 210 from openings 200, in order to remove releasable stroller attachment 180 from the respective axle or cross rod of the stroller.

However, in many instances, the rear axle or cross rod of the stroller may be of a size that is not satisfactorily accommodated within releasable stroller attachment 180. A further problem occurs if the rear axle or cross rod is too far forwardly positioned of the stroller so that a front portion of the standing board is positioned too far beneath the stroller.

Therefore, in accordance with another aspect of the present invention, as shown in FIGS. 35-49, a separate axle attachment device 250 is provided which first attaches to the rear axle or cross rod of the stroller.

Specifically, axle attachment device 250 includes a main body 252 and an axle securement section 254 connected to the front of main body 252.

Main body 252 includes a generally rectangular parallelepiped configuration having a front wall 258 with a front facing surface 260, two rearwardly extending side walls 262 extending in parallel, spaced apart relation from the end edges of front wall 258 and a rear block 264 connecting together the free ends of side walls 262. The front facing surface 266 of rear block 264 is spaced apart from front wall 258 so as to provide a vertical through channel 268 therebetween and extending in a transverse direction for receiving downwardly opening hook member 184. In addition, rear block 264 is provided with two spaced apart through openings 270 extending therethrough in the lengthwise direction of standing board 10 from front facing surface 266 to the rear facing surface 272 thereof.

During engagement of hook member 184 into vertical through channel 268, fingers 210 are biased inwardly, by engagement against the rear facing surface 272 of rear block 264, and against the spring force of coil springs 218, until fingers 210 reach spaced apart through openings 270 into which they are spring biased to retain releasable stroller attachment 180 to main body 252 of axle attachment device 250.

In order to remove hook member 184 from main body 252, it is only necessary to press in push wall 230 or 232 to retract fingers 210 in the manner as discussed above.

Front facing surface 260 of main body 252 includes two rectangular parallelepiped blocks 274 connected at the upper end thereof. Each block 274 includes a rectangular recess 276 accessible from the front facing side thereof.

Axle securement section 254 includes an upper axle housing 278 having one end fixedly secured to front facing surface 260 of main body 252 at the upper edge thereof immediately above blocks 274. Upper axle housing 278 includes an arcuate wall 280 defining a downwardly oriented semi-cylindrical opening 282.

Axle attachment section 254 further includes a lower axle housing 284 pivotally connected to the free end of upper axle housing 278 by a pivot pin 285. Lower axle housing 284 includes a main body 286 having an inner arcuate wall 288 defining an upwardly oriented semi-cylindrical opening 290, which when pivoted to the closed position, forms a closed cylindrical opening with semi-cylindrical opening 282.

Figure 37:
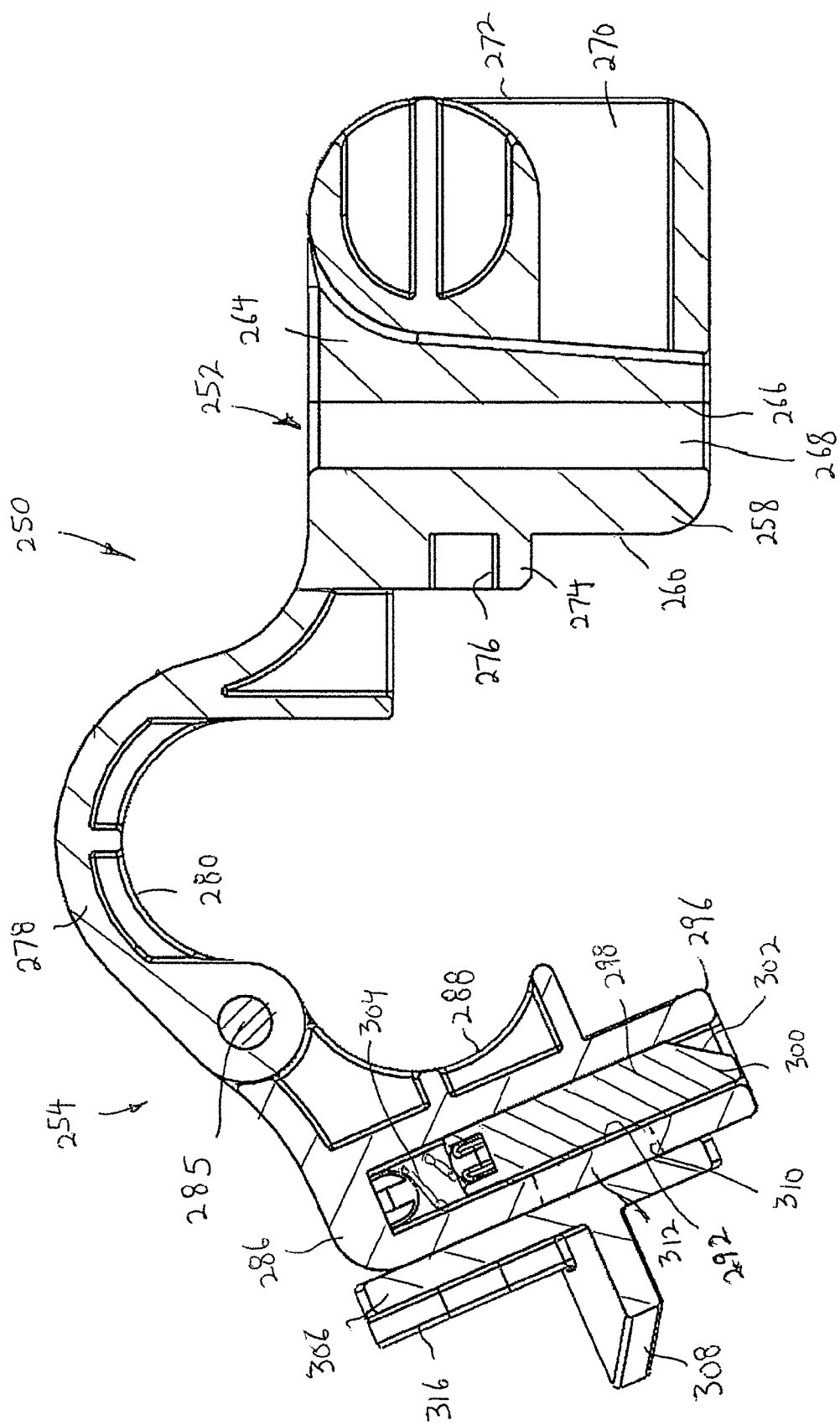
FIG. 37 is a cross-sectional view of the axle attachment device of FIG. 36.
Figure 38:
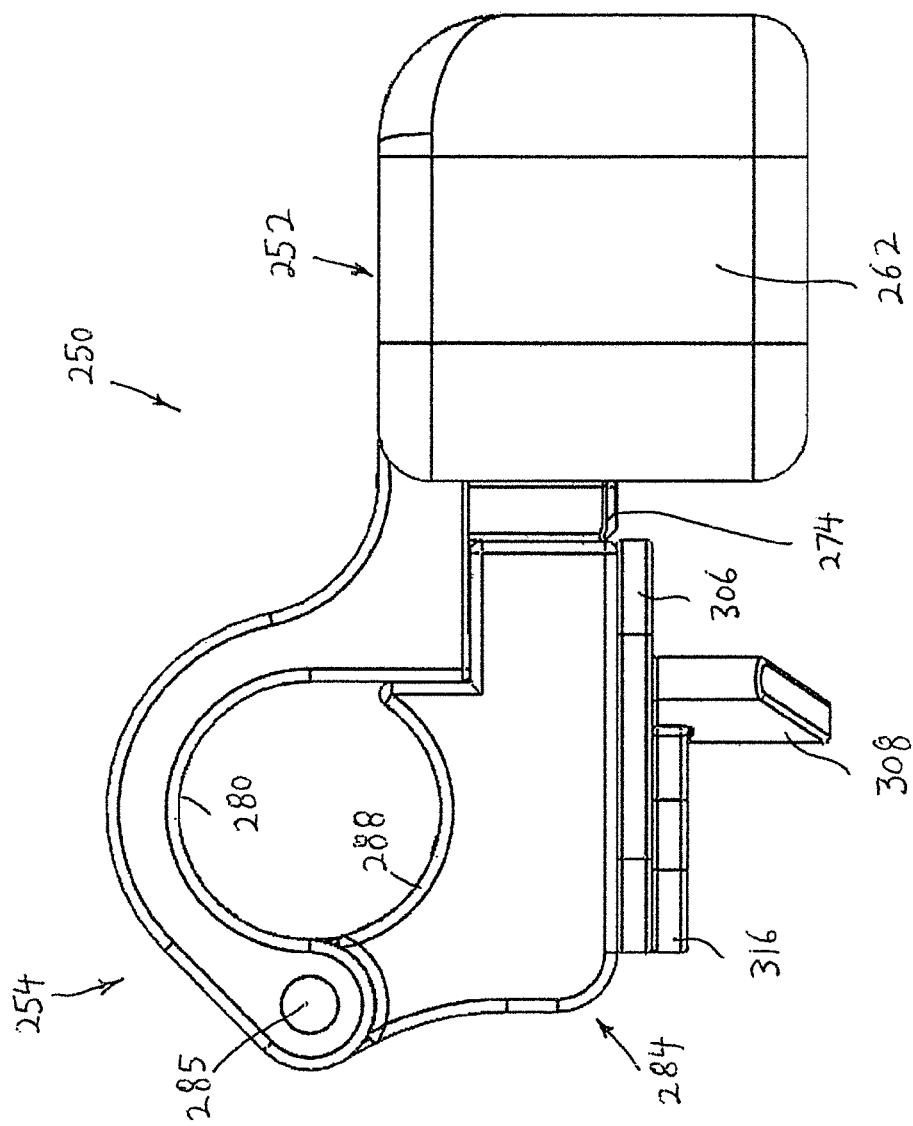
FIG. 38 is a side elevational view of the axle attachment device in a closed, locked position.
Figure 39:
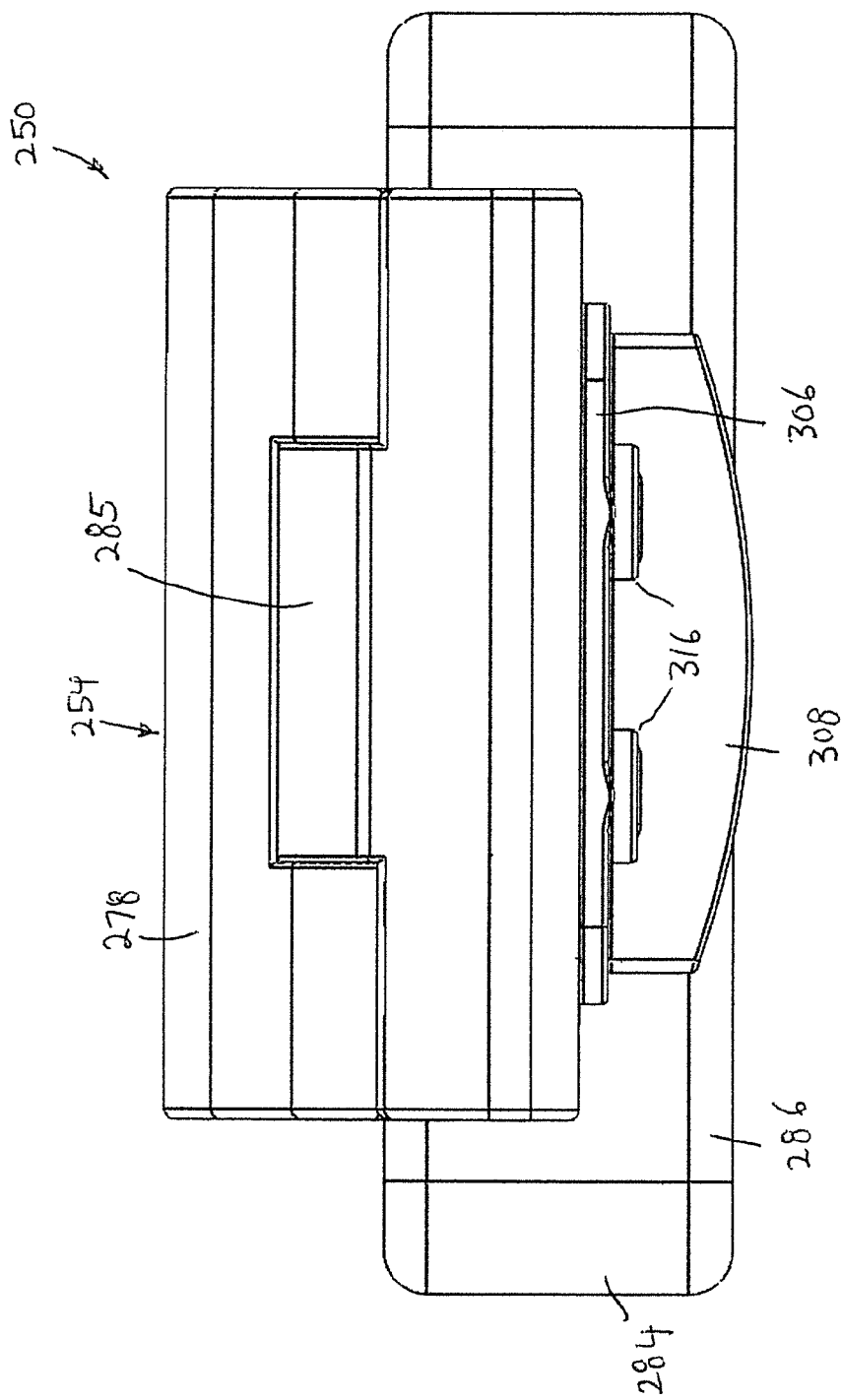
FIG. 39 is a front elevational view of the axle attachment device of FIG. 38.
Figure 40:
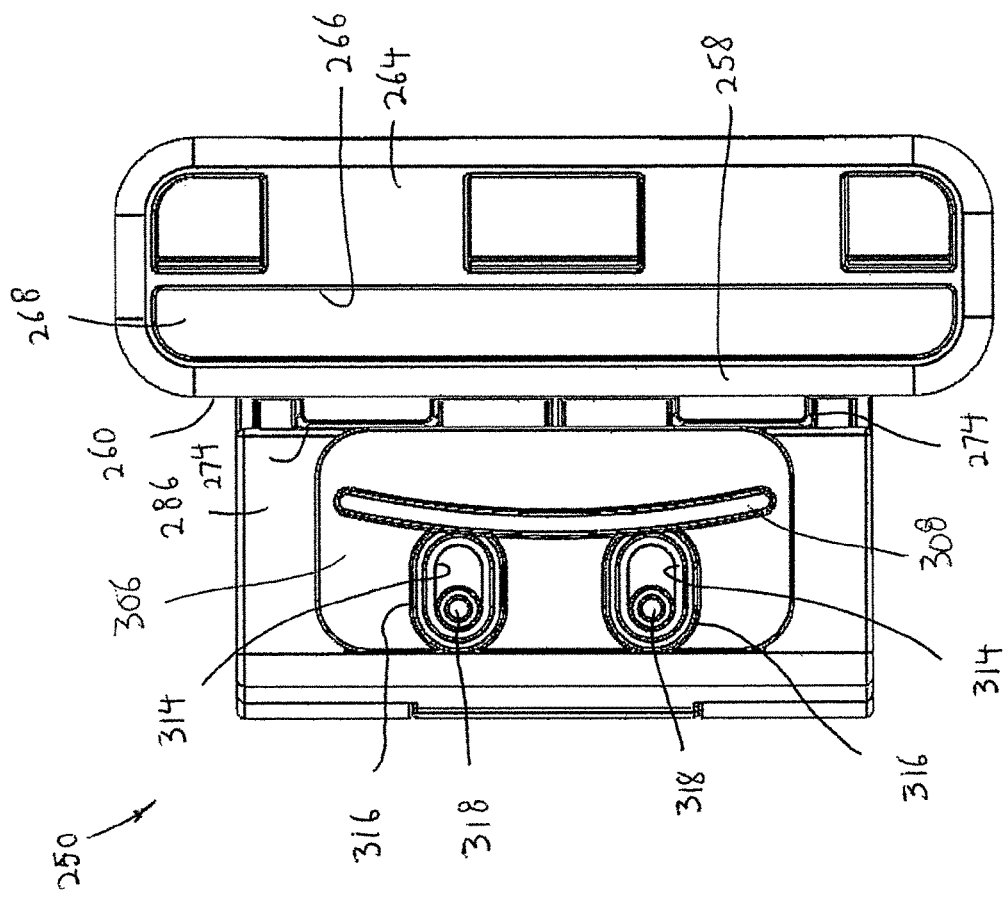
FIG. 40 is a bottom plan view of the axle attachment device of FIG. 38.
Figure 41:
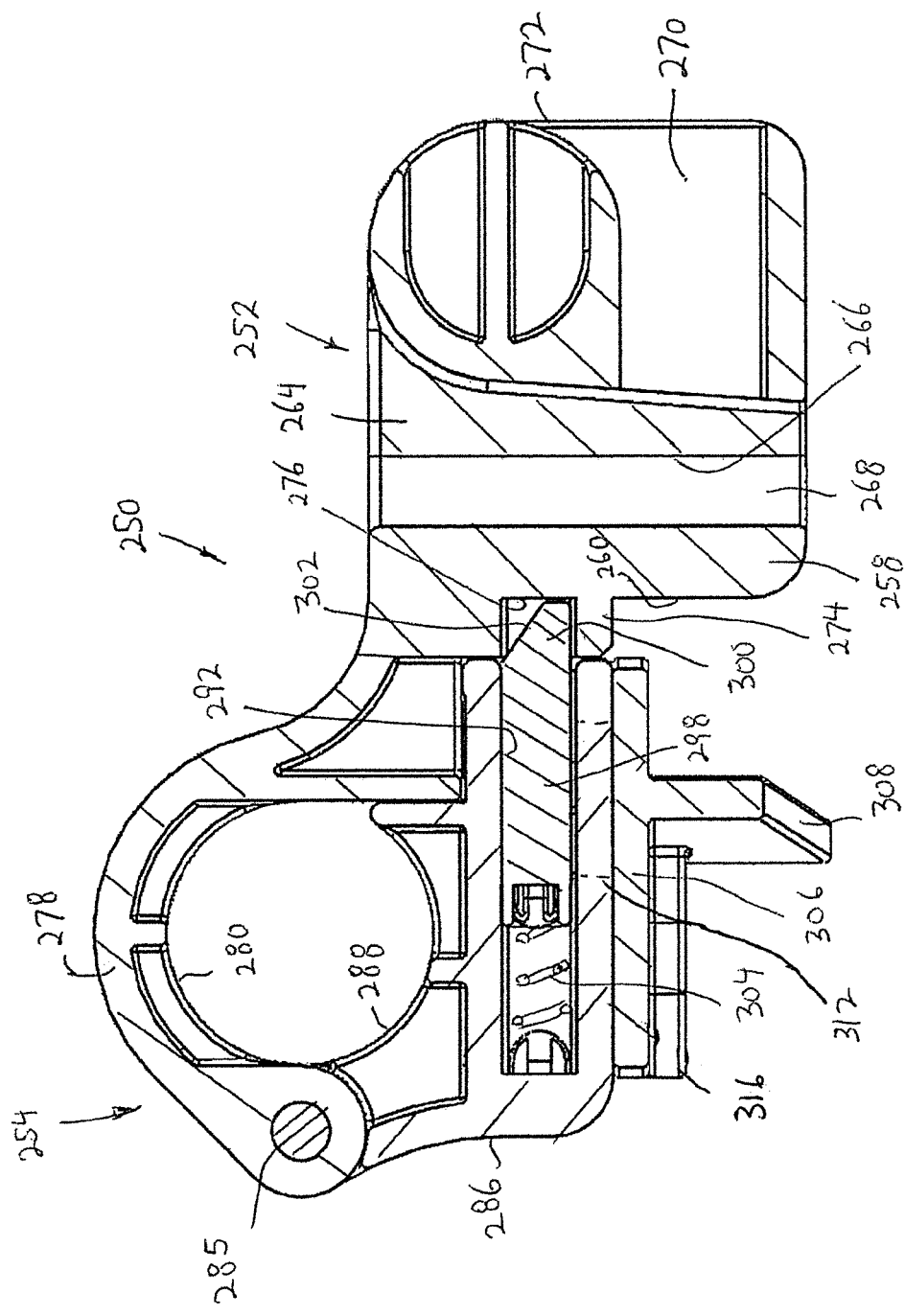
FIG. 41 is a cross-sectional view of the axle attachment device of FIG. 38.
Figure 42:
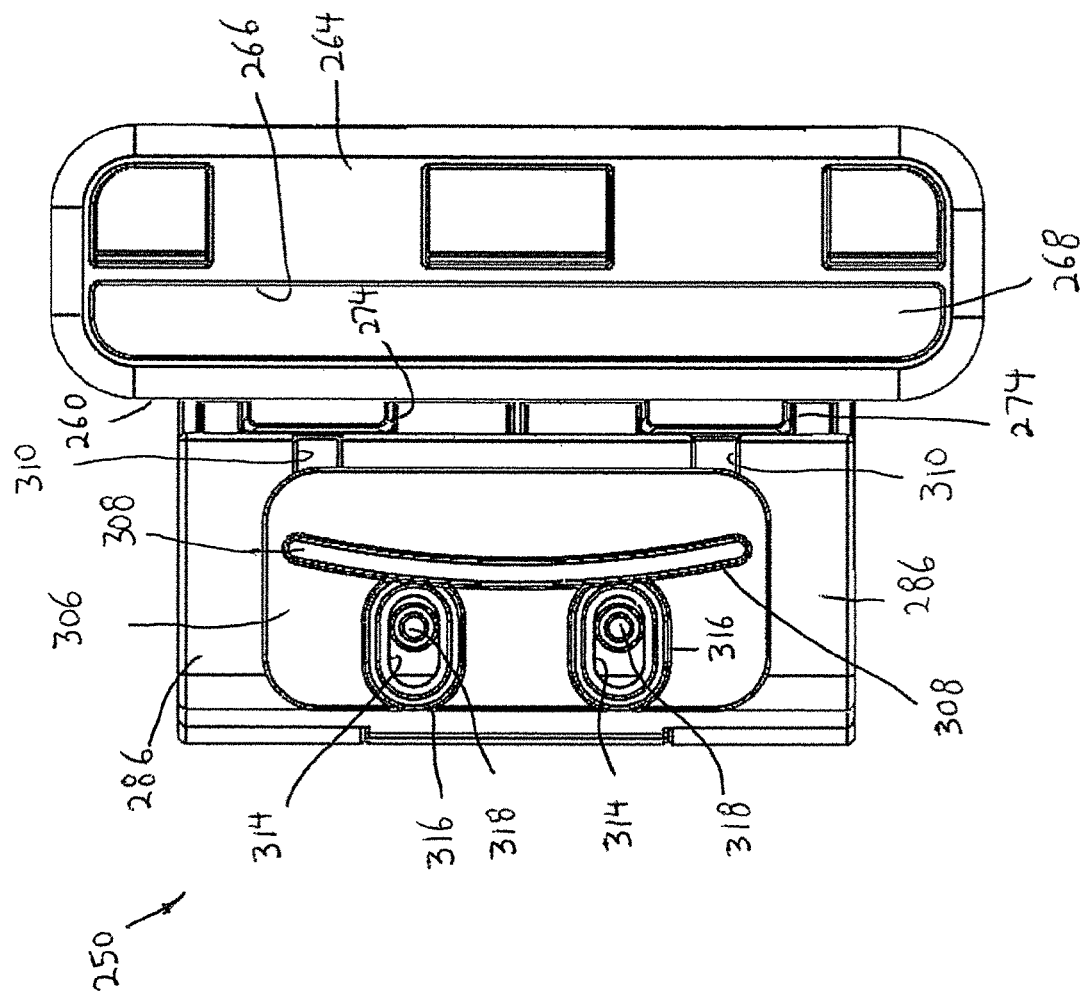
FIG. 42 is a bottom plan view of the axle attachment device in a closed, unlocked position.
Figure 43:
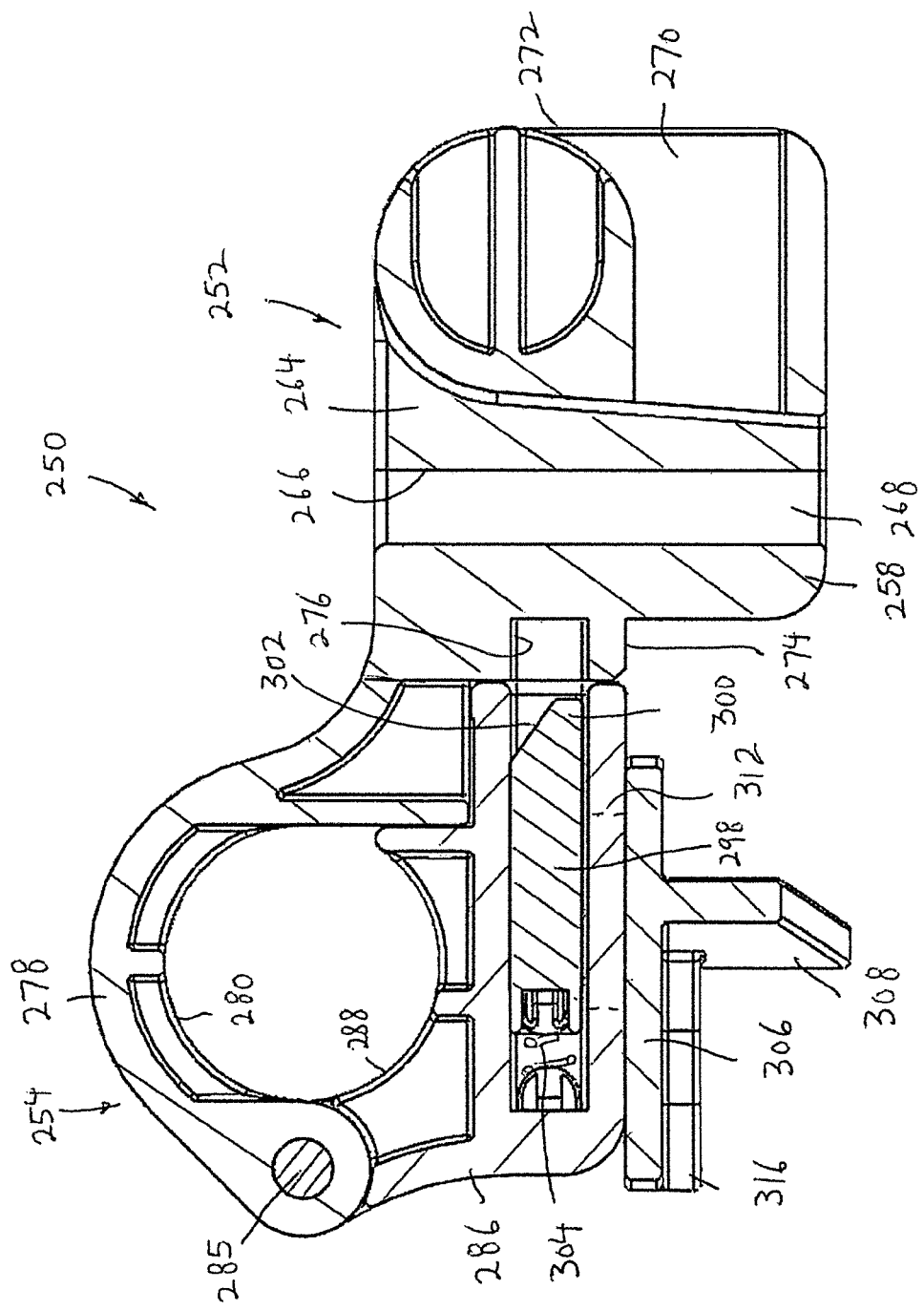
FIG. 43 is a cross-sectional view of the axle attachment device of FIG. 42.
Figure 44:
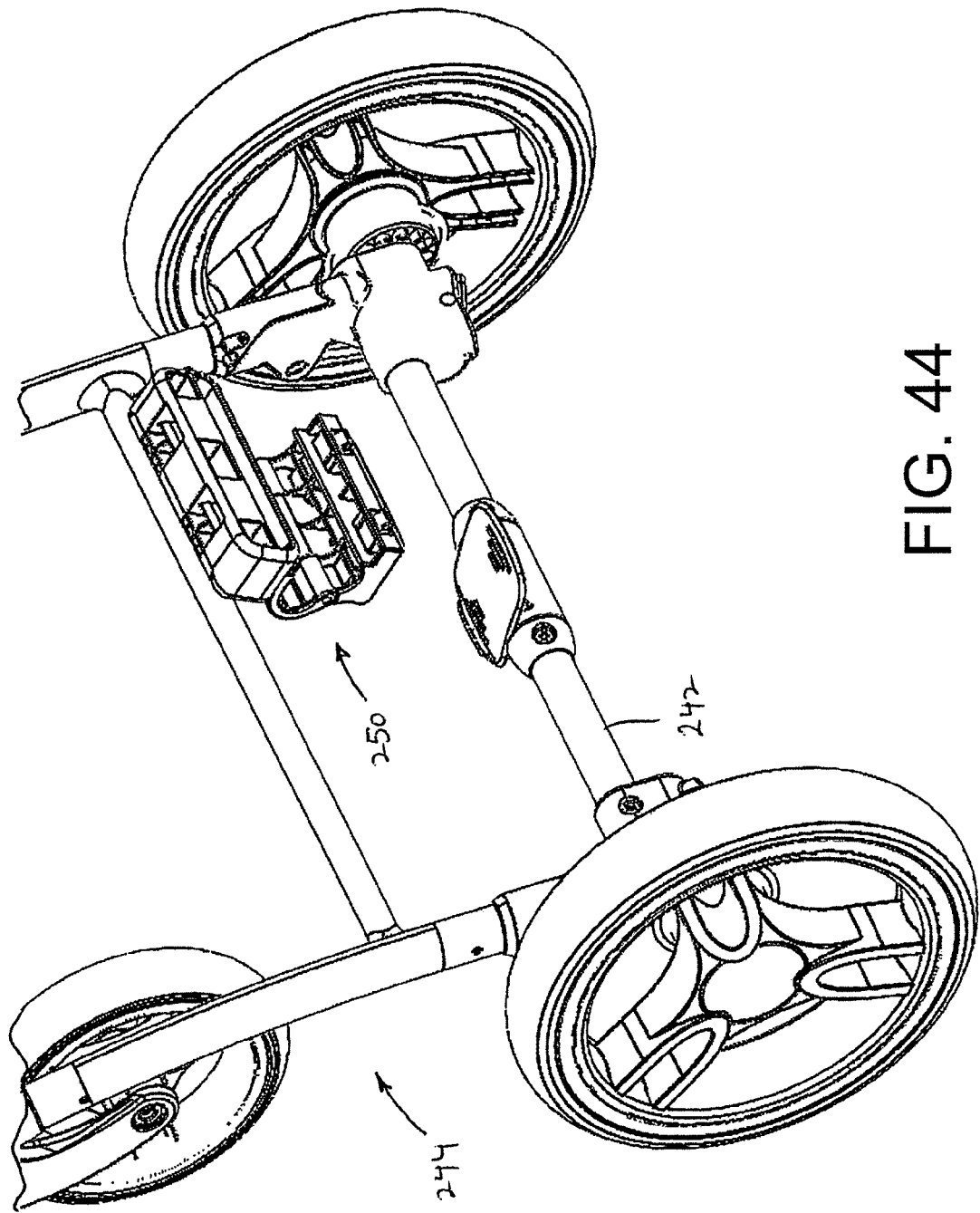
FIG. 44 is a perspective view of the axle attachment device ready to be attached to the rear axle of the stroller.
Figure 45:
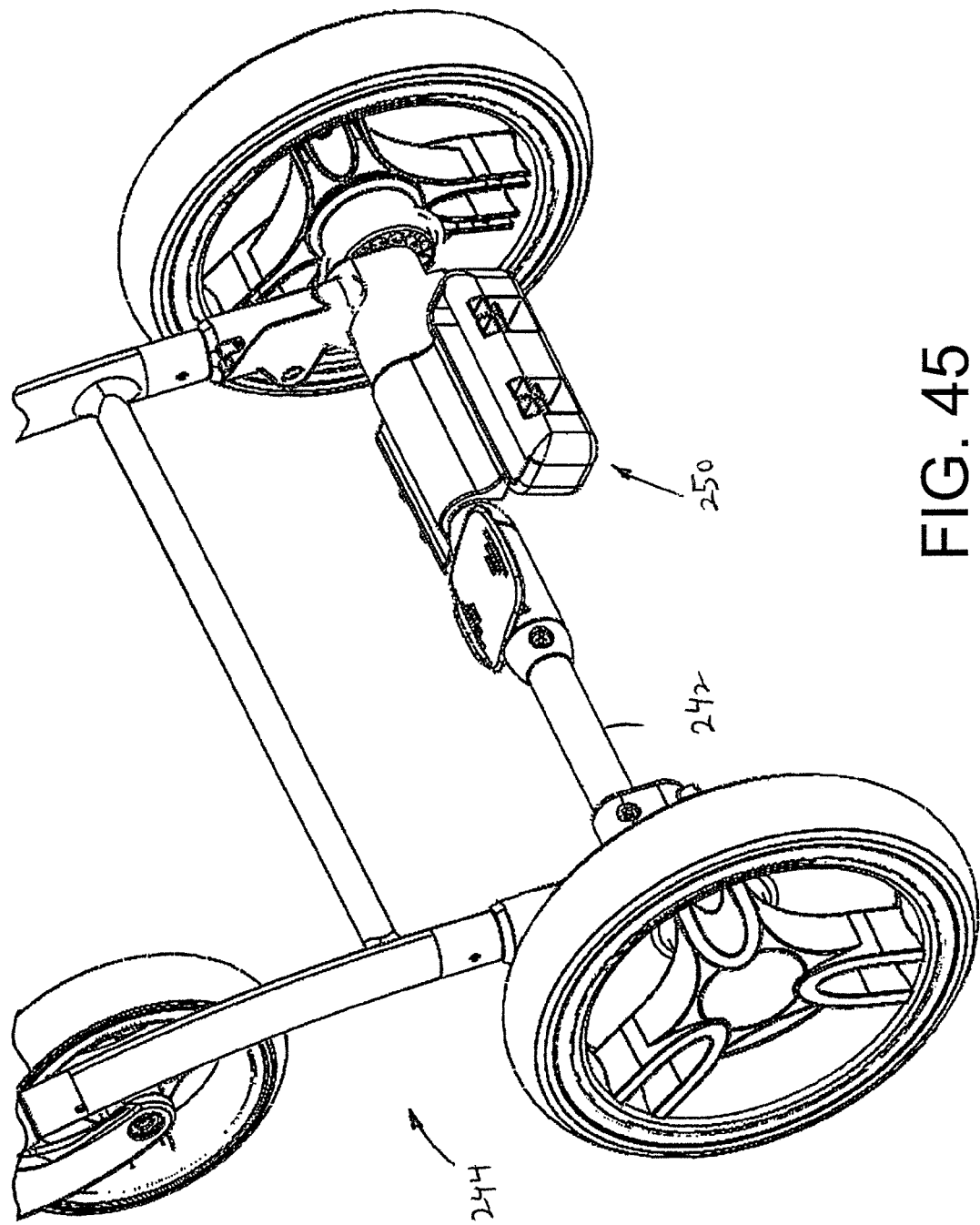
FIG. 45 is a perspective view of the axle attachment device in an open position in partial surrounding relation to the rear axle of the stroller.
Figure 46:
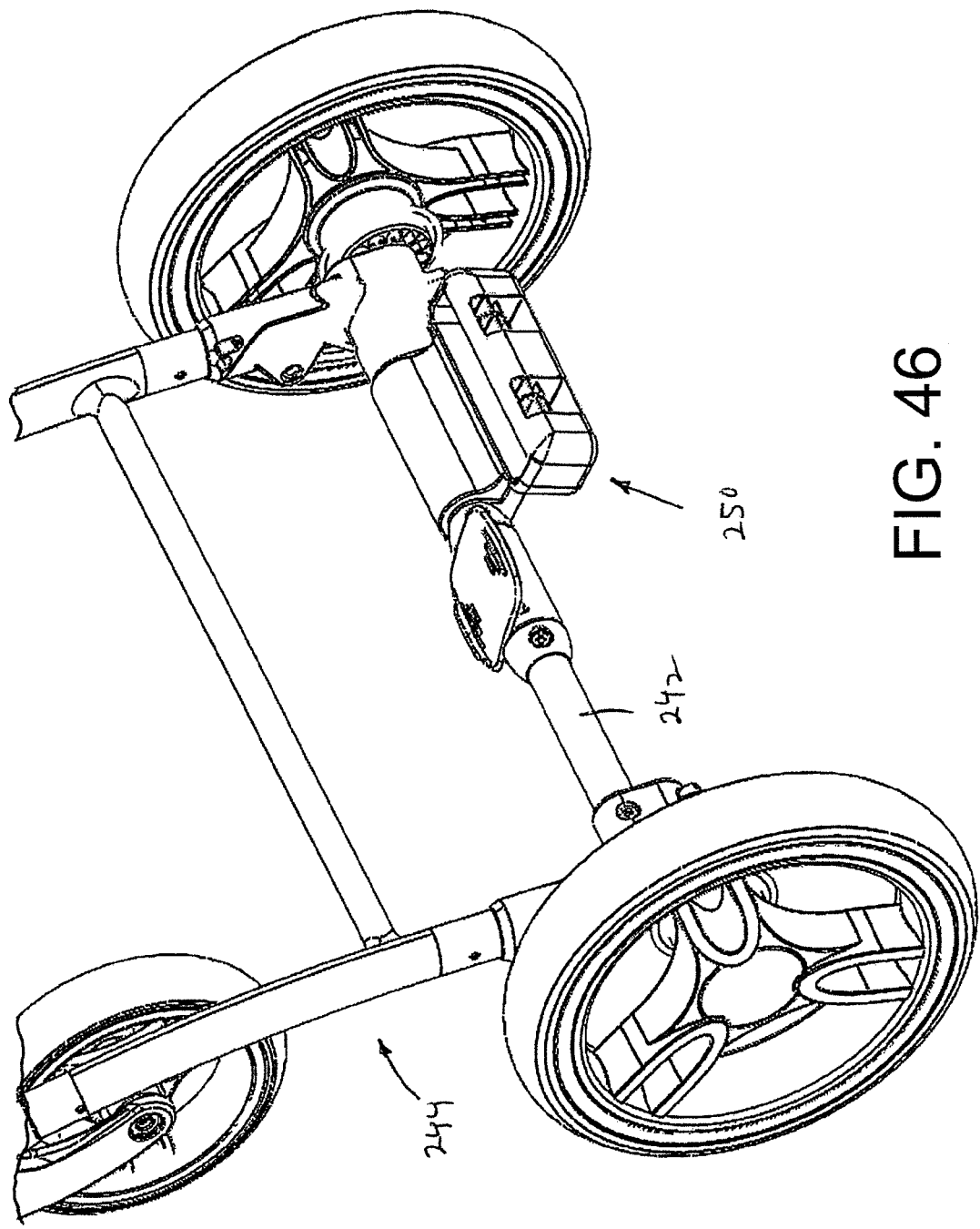
FIG. 46 is a perspective view of the axle attachment device secured to the rear axle of the stroller.
Figure 47:
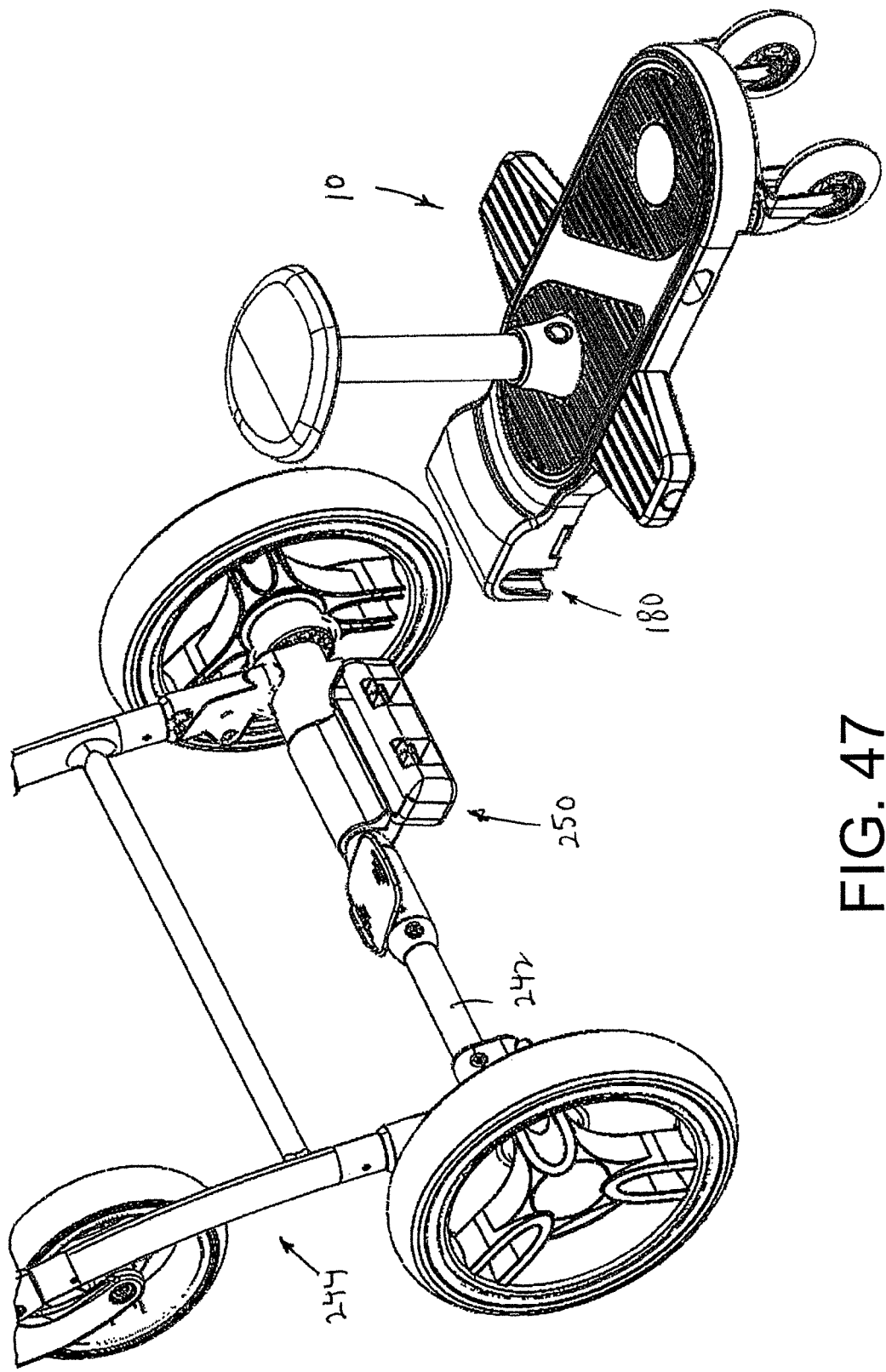
FIG. 47 is a perspective view of the standing board approaching the axle attachment device.
Figure 48:
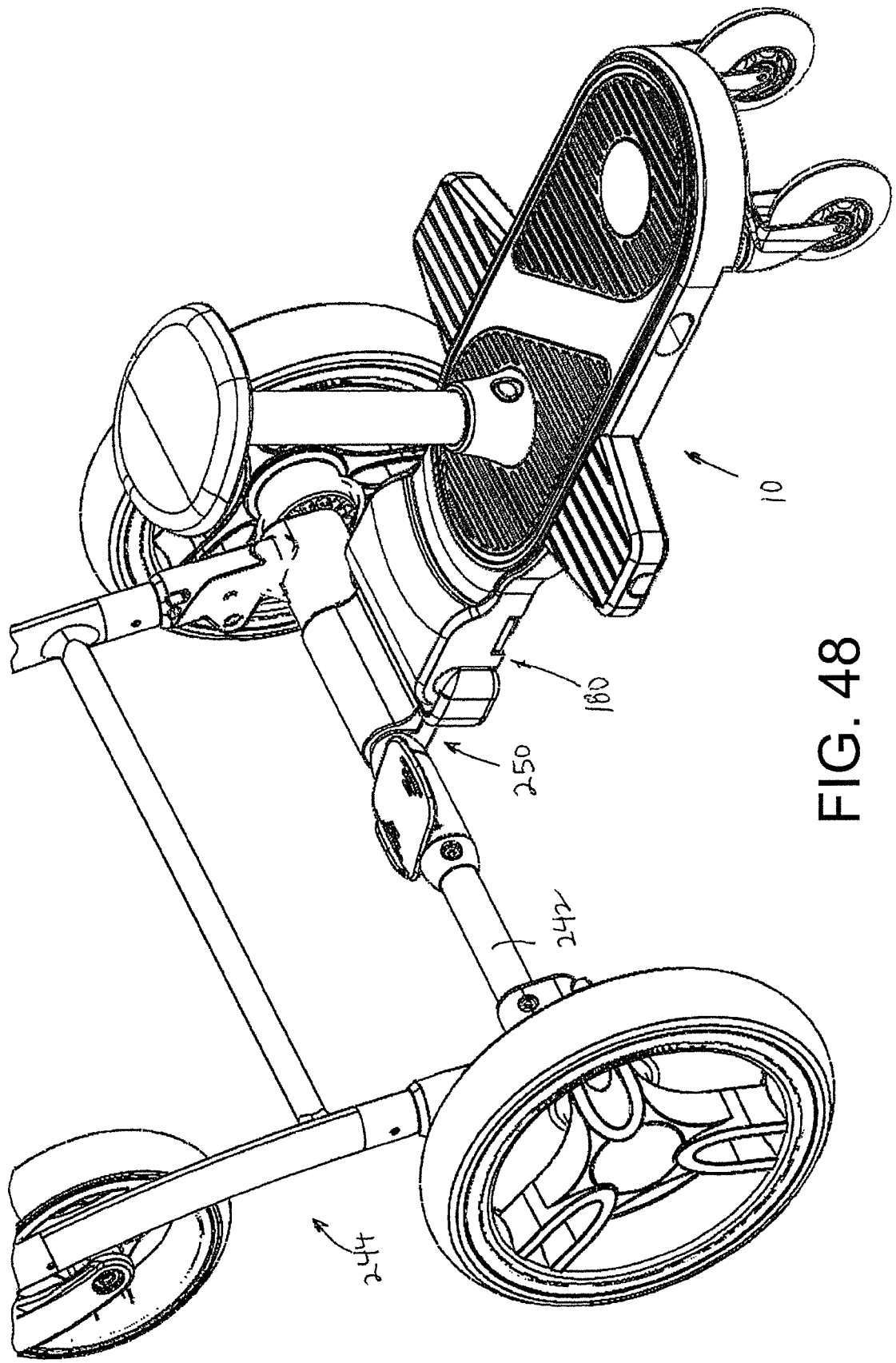
FIG. 48 is a perspective view of the standing board secured to the axle attachment device.
Figure 49:
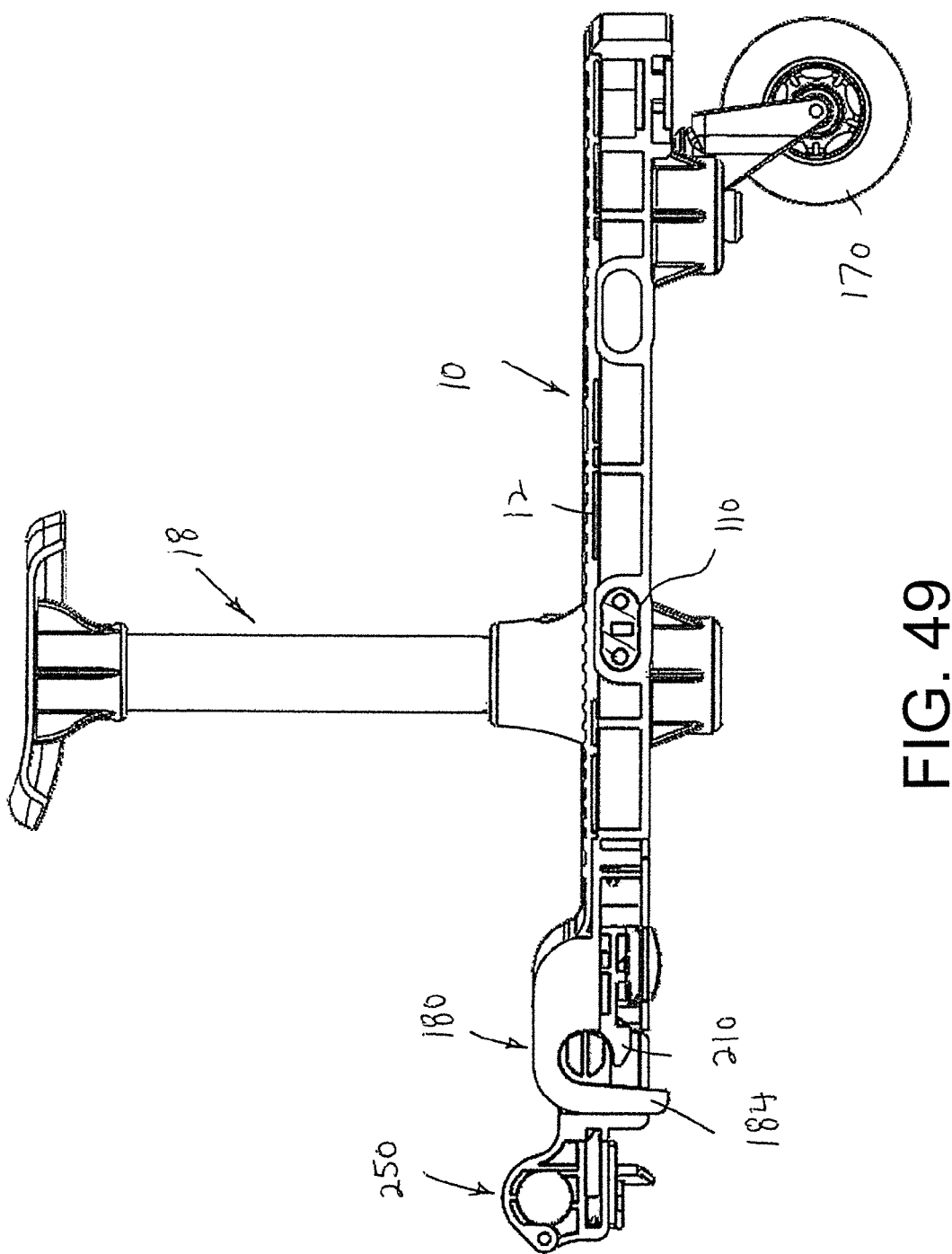
FIG. 49 is a partial cross-sectional view showing the standing board connected to the axle attachment device.
Figure 50:
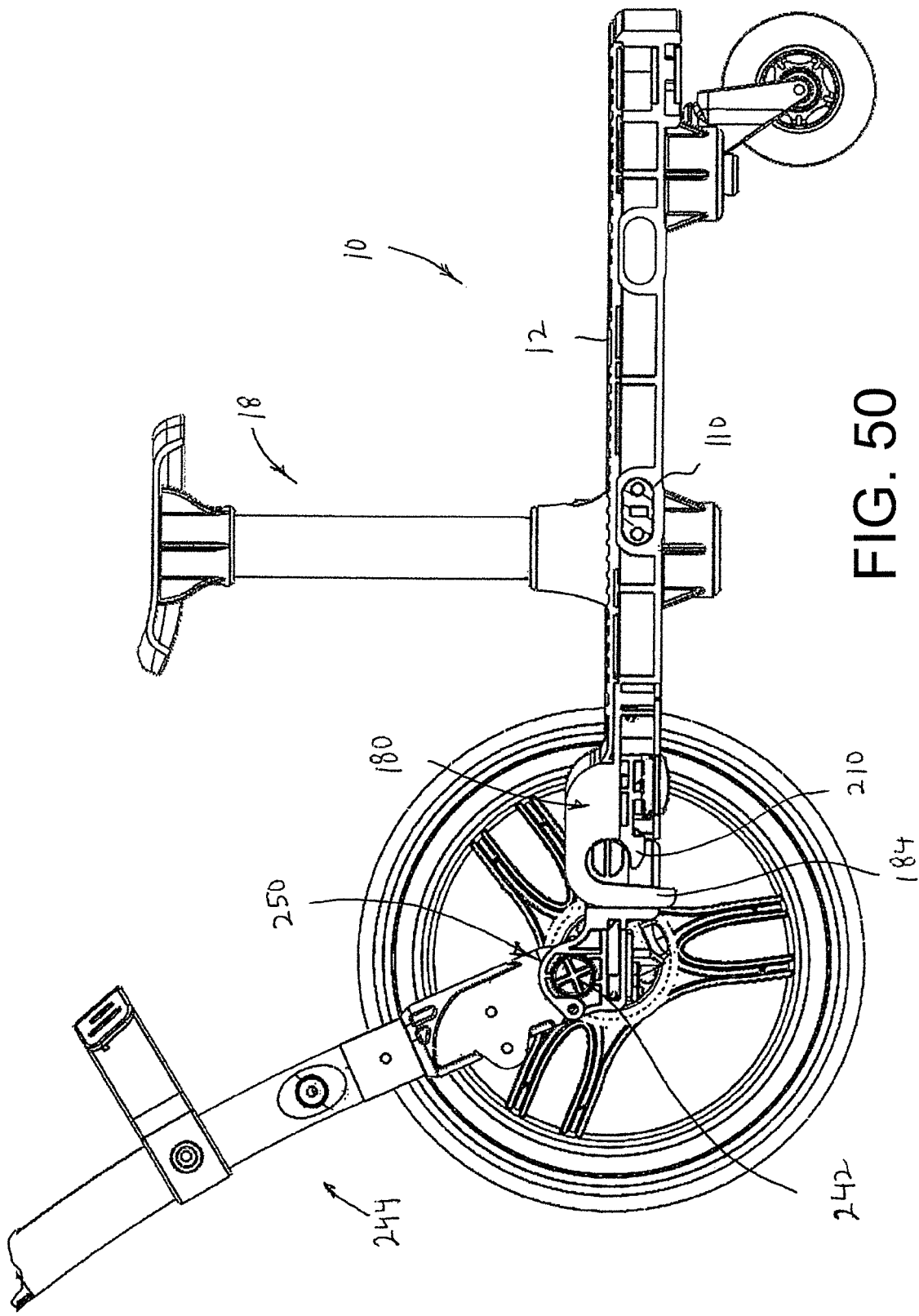
FIG. 50 is a partial cross-sectional view showing the standing board connected to the axle attachment device which is secured to the rear axle of the stroller.
Figure 51:
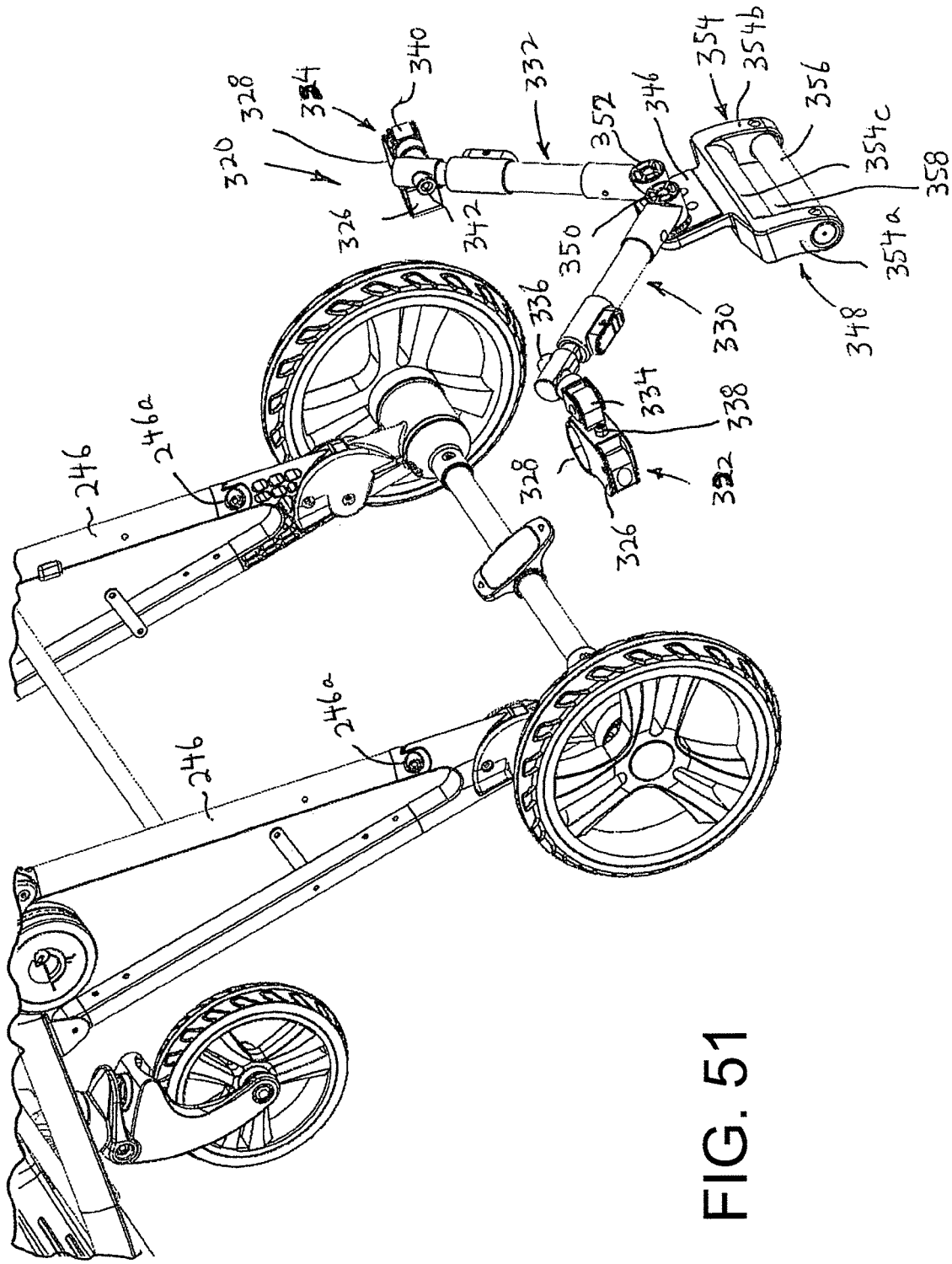
FIG. 51 is a perspective view of an axle attachment arrangement according to another embodiment of the present invention, in a position detached from the stroller.
Figure 52:
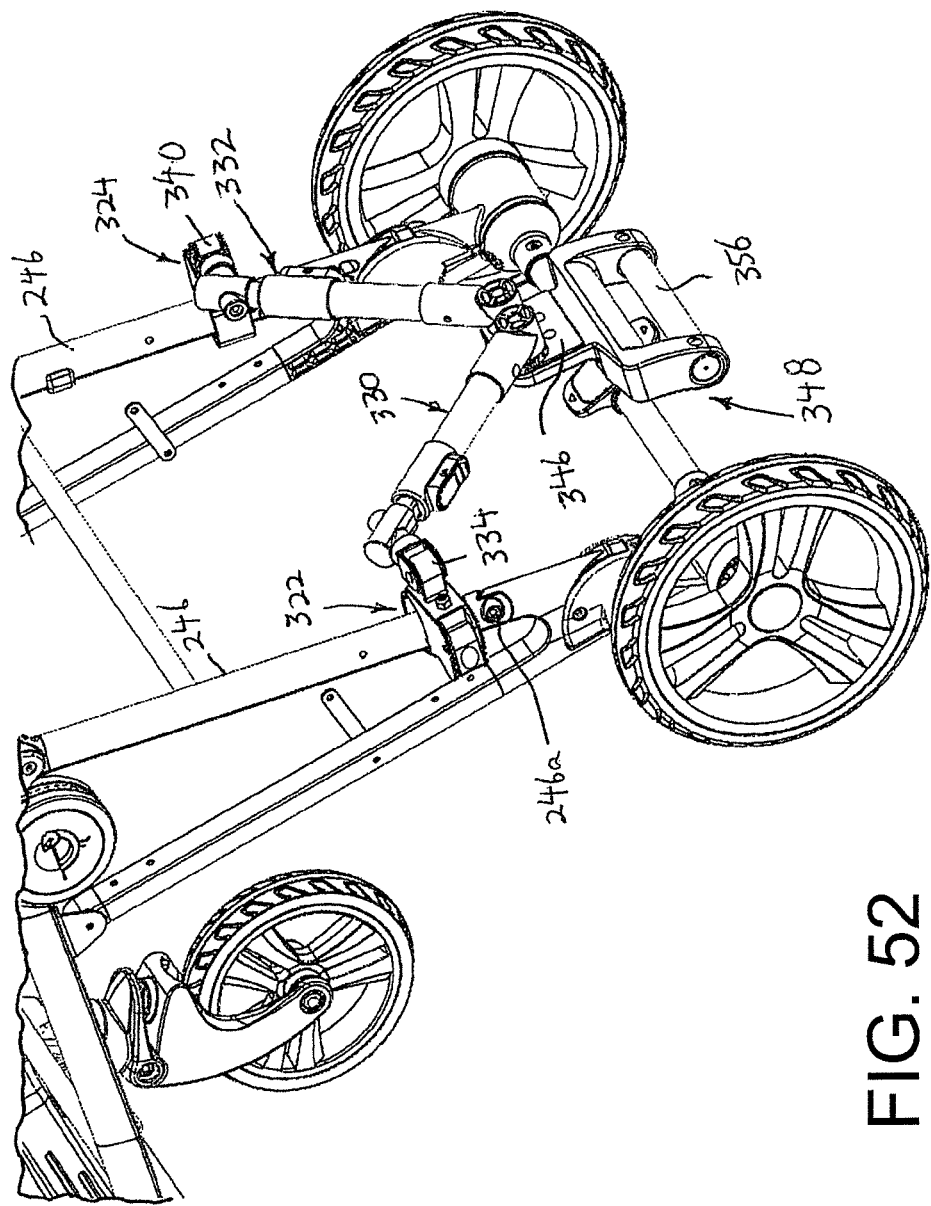
FIG. 52 is a perspective view of the axle attachment arrangement of FIG. 51, connected to the rear legs of the stroller.

As shown in FIG. 37, main body 286 includes a slide chamber 292 which is open at two spaced apart openings 294 at the distal free end surface 296 thereof. A slide member 298 is slidably positioned within chamber 292 and includes two fingers or catches 300 extending forwardly from the front edge thereof in alignment with spaced apart openings 294. Each finger 300 includes an upper beveled or inclined surface 302 at the upper distal end. A coil spring 304 is positioned between the rear closed-end of chamber 292 and the rear face of slide member 298 to normally bias fingers 300 out of openings 294.

An actuating slide member 306 is provided on the outer surface of main body 286 and includes a push wall 308 extending outwardly therefrom. Two elongated slots 310 are provided in main body 286 between slide member 298 and actuating slide member 306, with two connecting members 312 connecting together slide member 298 and actuating slide member 306 and slidably positioned in respective elongated slots 310. Connecting members 312 are adapted to slide within elongated slots 310.

Actuating slide member 306 further includes two parallel, spaced apart oval shaped openings 314 extending on the outer surface thereof in spaced apart relation on one side of push wall 308, each oval shaped opening 314 being surrounded by an oval shaped wall 316 on the outer surface of actuating slide member 306. Two spaced apart guide pins 318 protrude outwardly from main body 286 into oval shaped openings 314 to serve as a guide for sliding movement of actuating slide member 306.

In this manner, when upper axle housing 278 is positioned on the axle or cross rod of the stroller such that the axle or cross rod is positioned within arcuate wall 280, lower axle housing 284 is pivoted about pivot pin 285, whereupon the upper beveled or inclined surface 302 of each finger 300 hits upon the lower end of the respective block 274, thereby forcing slide member 298 inwardly of chamber 292 against the force of coil spring 304. Upon continued pivoting movement of lower axle housing 284, fingers 300 reach rectangular recesses 276 into which they are biased by coil spring 304, thereby locking axle securement section 254 to the axle or cross rod of the stroller.

In order to remove axle attachment device 250, it is only necessary to apply a pushing force against push wall 308, thereby retracting fingers 300 from recesses 276 against the force of coil spring 304, and then pivot lower axle housing 284 in the opposite opening direction.

It will be appreciated that various modifications can be made to the present invention. For example, a cylindrical rod (not shown) can be substituted in place of rear block 264 and connected between the free ends of side walls 262.

Referring now to FIGS. 51-59, an axle attachment arrangement 320 which attaches to the rear legs 246 of stroller 244 is provided in place of axle attachment device 250.

Axle attachment arrangement 320 includes two axle attachment devices 322 and 324, which are modified slightly from axle attachment device 250. Specifically, each axle attachment device 322 and 324 is the same as axle attachment device 250 with a main body 326 and an axle securement section 328, with the exception that main body 326 is formed as a solid unitary body without any vertical through channel 268 or through openings 270. Therefore, a detailed description of each axle attachment device 322 and 324 is omitted. Each axle attachment device 322 and 324 is adapted to clamp onto a rear leg 246 of stroller 244, in the same manner as discussed above with respect to axle attachment device 250, but with such clamping to be a tight friction clamp to prevent axle attachment devices 322 and 324 from sliding down the respective rear legs 246 of stroller 244. Alternatively, a stop 246a can be provided on each rear leg 246 to accurately position each axle attachment device 322 and 324 thereon at a fixed position.

A first arm 330 has a first end pivotally connected to axle attachment device 322 in two different pivoting directions, and a second arm 332 has a first end pivotally connected to axle attachment device 324 in two different pivoting directions.

To this end, a pivot securement body 334 is pivotally connected by a pivot 336 to the first end of first arm 330 along a first pivoting direction and is pivotally connected by a pivot 338 to main body 326 of axle attachment device 322 along a second pivoting direction generally perpendicular to the first pivoting direction.

In like manner, a pivot securement body 340 is pivotally connected by a pivot 342 to the first end of second arm 332 along the first pivoting direction and is pivotally connected by a pivot (not shown) to main body 326 of axle attachment devices 324 along a second pivoting direction generally perpendicular to the first pivoting direction.

The opposite ends of first arm 330 and second arm 332 are pivotally connected to a connecting plate 346 of a yoke 348 by pivot pins 350 and 352, so that the first and second arms 330 and 332 form a V-shape.

Yoke 348 includes a U-shaped connector 354 having two side walls 354a and 354b connected together by a connecting wall 354c to which connecting plate 346 is secured. A connecting rod 356 connects together the free ends of side walls 354a and 354b, and is in parallel, spaced relation from connecting wall 354c to provide a gap 358 therebetween.

Figure 53:
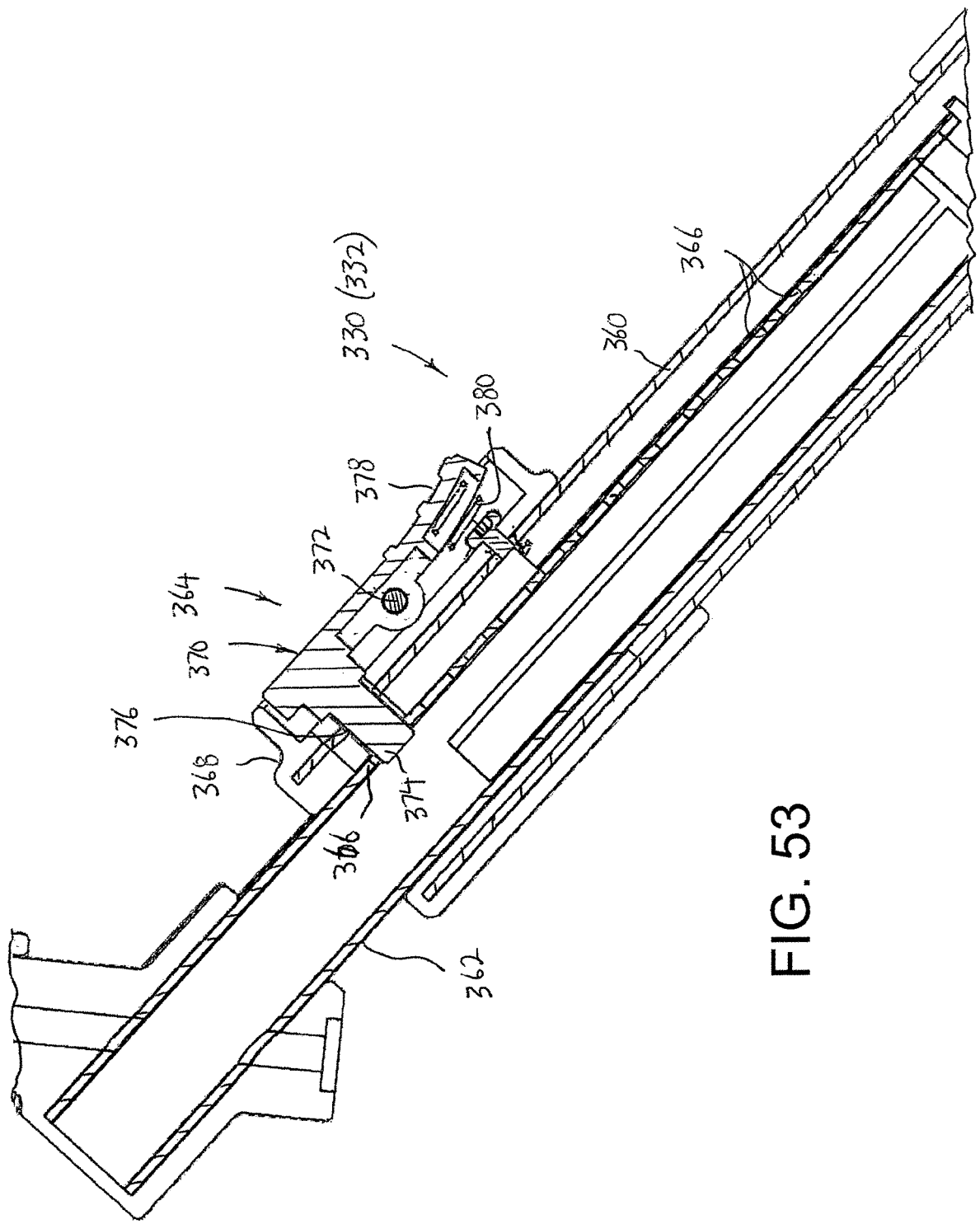
FIG. 53 is a cross-sectional view of a portion of the axle attachment arrangement of FIG. 51, showing the telescoping arm arrangement thereof and the adjustment assembly for releasably locking the telescoping rods thereof.
Figure 54:
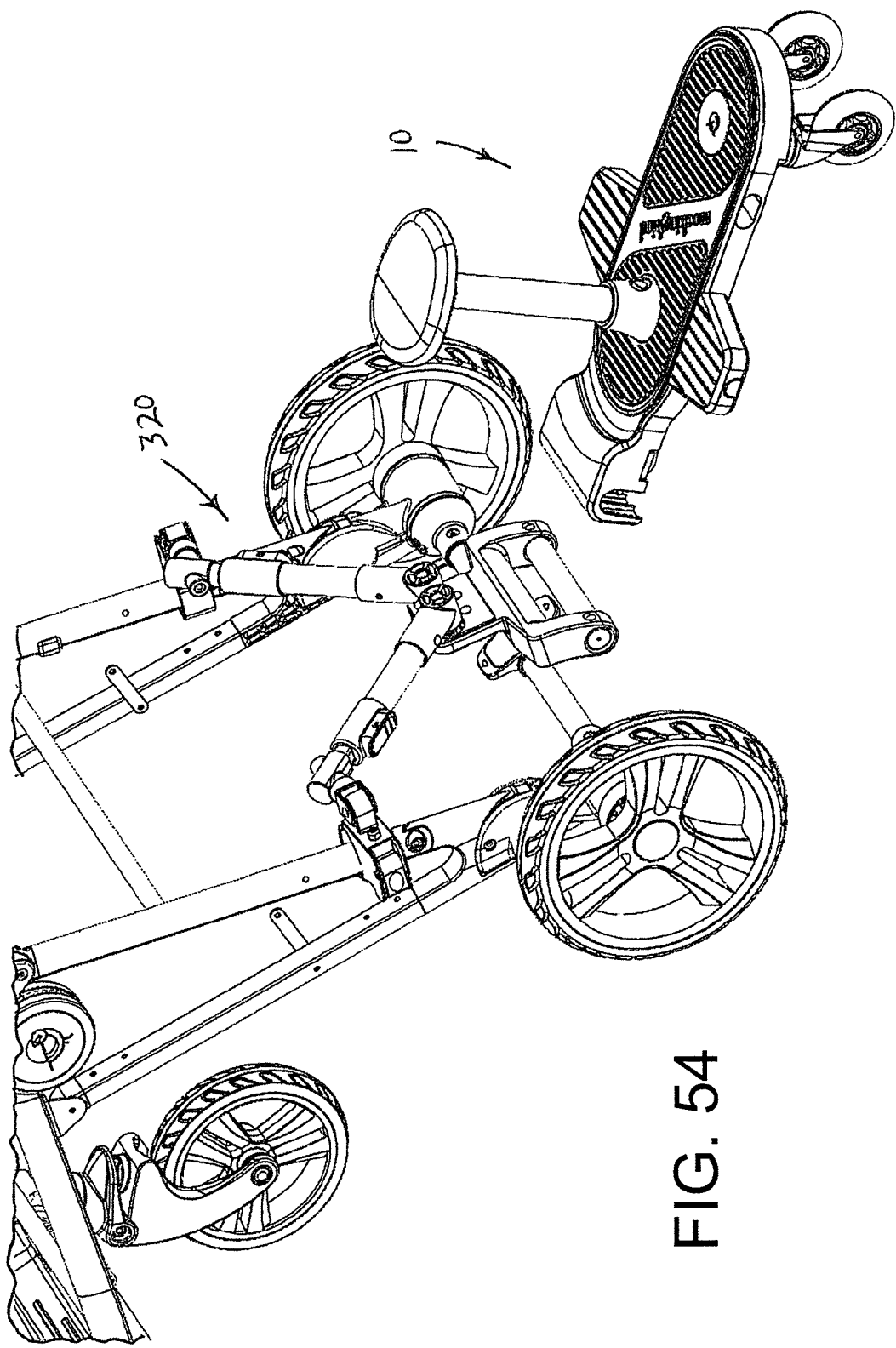
FIG. 54 is a perspective view of the axle attachment arrangement of FIG. 51, connected to the rear legs of the stroller with the standing board detached therefrom.
Figure 55:
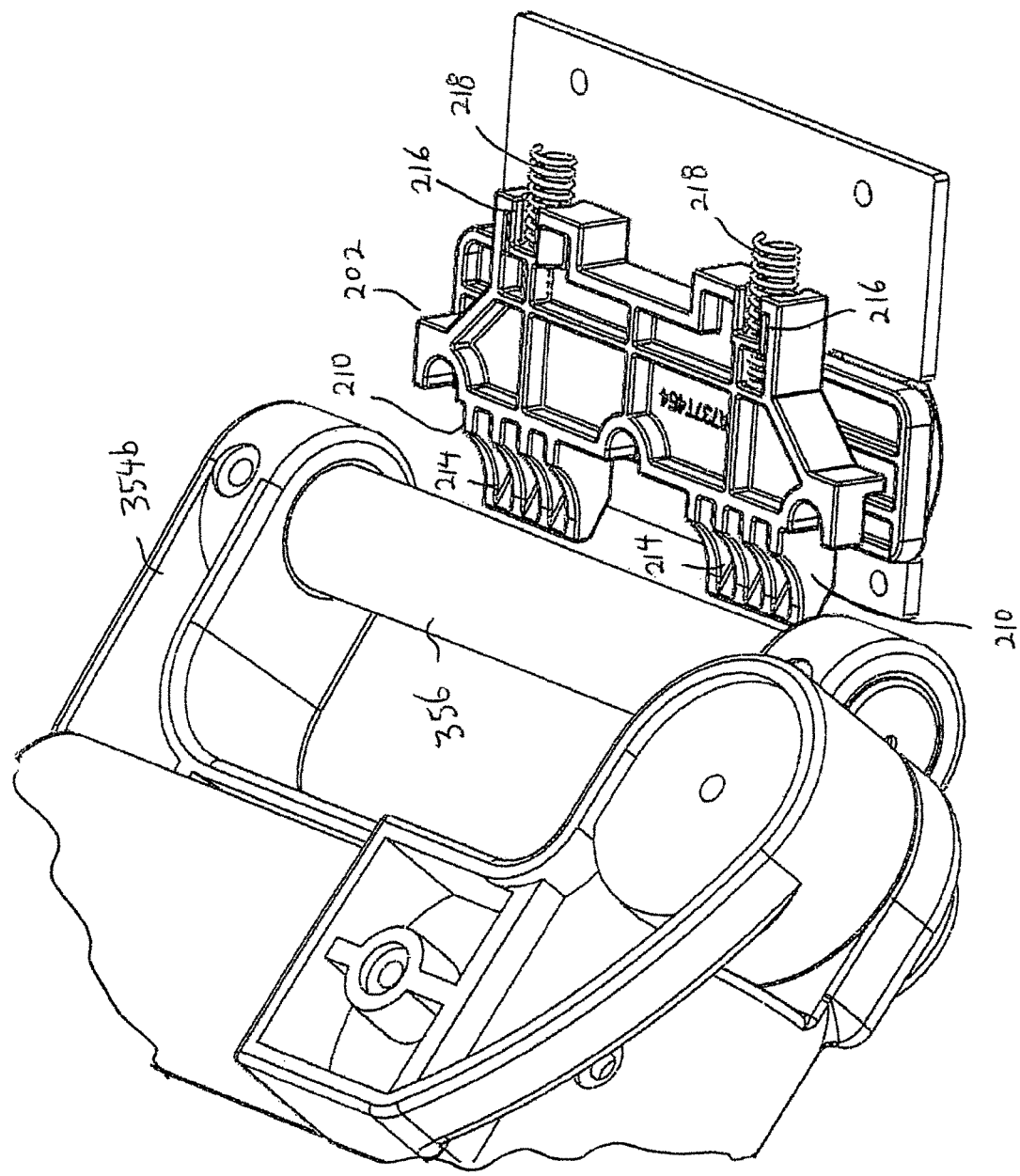
FIG. 55 is a perspective view of a portion of the standing board relative to the axle attachment arrangement of FIG. 54.
Figure 56:
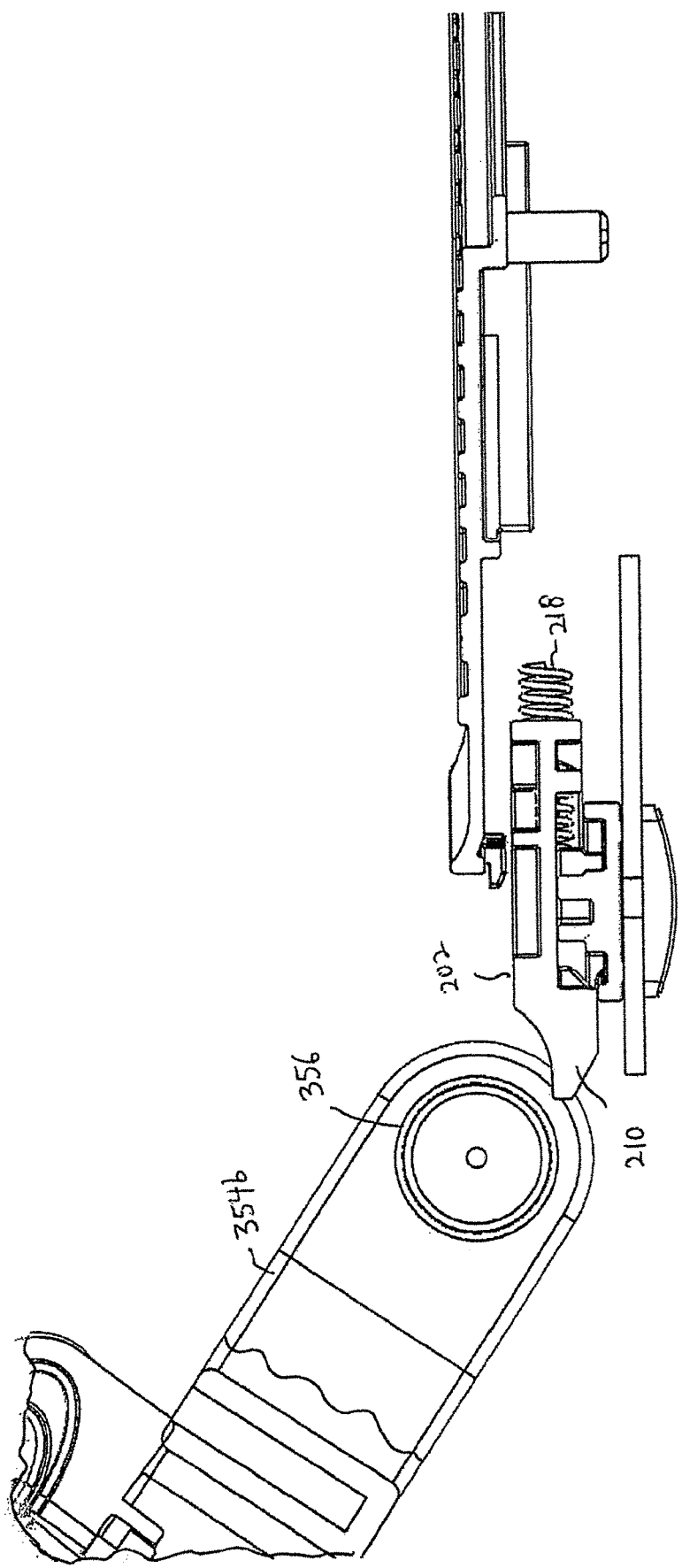
FIG. 56 is a side elevational view, partly in cross-section, of a portion of the standing board relative to the axle attachment arrangement of FIG. 54.
Figure 57:
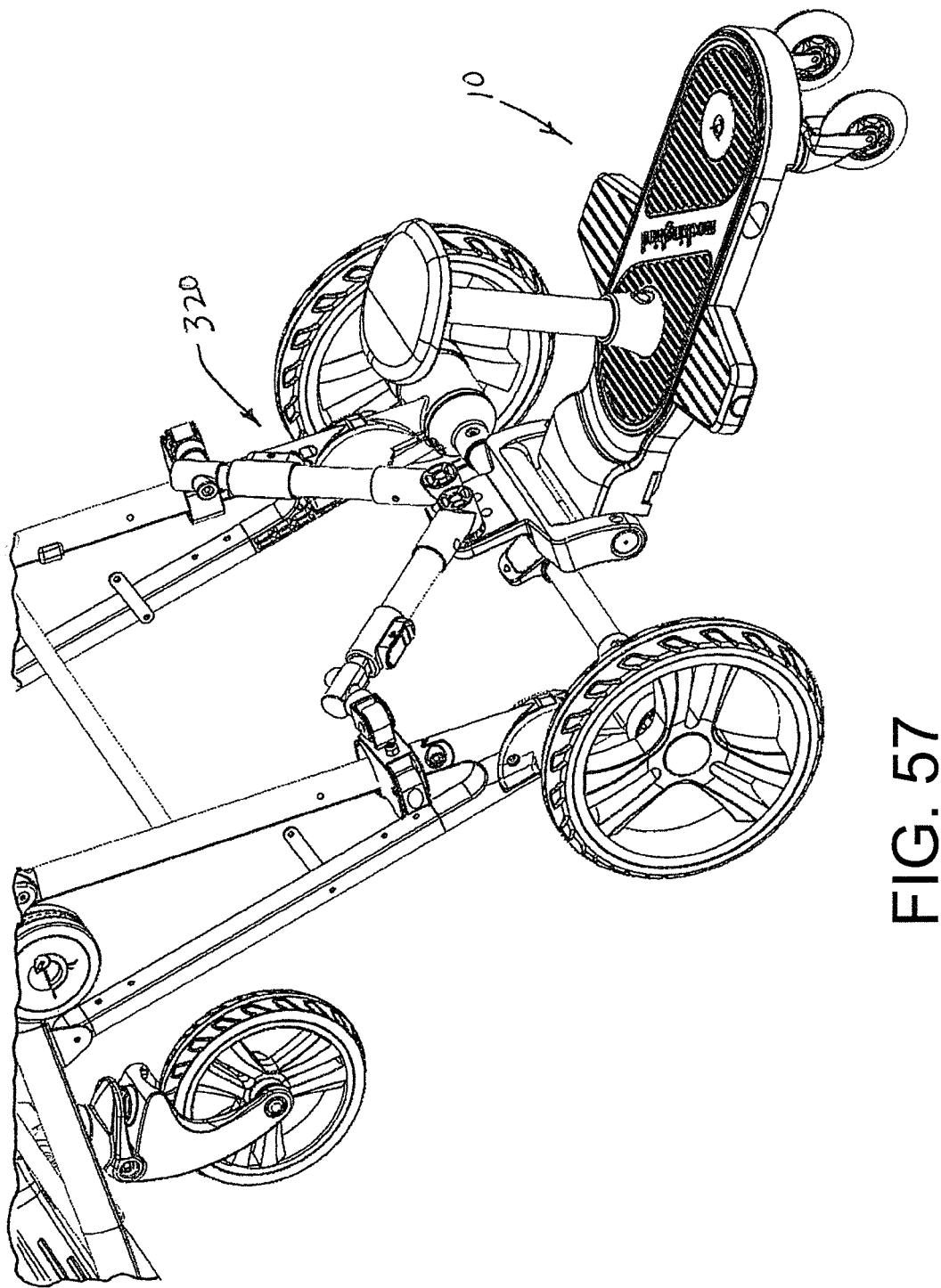
FIG. 57 is a perspective view of the axle attachment arrangement of FIG. 51, connected to the rear legs of the stroller with the standing board attached thereto.
Figure 58:
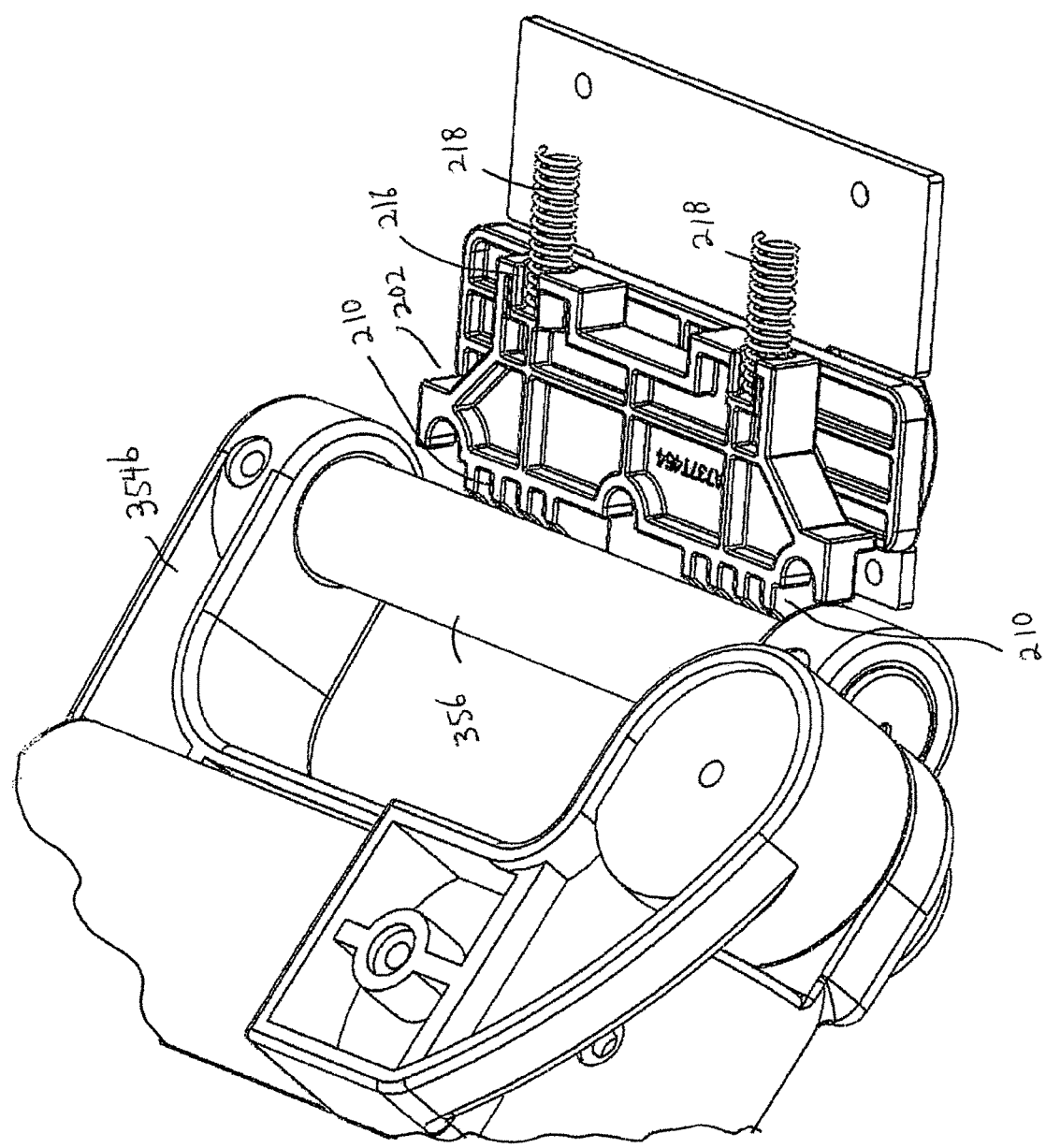
FIG. 58 is a perspective view of a portion of the standing board relative to the axle attachment arrangement of FIG. 57.
Figure 59:
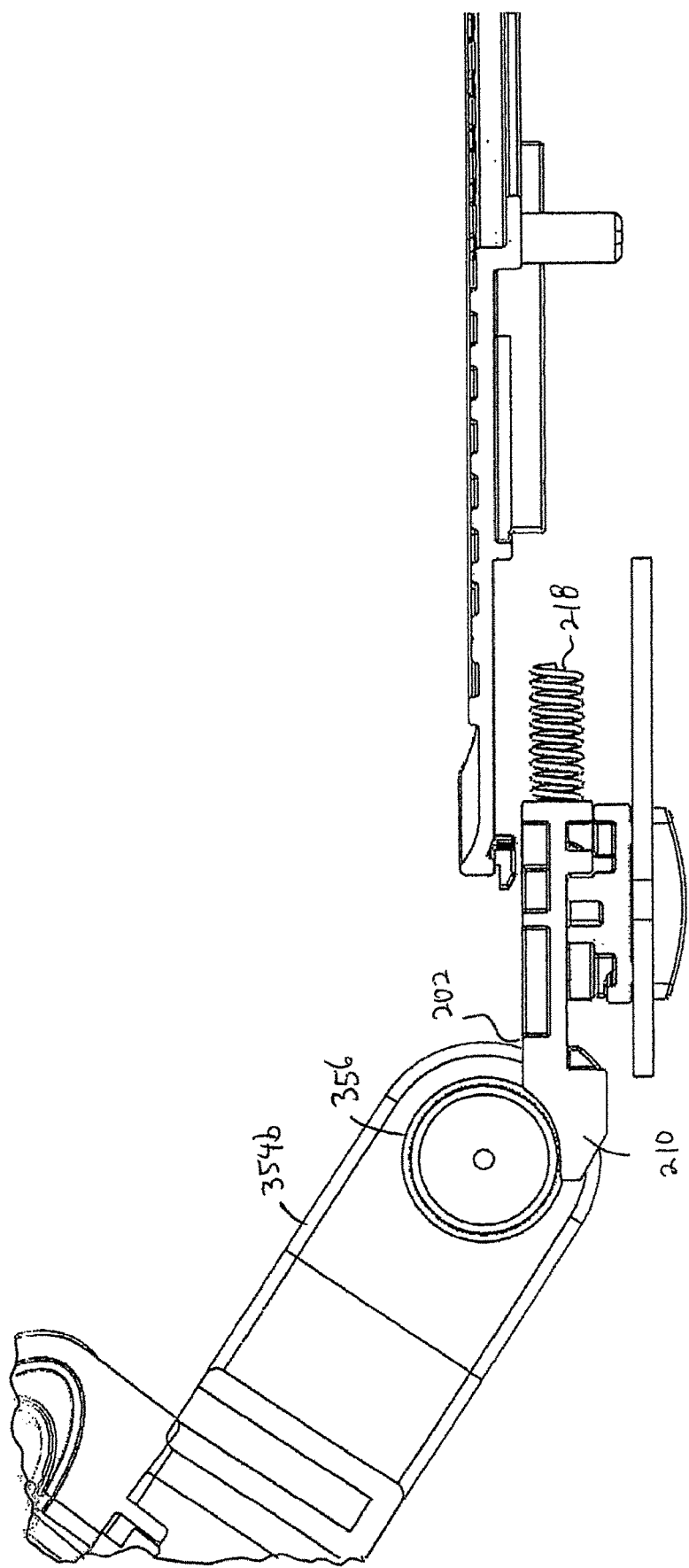
FIG. 59 is a side elevational view, partly in cross-section, of a portion of the standing board relative to the axle attachment arrangement of FIG. 57.

In addition, as shown best in FIG. 53, it is preferable that first arm 330 and second arm 332 are each formed as an adjustable telescoping rod with an outer rod 360 and a telescoping inner rod 362, with an adjustment assembly 364 that allows inner rod 362 to be telescoped and fixed at different positions relative to outer rod 360.

As shown, inner rod 362 includes a plurality of spaced apart openings 366 along the lengthwise direction thereof. Adjustment assembly 364 includes a housing 368 fixed to an outer surface of outer rod 360. A lever 370 is mounted within housing 368 by a transverse pivot pin 372 at the center thereof.

One end of lever 370 includes an inwardly extending locking pin 374 that extends through an opening 376 of outer rod 360 and which is adapted to engage within one of the plurality of openings 366 of inner rod 362 to releasably lock outer rod 360 and inner rod 362 at a fixed position relative to each other. The opposite end of lever 370 includes a button 378 which is biased outwardly by a coil spring 380 positioned between outer rod 360 and the underside of button 378. As a result, locking pin 374 is biased in an inward direction into engagement with one of the openings 366 of inner rod 362.

When button 378 is depressed against the force of coil spring 380, lever 370 pivots about pivot pin 372, whereby locking pin 374 is removed from the respective opening 366 of inner rod 362 to permit telescoping adjustment of outer rod 360 relative to inner rod 362. When a desired telescoping position is achieved, the force on button 378 is released, whereby coil spring 380 pivots lever 370 about pivot pin 372, to cause locking pin 374 to enter a respective new opening 366 of inner rod 362 at the new telescoped position.

With this arrangement, axle attachment devices 322 and 324 are clamped onto opposite rear legs 246 of stroller 244. First and second arms 330 and 332 hang down therefrom in a V-shape, connected at their opposite ends to yoke 348. The length of arms 330 and 332 can be adjusted. Thereafter, releasable stroller attachment 180 of standing board 10 is clamped onto connecting rod 356 of yoke 348, in the same manner as previously discussed.

This arrangement has the advantage that, because of the length adjustment of arms 330 and 332, the front end of standing board 10 can be positioned further out from stroller 344.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An arrangement for supporting a child behind a rear axle of a child carrying device, the arrangement comprising:
  an axle attachment device adapted to be secured to the rear axle of the child carrying device, the axle attachment device including:
    a first axle housing member having a first semi-cylindrical surface,
    a second axle housing member pivotally mounted to said first axle housing member and having a second semi-cylindrical surface, the second axle housing member pivotally movable relative to the first axle housing member between an open position in which said first and second semi-cylindrical surfaces are positioned away from each other and a closed position in which said first and second semi-cylindrical surfaces form a cylindrical opening adapted for receiving the rear axle therein,
    a releasable securement assembly for releasably locking said first and second axle housing members in said closed position for engagement about the rear axle of the child carrying device, a release mechanism for releasably unlocking said first and second axle housing members to said open position for release of the rear axle of the child carrying device therefrom, and a first main body connected to one of said first and second axle housing members; and a standing board adapted to be selectively secured to either the axle attachment device or the rear axle of the child carrying device, the standing board including:

an elongated planar board, at least one wheel secured to a rear section of the planar board, an attachment member at a front end of the planar board and adapted to be selectively removably secured to the axle attachment device or the rear axle of the child carrying device, the attachment member including:

a second main body connected at a front end of the planar board, a transverse extending hook member extending forwardly and downwardly from the second main body for selectively engaging either said first main body of the axle attachment device or the rear axle of the child carrying device, and a securement arrangement for releasably holding the first main body of the axle attachment device within said hook member when the attachment member is secured to the axle attachment device and for releasably holding the rear axle of the child carrying device within said hook member when the attachment member is secured to the rear axle of the child carrying device, wherein the first main body includes an opening for receiving said transverse extending hook member therethrough when said first main body of the axle attachment device is held within said hook member.

2. An arrangement according to claim 1, wherein:

one end of the first axle housing member is fixed to the first main body, and an opposite end of the first axle housing member is pivotally connected to the second axle housing member.

3. An arrangement according to claim 2, wherein the releasable securement assembly includes:

at least one recess in one of said first main body and said first axle housing member, a slide member slidably mounted in said second axle housing member, said slide member having at least one locking finger at a distal end thereof, and a spring for biasing said slide member in a direction out of said second axle housing member such that said at least one locking finger engages within said at least one recess to secure said axle attachment device to the rear axle of the child carrying device in the closed position.

4. An arrangement according to claim 3, wherein the release mechanism includes:

an actuating member slidably mounted to said second axle housing member, an elongated slot in said second axle housing member, a connecting wall connecting said actuating member to said slide member and extending through said elongated slot, whereby an external force on said actuating member causes said slide member to move into said second axle housing member against the force of said spring to release said second axle housing member in said closed position and thereby permit removal of the rear axle of the child carrying device therefrom.

5. An arrangement for supporting a child behind a rear axle of a child carrying device, the arrangement comprising:

an axle attachment device adapted to be secured to the rear axle of the child carrying device, the axle attachment device including:

a first axle housing member having a first semi-cylindrical surface, a second axle housing member pivotally mounted to said first axle housing member and having a second semi-cylindrical surface, the second axle housing member pivotally movable relative to the first axle housing member between an open position in which said first and second semi-cylindrical surfaces are positioned away from each other and a closed position in which said first and second semi-cylindrical surfaces form a cylindrical opening adapted for receiving the rear axle therein, a releasable securement assembly for releasably locking said first and second axle housing members in said closed position for engagement about the rear axle of the child carrying device, a first release mechanism for releasably unlocking said first and second axle housing members to said open position for release of the rear axle of the child carrying device therefrom, and a first main body connected to one of said first and second axle housing members; and a standing board adapted to be selectively secured to either of the axle attachment device or the rear axle of the child carrying device, the standing board including:

an elongated planar board, at least one wheel secured to a rear section of the planar board, first and second spaced apart attachment openings in an upper surface of the planar board, at least one of the following attachments selectively and releasably secured in each of said first and second attachment openings:

a seat assembly, a handle or a plug, a first set of first and second transversely aligned wing openings in opposite side surfaces of the planar board, first and second wings selectively and releasably securable in said first and second wing openings so as to extend transversely out from said planar board, an attachment member at a front end of the planar board and adapted to be selectively removably secured to either the axle attachment device or the rear axle of the child carrying device, the attachment member including:

a second main body connected at a front end of the planar board, transverse extending hook member extending forwardly and downwardly from the second main body for selectively engaging either of the rear axle of the child carrying device or the first main body of the axle attachment device, and a securement arrangement for releasably holding the first main body of the axle attachment device within said hook member when the attachment member is secured to the axle attachment device and for releasably holding the rear axle of the child carrying device within said hook member when the attachment member is secured to the rear axle of the child carrying device, said securement arrangement including:
- a first slide member slidably mounted in said second main body for movement toward and away from the hook member, the slide member including at least one finger movable with the slide member toward and away from the hook member,
- a spring for normally biasing the at least one finger toward the hook member, and
- at least one first angled engagement wall,
- whereby engagement of the hook member over the rear axle of the child carrying device or the first main body of the axle attachment device results in the at least one finger being forced away from the hook member and upon movement of the rear axle or first main body of the axle attachment device past the at least one finger, the spring biases the at least one finger back toward the hook member to lock the stroller attachment member to the rear axle or first main body of the axle attachment device; and
- a second release mechanism at the front end of the planar board for permitting release of the rear axle or first main body of the axle attachment device from the hook member, the second release mechanism including a second slide member slidably mounted in said second main body for movement in a transverse direction, the second slide member including at least one second angled engagement wall for engagement with said first angled engagement wall when said second slide member is transversely moved by an external force in said second main body, to cause said first slide member to move in a direction away from said hook member so as to move said at least one finger out of said hook member, and
- wherein the first main body includes an opening for receiving said transverse extending hook member therethrough when said first main body of the axle attachment device is held within said hook member.

* * * * *